(12) United States Patent
Rollwage et al.

(10) Patent No.: US 12,456,459 B2
(45) Date of Patent: Oct. 28, 2025

(54) DIALOGUE SYSTEM AND A DIALOGUE METHOD

(71) Applicant: Limbic Limited, London (GB)

(72) Inventors: Max Rollwage, Chelmsford (GB); Keno Onno Jüchems, Oxford (GB); Sashank Pisupati, London (GB); Omar Samir Mohammed El-Shahat Mohammed, Toulouse (FR); Ross Edward Francis Harper, London (GB); Tobias Ueli Hauser, Tübingen (DE); Sebastiaan de Vries, Amsterdam (NL); Benjamin Ashley Carrington, London (GB); Lion Carsten Schulz, Tübingen (DE)

(73) Assignee: Limbic Limited

( * ) Notice: Subject to any disclaimer, the term of this patent is extended or adjusted under 35 U.S.C. 154(b) by 243 days.

(21) Appl. No.: 18/458,700

(22) Filed: Aug. 30, 2023

(65) Prior Publication Data

US 2024/0398333 A1    Dec. 5, 2024

(30) Foreign Application Priority Data

Jun. 2, 2023   (GB) ..................................... 2308287

(51) Int. Cl.
*G10L 15/00* (2013.01)
*A61B 5/00* (2006.01)
(Continued)

(52) U.S. Cl.
CPC .......... *G10L 15/183* (2013.01); *A61B 5/4803* (2013.01); *A61B 5/7267* (2013.01);
(Continued)

(58) Field of Classification Search
CPC .... G06F 40/211; G06F 40/253; G06F 40/268; G06F 40/284; G06F 40/30; G10L 15/16;
(Continued)

(56) References Cited

U.S. PATENT DOCUMENTS 10,586,532 B1   3/2020  Cavallo et al.
11,010,656 B2 * 5/2021  Mars ....................... G10L 15/22
(Continued)

FOREIGN PATENT DOCUMENTS

WO       2022174161 A1     8/2022

OTHER PUBLICATIONS

Beck, A. T. (1963). Thinking and depression: I. Idiosyncratic content and cognitive distortions. Archives of General Psychiatry, 9(4), 324-333.
(Continued)

*Primary Examiner* — Vu B Hang
(74) *Attorney, Agent, or Firm* — Pillsbury Winthrop Shaw Pittman LLP

(57) ABSTRACT

A dialogue system, comprising: an input configured to obtain input data relating to speech or text provided by a user; an output configured to provide output data relating to speech or text to a user; and one or more processors, the one or more processors being configured to: receive, by way of the input, input data relating to speech or text provided by a user; receive, at a first module, structured information comprising information relating to a clinical state of the user, the structured information being generated from the input data, the first module comprising a subject understanding module and a subject recommendation module, wherein the subject understanding module comprises one or more subject understanding models, each of the one or more subject understanding models configured to take as input the structured information and provide as output subject profile
(Continued)

information; generate, at the subject understanding module, subject profile information based on the structured information; determine a subject recommendation comprising an intervention for the user, determining the subject recommendation comprising providing the subject profile information as input to the subject recommendation module; and output, by the way of the output, system responses as a part of a dialogue with the user, the system responses delivering an intervention.

20 Claims, 19 Drawing Sheets

(51) Int. Cl.
| | |
|---|---|
| *G10L 15/183* | (2013.01) |
| *G10L 15/22* | (2006.01) |
| *G10L 25/66* | (2013.01) |
| *G16H 10/20* | (2018.01) |
| *G16H 50/20* | (2018.01) |
| *G10L 15/18* | (2013.01) |

(52) U.S. Cl.
CPC .............. *G10L 15/22* (2013.01); *G10L 25/66* (2013.01); *G16H 10/20* (2018.01); *G16H 50/20* (2018.01); *G10L 15/1815* (2013.01)

(58) Field of Classification Search
CPC ....... G10L 19/00; G10L 19/005; G10L 25/27; G10L 25/30; G10L 15/02; G10L 15/12; G10L 15/063; G10L 15/07; G10L 15/20; G10L 15/22; G10L 15/26; G10L 15/30; G10L 15/08; G10L 15/1822; G10L 15/183; G10L 15/193; G10L 15/19
See application file for complete search history.

(56) References Cited

U.S. PATENT DOCUMENTS

| | | |
|---|---|---|
| 2003/0149561 A1 | 8/2003 | Zhou |
| 2021/0082424 A1 | 3/2021 | Johnson |
| 2021/0110895 A1 | 4/2021 | Shriberg et al. |

OTHER PUBLICATIONS

Beck, A. T. (1979). Cognitive therapy of depression. Guilford press, chapters 2, 3, 6, 7, 8, 9, 13.

Beck, A. T. (1991). Cognitive therapy: A 30-year retrospective. American Psychologist, 46(4), 368.

Leahy et al., Chapters 9 and 10, in the second edition: Leahy, R. L., Holland, S. J. F., & McGinn, L. K. (2012). Treatment plans and interventions for depression and anxiety disorders (2nd ed.). Guilford Press.

Lilienfeld, S. O., Ammirati, R., & Landfield, K. (2009). Giving debiasing away: Can psychological research on correcting cognitive errors promote human welfare? Perspectives on Psychological Science, 4(4), 390-398.

Reimers, N., & Gurevych, I. (2019). Sentence-bert: Sentence embeddings using siamese bert-networks. ArXiv Preprint ArXiv:1908. 10084 (pp. 1-11).

Rollwage, M. (2020). Cognitive and neural mechanisms underlying post-decision processing (pp. 1-166).

Roth, D. A., Eng, W., & Heimberg, R. G. (2002). Cognitive behavior therapy. Encyclopedia of Psychotherapy, 1, 451-459.

Yurica, C. L., & DiTomasso, R. A. (2005). Cognitive distortions. In Encyclopedia of cognitive behavior therapy (pp. 117-122). Springer.

Hutto, C.J. & Gilbert, E.E. (2014). VADER: A Parsimonious Rule-based Model for Sentiment Analysis of Social Media Text. Eighth International Conference on Weblogs and Social Media (ICWSM-14) (pp. 1-6). Ann Arbor, MI, Jun. 2014. https://pypi.org/project/vader-sentiment/.

D. Ravindran, Tree-Based Machine Learning Algorithms Explained, Analytics Vidhya I Medium, Jun. 19, 2021, (pp. 1-18). https://medium.com/analytics-vidhya/tree-based-machine-learning-algorithms-explained-b50937d3cf8e.

LangChain—Agents downloaded on Oct. 25, 2023 (pp. 1-8). https://python.langchain.com/en/latest/modules/agents.html.

GPT-4 Technical Report, OpenAI, downloaded on Mar. 27, 2023 (pp. 1-100). https://arxiv.org/abs/2303.08774.

Brown T, Mann B, Ryder N, Subbiah M, Kaplan JD, Dhariwal P, Neelakantan A, Shyam P, Sastry G, Askell A, Agarwal S. Language models are few-shot learners. Advances in neural information processing systems. 2020;33:1877-901.

Hugging Face—bertweet-base-sentiment-analysis downloaded on Oct. 25, 2023 (pp. 1-3). https://huggingface.co/finiteautomata/bertweet-base-sentiment-analysis.

WHO, World Health Organization—The Global Health Observatory: Mental Health, downloaded on Oct. 25, 2023, (pp. 1-3).

Riso, 2007—Riso, L. P., du Toit, P. L., Stein, D. J., & Young, J. E. (Eds.). (2007). Cognitive schemas and core beliefs in psychological problems: A scientist-practitioner guide. American Psychological Association, (pp. 1-2).

Burger et al, 2021—Burger F, Neerincx MA, Brinkman W-P (2021) Natural language processing for cognitive therapy: Extracting schemas from thought records. PLoS One 16(10): e0257832. https://doi.org/10.1371/journal.pone.0257832 (pp. 1-13).

Dozois & Rnic, 2015—Dozois, D. J., & Rnic, K. (2015). Core beliefs and self-schematic structure in depression. Current Opinion in Psychology, 4, 98-103.

Millings & Carnelley, 2015—Millings, A., & Carnelley, K. B. (2015). Core belief content examined in a large sample of patients using online cognitive behaviour therapy. Journal of Affective Disorders, 186, 275-283.

Search Report and Written Opinion for International Application No. PCT/GB2024/051408 dated Sep. 18, 2024, pp. 1-15.

Search Report and Written Opinion for International Application No. PCT/GB2024/051406 dated Oct. 1, 2024, pp. 1-12.

Search Report and Written Opinion for International Application No. PCT/GB2024/051412 dated Sep. 18, 2024, pp. 1-15.

\* cited by examiner

| Name of property | Description | Possible values |
|---|---|---|
| Module name | The name of the module producing the below output | Any module ID |
| LLM message | The LLM-generated message to be shown to the user | Any string |
| Planned interventions | A list of planned interventions with their names, IDs, descriptions, and "steps" | Any number of entries from 50+ interventions |
| Spontaneous interventions | A list of planned interventions with their names, IDs, descriptions, and "steps" These are chosen in the recommender module | Any number of entries from the list of possible recommender module interventions (variable and expanding) |
| Order of interventions | The above interventions ordered by importance (planned first, then spontaneous depending on recommender module output) | Any number of entries from the lists above |
| Chosen intervention | One intervention out of the lists above, chosen by the user | One entry from the lists above |
| User characteristics | A description of important utterances by the user, related to the suggested interventions from the recommender module + "historical" entries from the database | Any length string |
| Intent | The user's intent for the conversation | Options: [Just talk, specific intervention, educational (learn more about a topic, which triggers psycho-education module)] |
| Question type | Output of some LLMs, annotating the type of question being asked | Options: [General, Situation, Thought, Feeling, Open] |

DIALOGUE SYSTEM AND A DIALOGUE METHOD

CROSS-REFERENCE TO RELATED APPLICATIONS

This application claims priority to and benefit of UK Patent Application No. 2308287.8 filed Jun. 2, 2023, which is hereby incorporated in its entirety by this reference.

FIELD

The present disclosure relates to a dialogue system and a dialogue method.

BACKGROUND

Dialogue systems provide conversational user interfaces, for example chatbots or voice-based agents, which may be used in many applications. Producing text and dialogue that is human-like has long been a challenge in artificial intelligence. As a result, much research has been done in making humans and machines converse. Early attempts used rule-based models, while more recent advances have relied on more complex neural networks.

The key task of language modelling is to produce output text, given some previous input. As such, language modelling models a sequence of tokens (which may correspond to words) and predicts the next token in this sequence. For example, the sentence "I went to the kitchen to brew myself a cup of" will likely be followed by the word "coffee" or "tea", but not "car". This logic can then be extended further, to produce entire sentences, paragraphs or even longer conversations or texts.

The way that language models learn these statistical dependencies is by observing large amounts of human-written text, like books or internet forums. In simple terms, these models observe word-word or longer term sentence-sentence pairs, and base their predictions based on such observed regularities. As a result, language modelling may be considered as complex pattern matching.

Language models have achieved significant progress in recent years, producing what may appear as human-like text. Firstly, the internet has provided large quantities of text, increasing the amount of training data manifold, and leading to advances in performance. Secondly, specific large neural networks have been developed to deal with the complexities of natural language and increased computing power has made it easier to train them.

Among these neural network architectures are large transformer models. These comprise attention mechanisms within their neural network architecture, and have a large number of trainable parameters—for example tens of billions of parameters. These large models have seen significant gains in performance, being able to produce coherent long-term text completion. Because these systems are so large, this text completion ability allows them to also engage in other text-related tasks, like summarisation or conversations. While some transformers are more fine-tuned on these tasks, they still rely on the same basic prediction idea in language modelling.

Such large language models may have many advantages over older, more classical text generation systems, like rule-based chatbots. For example, their large amounts of training data make them understand quite varied forms of language and tone and they are robust in reacting to mistakes in the input text. Additionally, this allows them to respond in varied, and potentially highly nuanced ways, adapting their tone, and response, as well as not having to rely on formulaic responses. This can make them seem significantly more human-like and empathetic than other systems. This in turn makes them a key candidate to engage in deeper conversations with humans.

However, for some real world applications, further fine-tuning training of the large language model may be needed in order to provide required performance. Since the models are so large, in other words the number of trainable parameters is so great, such further training may be computationally inefficient.

Furthermore, these architectures may make any sort of explainability difficult. They engage in pure, black-box style, pattern-matching, that does not allow for causal explanations behind the output utterances. This black box nature may also make it harder to constrain the model outputs in a useful fashion, potentially letting the models be led astray, or engage in potentially harmful behaviour that they have picked up through their source material.

SUMMARY

In one aspect, there is provided a dialogue system, comprising:
   an input configured to obtain input data relating to speech or text provided by a user;
   an output configured to provide output data relating to speech or text to a user;
   one or more processors, configured to:
      receive, byway of the input, input data relating to speech or text provided by a user;
      provide the input data to a first module, the first module comprising a subject understanding module, wherein the subject understanding module comprises one or more subject understanding models, each of the one or more subject understanding models configured to take as input the input data and provide as output subject profile information;
      generate a system input using the subject profile information;
      provide the system input to a language model, the language model configured to provide a system response; and
      output, by way of the output, the system response.

The one or more subject understanding models represent clinical constructs or frameworks. These models output subject profile information represent clinical concepts or diagnoses, such as cognitive distortion.

In one example, the system input is a system prompt, wherein the system prompt is provided as input to the language model in order to output a system response. The system prompt may be generated using the input data and the subject profile information.

In one example, the first module further comprises a subject recommendation module, wherein the subject recommendation module comprises a subject recommendation model configured to take as input the subject profile information and providing as output a subject recommendation, wherein the system prompt is generated using the subject recommendation to generate a subject prompt.

In one example, the language model is a general generative pre-trained transformer model.

The input data may further comprise numeric data.

In one example, the one or more subject understanding models comprises a trained cognitive understanding model configured to take as input the input data, determine one or more classifications, and provide the determined one or more classifications as output subject profile information. The one or more classifications may comprise at least one classification predicting a specific medical diagnosis. The one or more classifications may represent an aspect of a clinical framework or process, or a clinical concept for example.

In one example, the specific medical diagnosis comprises one or more cognitive distortions. In one example, the specific medical diagnosis comprises any or any combination of: catastrophizing; dichotomous thinking; negative filtering; fortune telling; mind reading; and/or personalising.

In one example, the language model is configured to generate the subsequent words in a sequence of text beginning with the system prompt.

In one example, one or more of the one or more subject understanding models predicts information about the subject relating to an aspect of a clinical process. One or more of the one or more subject understanding models may be trained using data that is labelled with information relating to the corresponding aspect.

In one example, the language model is a trained model and one or more of the one or more subject understanding models is a trained model, wherein the one or more trained subject understanding models each has a smaller number of trained parameters than the language model.

In one example, the one or more processors is further configured to receive, at an output safety module, the system response from the language model and evaluate the system response at the output safety module before it is output. The output safety module may be further configured to prevent output of the system response depending on the output of the evaluation.

In one example, the one or more processors is further configured to receive, at a subject safety module, the input data and evaluate the input data before a system response is output. The subject safety module may be further configured to prevent output of a system response depending on the output of the evaluation.

In one example, the one or more subject understanding models comprises a trained behavioural understanding model configured to take as input the input data, determine one or more activity classifications using a trained model, classify the activity classifications as user adaptive or user maladaptive behaviours and provide the determined one or more classifications as output subject profile information.

In one example, the one or more processors are further configured to output, by way of the output, a record comprising one or more system responses provided to the user and the subject profile information used as system input to generate each system response.

In one example, the first module further comprises a recommender module.

In one aspect, there is provided a computer implemented dialogue method, comprising
  receiving, by way of an input, input data relating to speech or text provided by a user;
  providing the input data to a first module, the first module comprising a subject understanding module, wherein the subject understanding module comprises one or more subject understanding models, each of the one or more subject understanding models configured to take as input the input data and provide as output subject profile information;
  generating a system input using the subject profile information;
  providing the system input to a language model, the language model configured to provide a system response; and
  outputting, by way of an output, the system response.

The dialogue system and dialogue method may be used in a method of automated diagnosis and/or automated treatment for example.

In one aspect, there is provided a computer-implemented method for automated diagnostics, the method comprising:
  performing the dialogue method; and
  outputting an indication of one or more diagnoses based on the subject profile information.

In one aspect, there is provided a computer-implemented method for automated treatment, the method comprising:
  performing the dialogue method; and
  outputting a treatment plan based on the subject profile information.

In one aspect, there is provided a dialogue system, comprising:
  an input configured to obtain input data relating to speech, text or numeric data provided by a user;
  an output configured to provide output data relating to speech, text or numeric data to a user;
  one or more processors, configured to:
    receive, by way of the input, input data relating to speech, text or numeric data provided by a user;
    provide the input data to a first module, the first module comprising a subject understanding module, wherein the subject understanding module comprises one or more subject understanding models, each of the one or more subject understanding models configured to take as input the input data and provide as output subject profile information;
    generate a system input using the subject profile information;
    provide the system input to a language model, the language model configured to provide a system response; and
    output, by way of the output, the system response.

In one aspect, there is provided a dialogue method, comprising:
  receiving, by way of the input, input data relating to speech, text or numeric data provided by a user;
  providing the input data to a first module, the first module comprising a subject understanding module, wherein the subject understanding module comprises one or more subject understanding models, each of the one or more subject understanding models configured to take as input the input data and provide as output subject profile information;
  generating a system input using the subject profile information;
  providing the system input to a language model, the language model configured to provide a system response; and
  outputting, by way of the output, the system response.

In one aspect, there is provided a dialogue system, comprising:
  an input configured to obtain input data relating to speech or text provided by a user;
  an output configured to provide output data relating to speech or text to a user;
  one or more processors, configured to:
    receive, byway of the input, input data relating to speech or text provided by a user;
    generate subject profile information using a first module, the first module comprising a subject understanding module, wherein the subject understanding module comprises one or more subject understanding models, each of the one or more subject understanding models configured to provide as output subject profile information;

generate a system input using the input data and the subject profile information;

provide the system input to a language model, the language model configured to provide a system response; and output, by way of the output, the system response.

In one aspect, there is provided a dialogue method, comprising:

receiving, by way of an input, input data relating to speech or text provided by a user;

generating subject profile information using a first module, the first module comprising a subject understanding module, wherein the subject understanding module comprises one or more subject understanding models, each of the one or more subject understanding models configured to provide as output subject profile information;

generating a system input using the input data and the subject profile information;

providing the system input to a language model, the language model configured to provide a system response; and outputting, by way of an output, the system response.

According to another aspect, there is provided a non-transitory computer readable storage medium comprising computer readable code configured to cause a computer to perform the above methods.

According to another aspect, there is provided a dialogue system, comprising:

an input configured to obtain input data relating to speech or text provided by a user;

an output configured to provide output data relating to speech or text to a user; and one or more processors, the one or more processors being configured to:

receive, byway of the input, input data relating to speech or text provided by a user;

receive, at a first module, structured information comprising information relating to a clinical state of the user, the structured information being generated from the input data, the first module comprising a subject understanding module and a subject recommendation module, wherein the subject understanding module comprises one or more subject understanding models, each of the one or more subject understanding models configured to take as input the structured information and provide as output subject profile information;

generate, at the subject understanding module, subject profile information based on the structured information;

determine a subject recommendation comprising an intervention for the user, determining the subject recommendation comprising providing the subject profile information as input to the subject recommendation module; and output, by the way of the output, one or more system responses as a part of a dialogue with the user, the system responses delivering an intervention.

In one example, the subject recommendation module comprises decision logic configured to map subject profile information to a pre-determined list of interventions.

In one example, the one or more subject understanding models comprises two or more subject understanding models, each of the subject understanding models comprising a trained model configured to determine a classification. Each classification may comprise a prediction of a specific diagnosis.

In one example, the subject recommendation module is configured to identify an intervention from a plurality of stored interventions. Each stored intervention may be associated with a specific stored diagnosis corresponding to a classification.

In one example, the one or more processors are further configured to provide the input data to an interaction module. The interaction module may comprise at least one model configured to generate the structured information by generating one or more questions to be provided to the user and storing the input data received in response to the one or more questions as the structured information.

In one example, the subject recommendation module is further configured to determine whether the subject profile information satisfies one or more thresholds, and responsive to determining that the subject profile information does not satisfy the one or more thresholds, instruct the interaction module to generate one or more further questions to be provided to the user.

In one example, the interaction module is further configured to generate a label corresponding to each of the one or more questions. The label may indicate a topic associated with the question, and store the input data received in response to the one or more questions associated with the topic. For instance, a first topic may correspond to an indication that the question relates to thoughts, a second topic may correspond to an indication that the question relates to situations and a third topic may correspond to an indication that the question relates to feelings. In one example, the subject understanding module comprises one or more of: a first model, a second model, a third model and a fourth model. The first model may be configured to detect whether information from the structured information corresponds to a thought, the second model may be configured to determine whether a thought is a distorted thought, the third model may be configured to determine whether information from the structured information corresponds to a positive sentiment or a negative sentiment, and the fourth model may be configured to determine whether information from the structured information corresponds to an activity.

In one example, the interaction module is further configured to:

determine whether the input data from the user includes information relating to a clinical state of the user;

in response to determining that the input data includes information relating to the clinical state of the user, generating the structured information from subsequent input data received from the user; and output, by the way of the output, information explaining the intervention to the user.

In one example, the interaction module is further configured to generate a first system prompt to instruct a language model to determine whether the input data includes information relating to the clinical state of the user. The first system prompt may comprise a first flag to be output by the language model when it determines that the input data includes information relating to the clinical state of the user, the dialogue history and instruction to the language model to generate a system response to the user input. In response to determining that the first flag is output, the interaction module may further be configured to generate a second system prompt. The second system prompt may instruct the language model to generate the one or more questions to be provided to the user. In one example, the first system prompt may include a second flag to be output by the language model when it determines that the user has requested a specific intervention. In response to determining that the second flag is output, the interaction module may further be configured to instruct the language model to generate a system response delivering the intervention.

In one example, the subject recommendation module is further configured to determine the subject recommendation based on stored historical data associated with one or more previous interventions for the user.

In one example, the subject recommendation module includes a trained model.

In one example, the subject recommendation module is further configured to determine the subject recommendation based on one or more of: stored diagnosis information associated with the user, stored demographic data associated with the user, stored historical data associated with one or more previous interventions for the user, and feedback from the user in relation to one or more previous interventions for the user.

In one example, the recommender model is configured to predict the intervention for the user so as to maximise at least one of three target metrics, at least two of the three target metrics, or three of the three target metrics, wherein a first metric of the three target metrics relates to therapeutic alliance, a second metric of the three target metrics relates to patient outcomes, and a third metric of the three target metrics relates to insights derived by the subject understanding module.

In one example, the system responses deliver a sequence of interventions.

In one aspect, there is provided a dialogue system, comprising:
    an input configured to obtain input data relating to speech or text provided by a user;
    an output configured to provide output data relating to speech or text to a user;
    one or more processors, configured to:
        receive, byway of the input, input data relating to speech or text provided by a user;
        provide first input data to a first module, the first module comprising a subject understanding module, wherein the subject understanding module comprises one or more subject understanding models, each of the one or more subject understanding models configured to take as input the first input data and provide as output subject profile information;
        generate a system input using the subject profile information, wherein the first module further comprises a subject recommendation model configured to take as input the subject profile information and provide as output a subject recommendation, wherein the system input is generated using the subject recommendation;
        provide the system input to a language model, the language model configured to provide a system response; and
        output, by way of the output, the system response.

In one aspect, there is provided a dialogue method, comprising:
    receiving, byway of an input, input data relating to speech or text provided by a user;
    receiving, at a first module, structured information comprising information relating to a clinical state of the user, the structured information being generated from the input data, the first module comprising a subject understanding module and a subject recommendation module, wherein the subject understanding module comprises one or more subject understanding models, each of the one or more subject understanding models configured to take as input the structured information and provide as output subject profile information;
    generating, at the subject understanding module, subject profile information based on the structured information;
    determining a subject recommendation comprising an intervention for the user, determining the subject recommendation comprising providing the subject profile information as input to the subject recommendation module; and
    outputting, by the way of an output, one or more system responses as a part of a dialogue with the user, the system responses delivering an intervention.

According to one aspect there is provided a dialogue method, comprising:
    receiving, by way of the input, input data relating to speech or text provided by a user;
    providing first input data to a first module, the first module comprising a subject understanding module, wherein the subject understanding module comprises one or more subject understanding models, each of the one or more subject understanding models configured to take as input the first input data and provide as output subject profile information;
    generating a system input using the subject profile information, wherein the first module further comprises a subject recommendation model configured to take as input the subject profile information and provide as output a subject recommendation, wherein the system input is generated using the subject recommendation;
    providing the system input to a language model, the language model configured to provide a system response; and
    outputting, by way of the output, the system response.

According to another aspect, there is provided a non-transitory computer readable storage medium comprising computer readable code configured to cause a computer to perform the above methods.

According to another aspect, there is provided a carrier medium comprising computer readable code configured to cause a computer to perform the above methods. The methods are computer-implemented methods. Since some methods in accordance with examples can be implemented by software, some examples encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

BRIEF DESCRIPTION OF FIGURES

Systems and methods in accordance with non-limiting examples will now be described with reference to the accompanying figures in which.

FIG. 11 shows a multiple regression mood prediction approach;

FIG. 14(*b*) is a schematic illustration of functions performed by a first module according to an example that may be used in a dialogue application;

FIG. 18 shows the list of output information that may be generated by a language module according to an example that may be used in a dialogue application.

DETAILED DESCRIPTION

Figure 1:
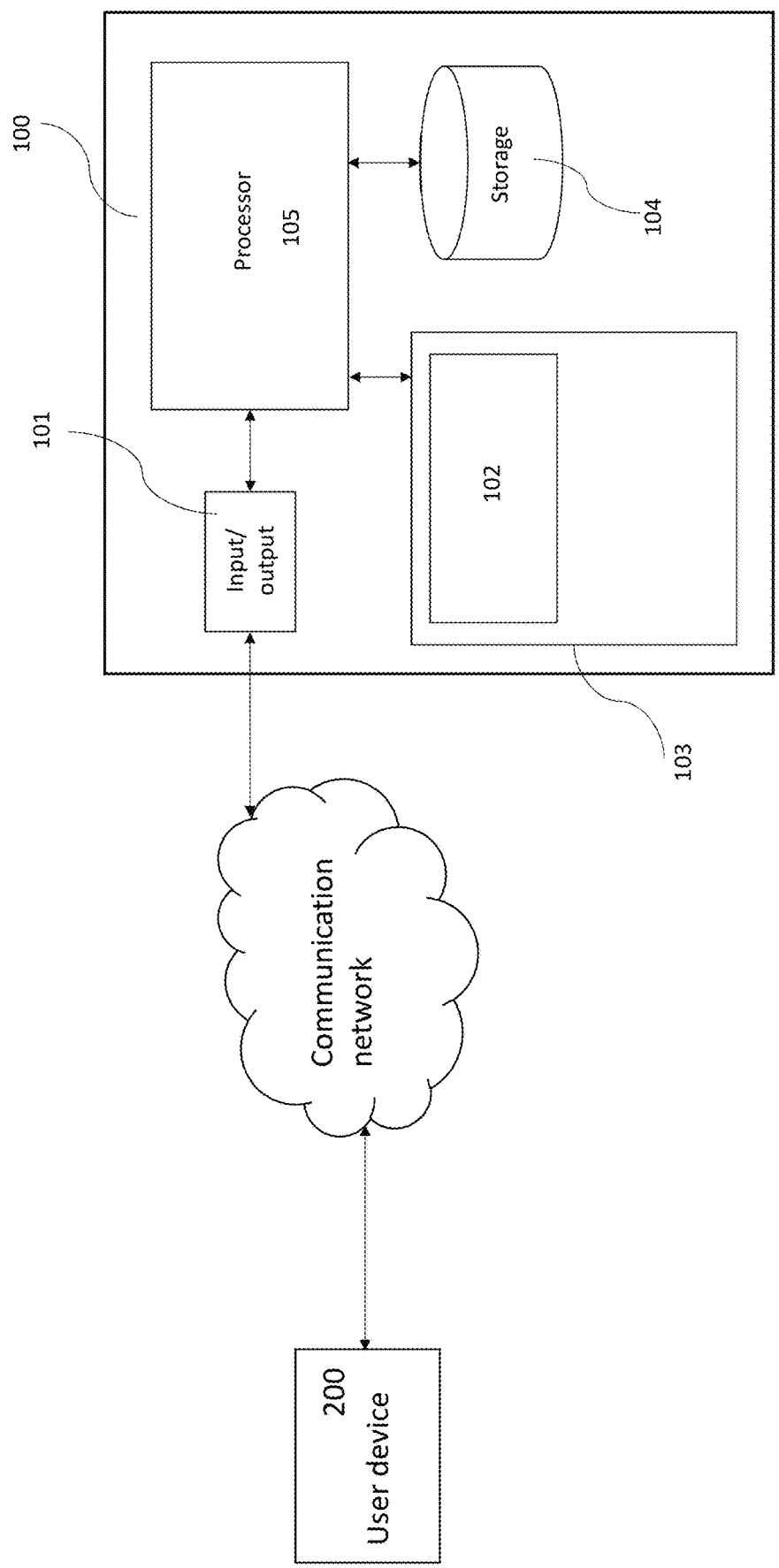
FIG. 1 is a schematic illustration of a system comprising a dialogue system and a user device.

Dialogue systems provide conversational user interfaces, for example chatbots or voice-based agents, which may be used in many applications. Producing text and dialogue that is human-like has long been a challenge in artificial intelligence. As a result, much research has been done in making humans and machines converse. Early attempts used rule-based models, while more recent advances have relied on more complex neural networks.

The key task of language modelling is to produce output text, given some previous input. As such, language modelling models a sequence of tokens (which may correspond to words) and predicts the next token in this sequence. For example, the sentence "I went to the kitchen to brew myself a cup of" will likely be followed by the word "coffee" or "tea", but not "car". This logic can then be extended further, to produce entire sentences, paragraphs or even longer conversations or texts.

The way that language models learn these statistical dependencies is by observing large amounts of human-written text, like books or internet forums. In simple terms, these models observe word-word or longer term sentence-sentence pairs, and base their predictions based on such observed regularities. As a result, language modelling may be considered as complex pattern matching.

Language models have achieved significant progress in recent years, producing what may appear as human-like text. Firstly, the internet has provided large quantities of text, increasing the amount of training data manifold, and leading to advances in performance. Secondly, specific large neural networks have been developed to deal with the complexities of natural language and increased computing power has made it easier to train them.

Among these neural network architectures are large transformer models. These comprise attention mechanisms within their neural network architecture, and have a large number of trainable parameters—for example tens of billions of parameters. These large models have seen significant gains in performance, being able to produce coherent long-term text completion. Because these systems are so large, this text completion ability allows them to also engage in other text-related tasks, like summarisation or conversations. While some transformers are more fine-tuned on these tasks, they still rely on the same basic prediction idea in language modelling.

Such large language models may have many advantages over older, more classical text generation systems, like rule-based chatbots. For example, their large amounts of training data make them understand quite varied forms of language and tone and they are robust in reacting to mistakes in the input text. Additionally, this allows them to respond in varied, and potentially highly nuanced ways, adapting their tone, and response, as well as not having to rely on formulaic responses. This can make them seem significantly more human-like and empathetic than other systems. This in turn makes them a key candidate to engage in deeper conversations with humans.

However, for some real world applications, further fine-tuning training of the large language model may be needed in order to provide required performance. Since the models are so large, in other words the number of trainable parameters is so great, such further training may be computationally inefficient. For example, a large language model may be used to deliver autonomous therapy. However, fine-tuning training a large language model to deliver autonomous therapy using in-session transcripts may be computationally inefficient.

The present disclosure provides a dialogue system in which the user input utterances are first provided to a first module, comprising a subject understanding module. The subject understanding module comprises one or more subject understanding models, each of the one or more subject understanding models configured to take as input the input data and provide as output subject profile information. A system prompt is then generated using the subject profile information and provided as input to the large language model. The large language model provides as output a system response based on the subject profile information. The language model is a frozen, general purpose large language model of variable size.

In this system, each subject understanding model can be trained on comparatively less data. In particular, each subject understanding model can focus on a particular aspect of the clinical process (for example cognitive distortions). It can therefore be trained only on data collected for this particular aspect. Furthermore, each subject understanding model may have a smaller number of trainable parameters than the language model. For example, the subject understanding models may have of the order of hundreds to tens of thousands of trainable parameters whereas the language model 21 may use between 10-500 billion parameters and consume many terabytes of text data. In one example, the subject understanding models have less than 1 million parameters. In one example, the language model has more than 1 billion parameters. In one example, the language model has more than 5 billion parameters. In one example, the language model has more than 7 billion parameters. Using a large language model alone to perform the same therapy task requires massive amounts of data, of varying quality. For example, the training data set may require more than 1 billion tokens. This may be around 40000 hours of therapy. In some cases more than 400000 hours may be needed.

Furthermore, using a large language model alone means there is no straight forward way to steer the behaviour of the model. For example, different clinics may follow different treatment pathways and may require changes to the internal workings of the diagnostic application 102. This may be difficult to do, and computationally inefficient, as the single large language model is a monolithic model—changing one component affects all others. A similar problem occurs when a large language model is trained on a subset of disorders, but then a new disorder is added. The new disorder may require very similar treatment, but the large language model may struggle to recognise it, as it has never seen an example of this. By contrast, the modular approach one or more subject understanding models, can generalise if the individual components are similar enough. Furthermore, a new subject understanding model may be trained and included in the system, without modification of other components. The modular system makes it easy to change individual parts.

Furthermore, using only a large language model architecture may make any sort of explainability difficult. Large language models engage in pure, black-box style, pattern-matching, that does not allow for causal explanations behind the output utterances. This black box nature may also make it harder to constrain the model outputs in a useful fashion, potentially letting the models be led astray, or engage in potentially harmful behaviour that they have picked up through their source material. Each subject understanding model on the other hand provides a view into the chatbot behaviour, as it can be shown exactly how each input was judged and on what basis a decision was made. These outputs could then feed into session reports, for example automatically annotating what an intervention was related to using the label of a subject understanding model. The session report can show to the clinician the internal clinical logic, which can be amended by the clinician for the purpose of the report. The output from each subject understanding model may be stored for each dialogue turn. If an automated therapy conversation is audited, the these stored outputs show which clinical concepts were triggered at any moment.

Furthermore, even the largest language models have relatively limited memory. That is, their maximal input length is limited to the equivalent of several pages of text. Even if memory size increases, model performance tends to deteriorate the longer the input sequence. Especially in longer term human-machine conversations, this precludes the building of deeper relationships or insights. Such insights may instead be captured and labelled by the subject understanding model(s), and the labels fed into the language model to generate the system output.

Furthermore, even though the large language model may engage with large amounts of knowledge in their training data, they lack any truly grounded knowledge about the world. As a result, while they will be able to answer some questions through pattern matching ("The capital of France is . . . "), they may lack the ability to retrieve or use more factual knowledge in a logical manner. Such factual knowledge is instead provided to the language model as input by the subject understanding model(s).

Furthermore, even with fine-tuning, large language models produce text in a goal-less manner through their underlying pattern matching procedure. Whereas humans might pursue specific goals and have longer term plans within a single conversation, or across conversations with the same individual, large language models lack any of this goal-directedness. Instead, such goals are captured by the subject understanding model(s), and fed into the language model as input, to generate the output from the system.

Talking to a therapist is the core component of any treatment approach in psychotherapy, from psycho-analysis to cognitive behavioural therapy. In any of these fields, becoming a therapist requires long training, deep interpersonal skills and a large amount of factual knowledge. The relationship that arises through talking to a therapist is one of the key predictors of treatment success. Often discussed under the umbrella term 'therapeutic alliance', this relationship is better when conversations are authentic and the patient feels understood.

Therapeutic alliance can be achieved at several levels. On a more long-term level, therapeutic alliance will be higher when patients feel understood and perceive the tasks and exercises they engage with to be useful. On a lower level, patients will engage more with a therapist if they perceive the conversations to be engaging and empathetic. This can for example be achieved through mirroring the patient (for example in tone) or by active listening.

Any attempt to automatise even parts of talking therapy in a machine system should thus pay plentiful attention to create a deep relationship with the patient. While more mechanistic approaches might be well served to create long term understanding and make useful recommendations, large language models are suited for the more lower level tasks. Through their nuanced language understanding and producing ability they have the possibility to create engaging, empathetic, targeted and varied text when conversing with a patient.

However, use cases such as automated therapy should have a level of explainability, and, should be able to engage in safe conversations. Furthermore, patients and therapists engage in long-term relationships, which are impossible due to large language models memory restrictions. Furthermore, large language models lack any form of grounded knowledge about the patient, mental disorders, or interventions. They are also unable to plan longer term treatment or engage in goal-directed conversations with a patient. In other words, large language models are able to talk like an adult human being but lack the insight that is gained through training as a psychotherapists.

In the disclosed system, the subject understanding model(s) endow the large language model with the knowledge of a therapist. The dialogue system is a two-part system. As one part of the system—the second module—a large language model is used to produce text that a patient would engage with. However, this large language model is guided by a model-based therapeutic understanding and recommendation system—the first module. This first module's task is to endow the digital therapist with goal-directedness, subject-matter knowledge, and explainability. The first module captures a patient's disorder through machine learning tools that encapsulate aspects of qualitative models used in psychotherapy. It then uses these insights to suggest interventions and exercises through a recommender system that aims to optimise patient outcomes.

Together, these two subsystems thus serve to create therapeutic alliance both in the long- and short-term. This is achieved by understanding the patient and recommending useful interventions via the first module, and by creating engaging and empathetic interventions via the large language model.

The two sub-systems interact in the following way. The model-based system in the first module guides and constrains the conversation between the application and the patient. This can for example be done through producing a prompt (or any other input modality) for the language model that contains relevant background information, and outlines the relevant goal for the following conversation. The large language model then produces the utterance that the patient receives. The patient's replies are then taken as input to the language model to generate further utterances and are constantly monitored by the model-based system in the first module in order to derive further insights.

In-session transcripts are not the most computationally efficient training data to construct an autonomous therapy delivery computer programme. Training an large language model to emulate a human therapist on thousands of hours of in-session transcripts is a hard challenge. Effectively this involves trying to infer the clinical models from noisy high-dimensional transcript data, which is a very complex function to approximate. The disclosed system models a human clinical psychologist. The language model is therefore provided with input information corresponding to a variety of protocols and clinical models of care. An example from cognitive behavioural therapy is the following: [PATIENTS WITH DEPRESSION COMMONLY EXHIBIT 5 DISTORTED THINKING PATTERNS]>[COGNITIVE RESTRUCTURING IS AN APPROPRIATE EXERCISE TO ADMINISTER TO A PATIENT WHO EXHIBITS DISTORTED THINKING]>[A SUCCESSFULLY REFRAMED DISTORTED THOUGHT LOOKS AS FOLLOWS]. The disclosed system draws on clinical models, or clinical frameworks, to guide the conversation with the patient in a goal-directed way. Representing these clinical models as a network of interconnected statistical models is more efficient. Furthermore, each statistical module in the first module can be regulated. Each are concepts that can be understood by other human members of the care team.

FIG. 1 is a schematic illustration of a system comprising a dialogue system 100 and a user device 200. The dialogue system 100 is configured to communicate with the user device 200 via a communication network, for example the Internet.

The user device 200 is configured to provide output to a user and to receive input from a user. The user device 200 may be an end user computing device, such as a laptop or desktop computer, or a mobile device such as a tablet or smart phone for example. In one example, the user provides spoken inputs and the user device 200 provides audio output to the user. In this case, the user device 200 comprises a microphone for receiving audio inputs from the user and a speaker for outputting audio outputs to the user. In another example, the user provides text inputs and the user device displays a text output.

The user device 200 may therefore additionally or alternatively comprise a keyboard for receiving text inputs from the user and a screen for displaying text outputs to the user, or a touchscreen for receiving text inputs and displaying text outputs for example. The user device 200 can be configured to interact with the user with one or both of text and audio signals.

The user may interact with the dialogue system 100 through a web-based portal or through an application running on the user device 200 for example. The user provides spoken or text inputs through the web browser or application. The audio or text signal is then processed and the data sent from the user device 200 to the dialogue system 100 over the communication network. Data received from the dialogue system 100 at the user device 200 over the communication network is also processed and provided as an audio or text output to the user through the web-browser or application.

The dialogue system 100 in this example comprises one or more servers. The dialogue system 100 comprises an input/output component 101, a processor 105, working memory 111, and storage 107.

The processor 105 is coupled to the storage 107 and accesses the working memory 111. The processor 105 may comprise logic circuitry that responds to and processes the instructions in code stored in the working memory 111. In particular, when executed, a dialogue application 102 is represented as a software product stored in the working memory 111. The dialogue application 102 will be described in more detail in relation to the figures below. Execution of the dialogue application 102 by the processor 105 will cause examples as described herein to be implemented.

The processor 105 also accesses the input/output component 101. The input/output component 101 may be a single component or may be divided into a separate input component and output component. Furthermore, multiple input or output components may be provided for receiving and sending different inputs and outputs. The input/output component 101 is configured to receive data transmitted through the communication network and output data to be transmitted through the communication network. In particular, input data from the user device 200 corresponds to text and/or audio. This data is received through the input/output component 101 and processed by the dialogue application 102 as will be described below. A user of the user device 200 may interact with the dialogue application 102 by providing an audio or text input in order to access a service provided by the dialogue application 102. Output audio data or text data generated by the dialogue application 102 is provided to the input/output component 101 and transmitted to the user device 200 through the communication network.

The dialogue system 100 may communicate with further devices and systems over the communication network, for example other user devices corresponding to other users using the dialogue application 102.

The processor 105 is also configured to communicate with the non-volatile storage 107. The storage 107 may contain data that is used by the dialogue application 102 when executed by the processor 105. As illustrated, the storage 107 is local memory that is contained in the device. Alternatively however, the storage 107 may be wholly or partly located remotely, for example, using cloud based memory that can be accessed remotely via the communication network. The dialogue application 102 is stored in the storage 107. The dialogue application 102 is placed in working memory 111 when executed.

As illustrated, the system 100 comprises a single processor. However, the dialogue application 102 may be executed across multiple processing components, which may be located remotely, for example, using cloud based processing. For example, the dialogue system 100 may comprise at least one graphical processing unit (GPU) and a general central processing unit (CPU), wherein various operations described in relation to the methods below are implemented by the GPU, and other operations are implemented by the CPU. For example, matrix operations or vector operations are performed by a GPU.

Although in this example, the dialogue application 102 runs remotely from the user device 200 on a dialogue system 100 comprising one or more servers, in some other examples, a user device itself acts as a dialogue system, with the dialogue application 102 running on the user device. Inputs are directly received and outputs directly outputted to and from the user on the device on which the dialogue application 102 is executed.

Usual procedures for the loading of software into memory and the storage of data in the storage unit 107 apply. The dialogue application 102 can be embedded in original equipment, or can be provided, as a whole or in part, after manufacture. For instance, the dialogue application 102 can be introduced, as a whole, as a computer program product, which may be in the form of a download, or can be introduced via a computer program storage medium, such as an optical disk. Alternatively, modifications to existing software can be made by an update, or plug-in, to provide features of the above described example.

While it will be appreciated that the below examples are applicable to any computing system, the example computing system 100 illustrated in FIG. 1 provides means capable of putting an example, as described herein, into effect.

Figure 2:
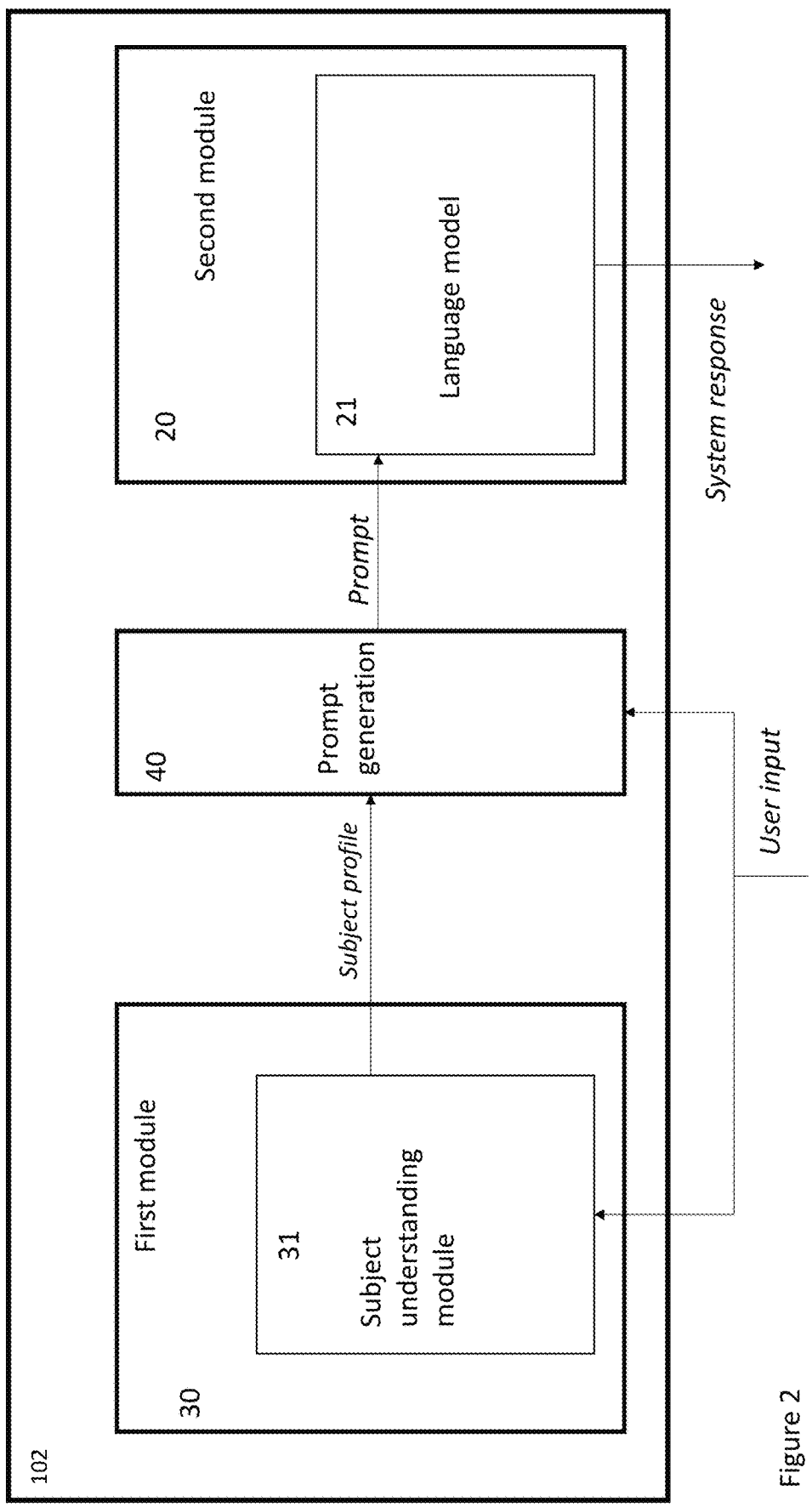
FIG. 2 is a schematic illustration of a dialogue application according to an example.

FIG. 2 is a schematic illustration of a dialogue application 102 according to an example, that may be stored and executed by a dialogue system 100 as described in relation to FIG. 1. Execution of the dialogue application 102 will cause methods as described herein to be implemented.

When executed, the dialogue application 102 receives, by way of the input 101, input data relating to speech or text provided by a user.

When speech data is received as input, a step of automatic speech recognition (ASR) is performed in order to generate input text data from the input speech data. The dialogue application 102 may comprise an ASR module. The ASR module may perform speech recognition using any suitable method. For example, an ASR model may comprise a trained speech recognition algorithm based on a neural network or Hidden Markov Model. In one example, the ASR model may be a trained speech recognition model, based on a neural network for example.

The input text data is provided to a first module 30. This first module 31 is a goal-directed module. The first module 30 comprises a subject understanding module 31. The subject understanding module 31 comprises one or more subject understanding models, also referred to as understanding models. Each of the one or more subject understanding models is configured to take as input the input text data and provide as output subject profile information. The subject understanding models are also referred to throughout as "mechanistic models". Example subject understanding models will be described below.

The subject profile information output from the subject understanding module 31 is taken as input to a prompt generation module 40 in this example. The input text data is also taken as input to the prompt generation module 40 in this example. The prompt generation module 40 generates a system prompt using the input data and the subject profile information. An example of how a system prompt may be generated will be described below. A system prompt is an example of a system input.

The generated system prompt corresponds to a sequence of text. The generated system prompt is taken as input to the second module 20. The second module 20 comprises a language model 21 configured to take as input the system prompt and provide as output a system response. The provided system response corresponds to a sequence of text. The language model 21 is a large generative pre-trained transformer model, trained for text completion via prompting.

The system response may be converted to speech before being output to the user. In examples in which speech output may be used, the dialogue application 102 further comprises a text to speech module that receives the text signal corresponding to the system response and synthesizes speech data based on the text signal. A TTS model may provide text-to-speech functionality using any suitable method. For example, the text-to-speech functionality may be provided using any of concatenative synthesis, formant synthesis, Hidden Markov Model-based synthesis, and/or deep learning-based synthesis. In other examples, the language model 21 may deliver the generated responses via written text or via digital speech.

Figure 3:
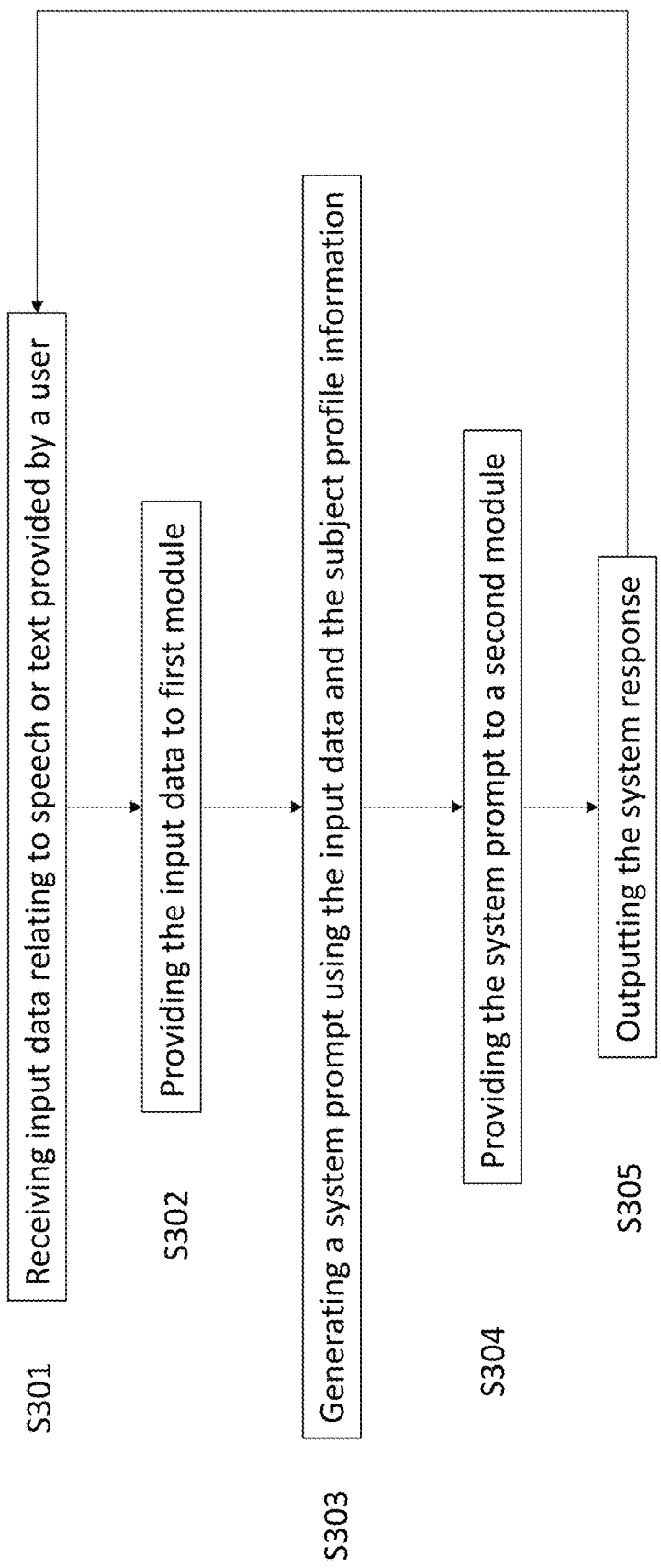
FIG. 3 shows a flow chart of a dialogue method according to an example, that may be performed by the dialogue application when executed on the dialogue system as described above.

FIG. 3 shows a flow chart of a dialogue method according to an example, that may be performed by the dialogue application 102 when executed on the dialogue system 100 as described above. Here, an example will be described in which the subject understanding module comprises a cognitive understanding module. The method will be described with reference to an example dialogue with a user.

In S301, input data relating to speech or text provided by a user is received. In the example dialogue described here, in a first iteration of the method, the user provides a text input "Everybody hates me".

In S302, this input is provided to a first module 30, the first module 30 comprising a subject understanding module 31. In this example, the subject understanding module 31 comprises a first cognitive understanding model. In this example, the first cognitive understanding model is a cognitive distortion understanding model 300. The input text "Everybody hates me" is provided as input to the cognitive distortion understanding model 300. The cognitive distortion understanding model 300 provides as output subject profile information. In this example, the subject profile information is an indication of whether the user input contains a cognitive distortion. In this example, the cognitive distortion understanding model 300 predicts a probability that the following thought is distorted: "Everybody hates me". This probability is then used to output an indication of whether the user input corresponds to a cognitive distortion.

Figure 4:
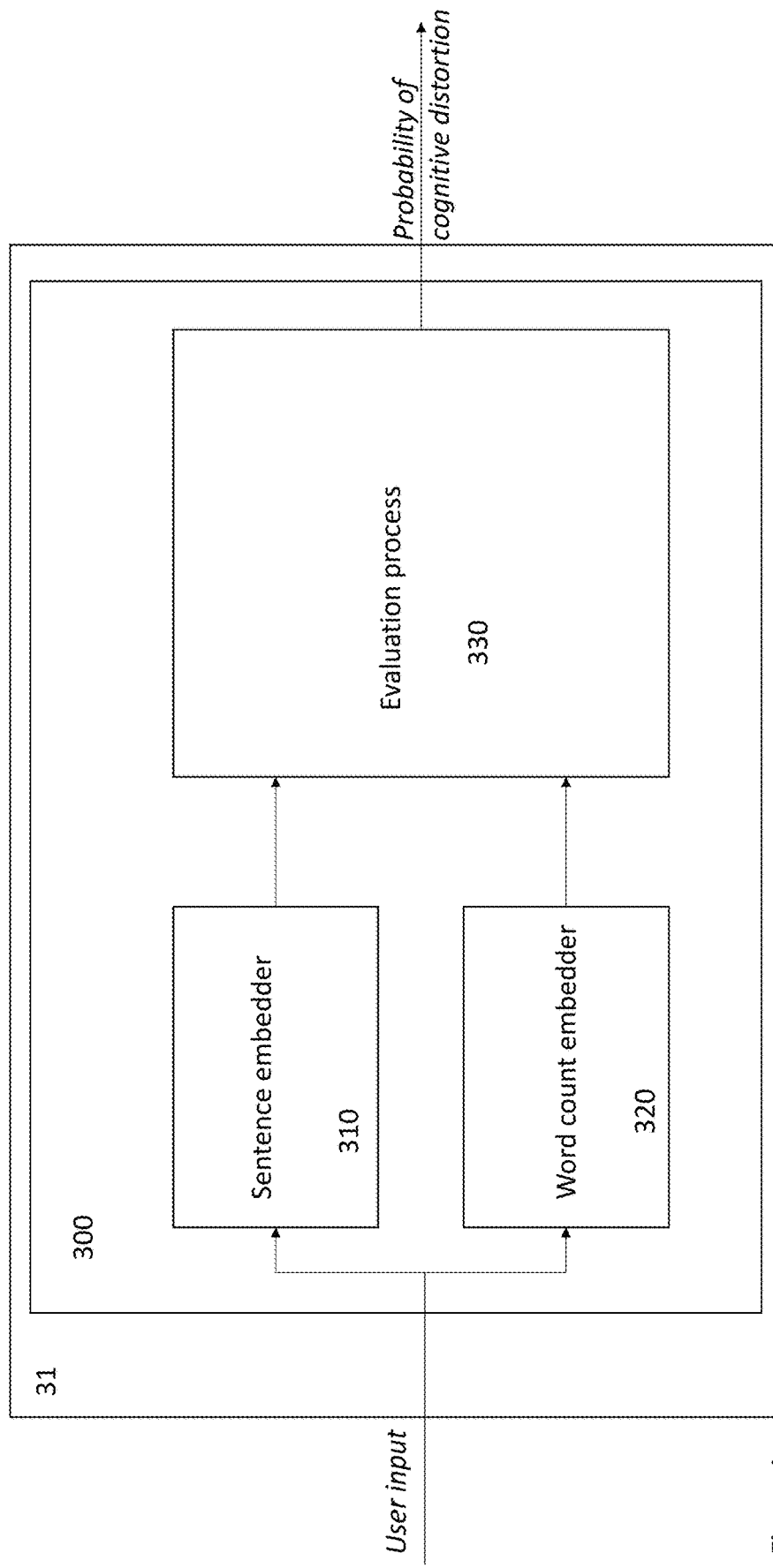
FIG. 4 is a schematic illustration of a cognitive distortion understanding model which may be used in the subject understanding module in this example.

FIG. 4 is a schematic illustration of a cognitive distortion understanding model 300 which may be used in the subject understanding module 31 in this example.

The way people process information, or the way they interpret situations, is a critical contributor to their mental health. Importantly, research has shown that people may not always interpret situations in an objective or accurate way and this faulty information processing is known as cognitive distortions (or thought distortions). For instance, a depressed patient might think in "extreme, negative, categorical, absolute, and judgmental" ways, whereby these thinking errors contribute to the patient's mental health symptoms. One of the core aims of cognitive behavioural therapy is to identify these thought distortions in order to challenge, change and restructure these mal-adaptive patterns.

The cognitive distortion understanding model 300 performs evaluation of the user input. In this example, the cognitive distortion understanding model 300 comprises a trained deep learning model 330 that is used to classify free-text input (i.e. the user data input) as to whether the presented thought was distorted or not—in this case a binary classifier.

The model takes free-text as input, whereby this free-text is transformed into a vector representation. Many different ways of obtaining such vector representations are possible (e.g. term-frequency inverse document frequency or transformer networks), and the outlined application is independent of the used embedding of choice. This transformed text is then used to predict the probability that the user data that was input which represents the thought and which is being evaluated by the cognitive distortion understanding model 300 contains one of the specified cognitive distortions.

In the example cognitive distortion understanding model 300 shown in FIG. 4, the user input text is transformed into two separate vector representations. A first vector representation is generated using a pre-trained sentence embedder 310. For example, a pre-trained sentence embedding may be generated using the implementation described in the paper "sentence-BERT", Reimers & Gurevych, 2019, see arXiv: 1908.10084 the entire contents of which are incorporated by reference herein.

A second vector representation is generated using a simple word-count embedder 320, based on the most common keywords that are present in distorted thoughts. The key word representation is derived by comparing the most common words for all classes of cognitive distortions compared to the most common words in non-distorted thoughts. In this example, the 750 words that appear most commonly in distorted thoughts but do not occur in non-distorted thoughts (for example that do not appear in the top 2000 most common words for non-distorted thoughts) are selected. In other examples, different numbers of words can be selected. This additional bag-of-words based embedding allows to capture a qualitative difference for specific words used in distorted thinking.

The two embeddings, i.e. the two vector representations, are taken as input to the evaluation process 330. The evaluation process 330 comprises a deep learning algorithm which is trained to classify whether the thought represented by the input vector representations is distorted or not distorted. The two vector representations are fed into two separate streams of a neural network with separate hidden layers. Each stream comprises one or more fully connected feed forward layers. These separate hidden layers are then combined into a combined final fully connected hidden layer which feeds into an output softmax layer. Applying the deep learning algorithm to the vector representations allows to evaluate whether the user input corresponds to a distorted thought, and this is output by the evaluation process 330. In particular, the evaluation process 330 outputs a probability that the user input corresponds to a distorted thought, with a higher value indicating a higher likelihood of a distorted thought in this example.

The deep learning algorithm used in the evaluation process 330 is trained using a training dataset, prior to implementation of the system. The training dataset may comprise historical patient utterances (sequences of text) and may be used to learn the weights of the deep learning algorithm prior to implementation of the dialogue system 100. The training data may comprise clinician-labelled datasets, which may comprise a number of example patient utterances. To prepare the training dataset, a number of clinicians review the patient utterances and label them as corresponding to a "distorted thought" (these utterances are given the label 1) or not a distorted thought (these utterances are given the label 0). The training data comprises data associated with an individual or a group of individuals. A training data set may include data collected for a given individual, and the deep learning algorithm (e.g., for the individual or other persons) may be trained using the individual training data set. This may enable generating deep learning algorithms that are tailored to trends for the individual. A training data set may include data collected for multiple individuals, and the deep learning algorithm (e.g., for some or all of the individuals in the group or other persons) may be trained using the group training data set. This may enable generating deep learning algorithms that benefit from a relatively large data set that incorporates general trends across multiple individuals. In some examples, further data can be collected as the deep learning algorithm is used and further training can be performed. As a loss function, a cross-entropy loss may be used.

During the training process, sequences of text from the training dataset are processed by the cognitive distortion understanding model 300 in the same manner as described above. The evaluation process 330 comprises a number of trainable parameters, which can be expressed as a vector $\theta_e$. The parameters include the neural network layer weights for example. The parameters are randomly initialised. The update process searches for a parameter vector $\theta_e$ so that the difference between label in the training dataset and the prediction made by the model is minimised. A process of updating $\theta_e$ sequentially by computing the gradient of a loss function and updating $\theta_e$ using the computed gradient and an optimiser function is performed. A cross entropy loss may be used, in which:

$$L_e = -\frac{1}{N}\sum_{i=1}^{N} y_i \log \hat{y}_i + (1-y_i)\log(1-\hat{y}_i)$$

where $y_i$ is the label from the training data set for the utterance i (1 for "distorted" and 0 for "not distorted") and $\hat{y}_i$ is probability value output from the evaluation process 330 for the utterance i. The gradient of the loss L with respect to each of the trainable parameters is determined through back-propagation. The gradient is then used to determine the updated parameters, using an optimiser function. This family of update methods is known as gradient descent (GD), generally defined iteratively as:

$$\theta_e = \theta_e - \mu_e \frac{\partial L_e}{\partial \theta_e}$$

where $\mu_e$ is the learning rate, which defines how quickly the parameters are updated. This process is performed for each utterance in the training corpus. The update may be performed in batches of N utterances, based on a batch average.

In some examples, a more complex version of the cognitive distortion understanding model 300 is used, where the cognitive distortion understanding model 300 predicts which (if any) specific cognitive distortion was present out of a list of the most common cognitive distortion. In this case, a multi-class classifier can be used, where one class corresponds to no cognitive distortion, and each other class corresponds to a different type of cognitive distortion. A list of cognitive distortions can include: catastrophizing; dichotomous thinking; negative filtering; fortune telling; mind reading; and personalising. Various cognitive distortions can be classified by the cognitive distortion understanding model 300, including but not limited to: catastrophizing; dichotomous thinking; negative filtering; fortune telling; mind reading; and/or personalising; and other cognitive distortions that are described in the literature (and it should also be noted that other terminology may be used in the literature to refer to these example cognitive distortions). In this case, the training dataset comprises utterances which are labelled with the type of cognitive distortion present (i.e. the classes).

Although in this example, a cognitive distortion understanding model 300 is described, other types of cognitive understanding models may additionally or alternatively be included in the subject understanding module 31. In one example, a cognitive understanding model comprises a neural network, for example a transformer-based or multi-layer feed-forward network. In another example, the cognitive understanding model comprises a tree-based model. In one example, the cognitive understanding model comprises a neural network configured as a binary classifier or a multi-class classifier. As a loss function, a cross-entropy loss may be used, where the input to the cognitive understanding model is a user utterance, and the output a class label (e.g. "distorted thought" or "core belief: good partner"). Such models are trained using supervised learning. The training data may comprise clinician-labelled datasets, which may comprise a number of example patient utterances. To prepare the training dataset, a number of clinicians review the patient utterances and label them as corresponding to one of the classes—for example, an utterance may be labelled as "distorted thought", or "core belief: good partner", etc. In other examples, the training may make use of reinforcement learning—this could be beneficial in systems with multiple steps and a clear metric of success, e.g. therapeutic alliance.

In this example, the first module 30 outputs one of an indication indicating that the user input is distorted or an indication indicating that the user input is not distorted. The indications may comprise text. For example, if the probability output from the cognitive distortion understanding model 300 is greater than a pre-defined threshold value, the indication indicating that the user input is distorted is output, otherwise the indication indicating that the user input is not distorted is output. The threshold may be 0.5. In this example, the indication indicating that the user input is distorted is "###DISTORTED ###". The indication indicating that the user input is not distorted is "###NOT DISTORTED ###".

In another example, the first module 30 additionally or alternatively outputs the probability value. As described above, in other examples, the cognitive distortion understanding model 300 may be a multi-class classifier, configured to identify the type of distortion from a plurality of different types of cognitive distortion. For example, where the user input comprises "Everybody hates me", the cognitive distortion understanding model 300 may output the class label corresponding to the highest probability—which may be "dichotomous thinking", also referred to as "all or nothing thinking".

Returning to FIG. 3, the subject profile information output by the first module 30 in this example comprises an indication that the user input is distorted "###DISTORTED ###" or an indication that the user input is not distorted is "###NOT DISTORTED ###". In S303 of FIG. 3, a system prompt is generated using the input data and the subject profile information. Although in this example, the subject profile information comprises one of two indications ("###DISTORTED ###" or "###NOT DISTORTED ###"), in other examples, the subject profile information comprises one or more of a plurality of indications, which could be used to indicate "distorted thought, core belief, negative automatic thought, etc.

In this step, a stored text template is retrieved. The prompt generation module 40 may comprise one or more stored text templates. An example stored text template is provided below:
"About You:
You are an AI assistant using techniques from psychotherapy to help the user better understand their problems and improve their symptoms.
Context:
You are engaged in a conversation with the user and will ask them how they are feeling and what they are thinking about, much like a psychotherapist might do during a session.
Your Goal:
Your goal is to help the user get better. To do this, you will employ techniques from psychotherapy, like cognitive restructuring. Other AI assistants will monitor the user's responses and will add further information to the user's input. For example, an AI assistant may append "#Distorted thought #" to the user input, which would indicate that the user needs cognitive restructuring, alternatively "#Not distorted #" may indicate that no restructuring is needed. You can use the AI assistant's inputs to decide how to continue the conversation and whether to begin a specific technique.
Further Information about Your Available Techniques:
The goal of cognitive restructuring is to guide the user step by step through reflecting on their thoughts and beliefs. The user is encouraged to think about the evidence supporting their thoughts and generate an alternative view that provides the best fit with "objective" external experience. The objective of cognitive restructuring is to raise doubts in the client's mind about long-held maladaptive beliefs (e.g., "People will notice I'm anxious and think there is something wrong with me") and to consider the accuracy and utility of an alternative perspective (e.g., "People might notice I'm a little anxious but consider it unimportant")"."

In this example, there is a single stored text template, which is used for every user input. However, in other examples, the prompt generation module 40 may select a stored text template from a plurality of stored text templates for each user input, based on information output from the first module 30. The stored text templates used by the prompt generation module 40 are also referred to here as "general prompts instructing the language model".

The stored text template is then combined with the user input to generate the system prompt. In this example, the user input text is appended on the end of the stored text template. The system prompt in the first iteration of the example dialogue therefore is:
"About You:
You are an AI assistant using techniques from psychotherapy to help the user better understand their problems and improve their symptoms.
Context:
You are engaged in a conversation with the user and will ask them how they are feeling and what they are thinking about, much like a psychotherapist might do during a session.

Your Goal:

Your goal is to help the user get better. To do this, you will employ techniques from psychotherapy, like cognitive restructuring. Other AI assistants will monitor the user's responses and will add further information to the user's input. For example, an AI assistant may append "#Distorted thought #" to the user input, which would indicate that the user needs cognitive restructuring, alternatively "#Not distorted #" may indicate that no restructuring is needed. You can use the AI assistant's inputs to decide how to continue the conversation and whether to begin a specific technique.

Further Information about Your Available Techniques:

The goal of cognitive restructuring is to guide the user step by step through reflecting on their thoughts and beliefs. The user is encouraged to think about the evidence supporting their thoughts and generate an alternative view that provides the best fit with "objective" external experience. The objective of cognitive restructuring is to raise doubts in the client's mind about long-held maladaptive beliefs (e.g., "People will notice I'm anxious and think there is something wrong with me") and to consider the accuracy and utility of an alternative perspective (e.g., "People might notice I'm a little anxious but consider it unimportant").

User: "Everybody hates me" ###DISTORTED ###."

In this example, the prompt generation module 40 generates the system prompt from a text template which is general prompt instructing the language model 21 and is a stored prompt component, followed by a user entry. The system prompt may be post-processed before being provided to the language model 21.

In S304, the above text corresponding to the system prompt is taken as input to the second module 20. The second module 20 comprises a language model 21. The language model is a large language model. The language model 21 is a generative model. The language model is a general language model. The language model provides as output a system response—in other words text that is to be output in response to the user input.

In this example, the generated system response is:

"I understand that you're feeling like everybody hates you. Let's try to examine this thought more closely and see if we can find a different perspective. What evidence do you have that supports the idea that everyone hates you?"

Various large language models are known and can be used, for example large GPT models, such as GPT-3.

Figure 5:
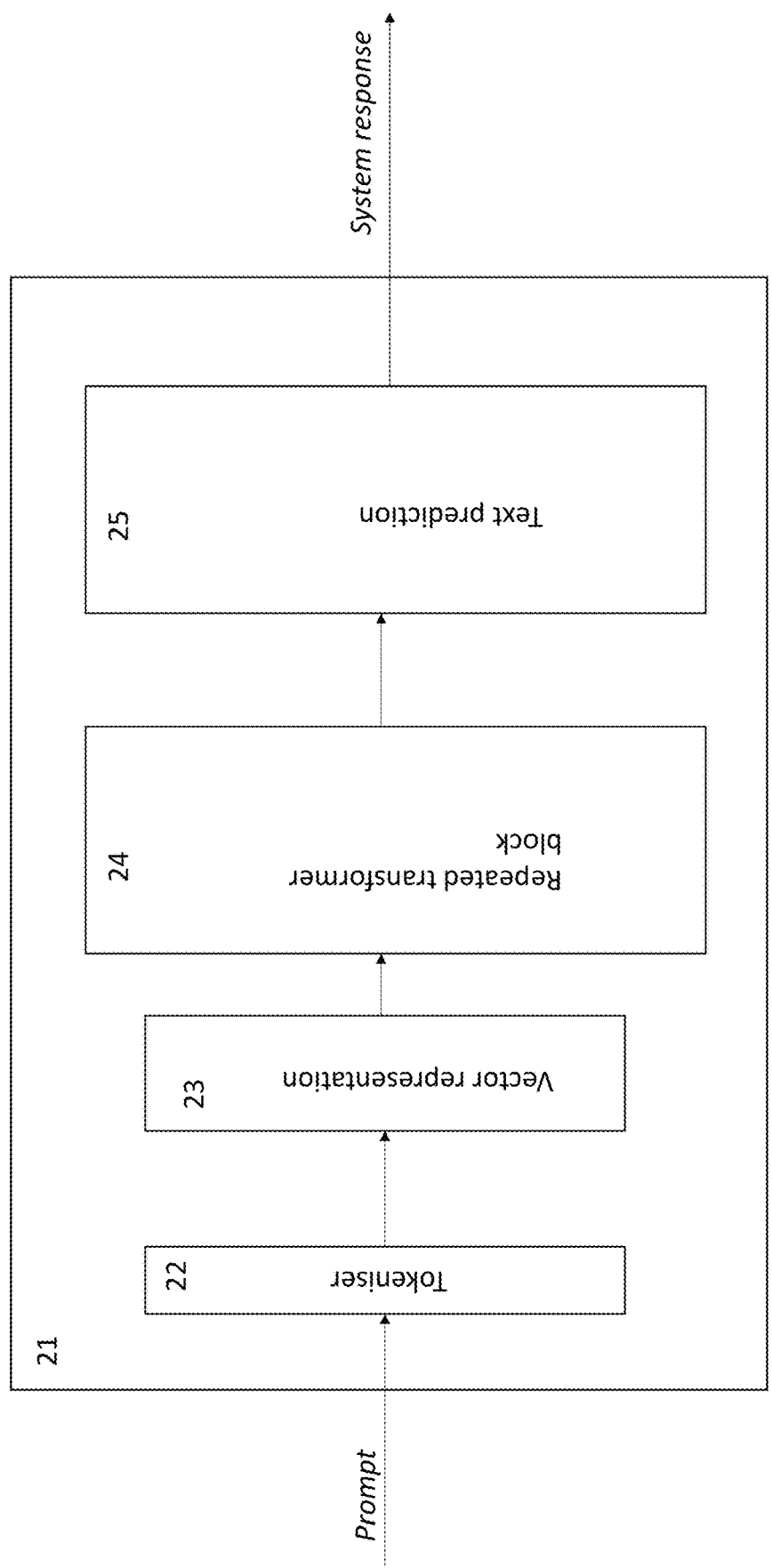
FIG. 5 is a schematic illustration of an example language model that may be used in this example.

FIG. 5 is a schematic illustration of an example language model 21 that may be used in this example. In this example, the language model 21 comprises a transformer decoder. The language model 21 comprises a plurality of attention layers. Other types of language model may be used. For example, a language model based on a recurrent neural network may be used.

The system prompt is taken as input to a tokeniser 22. The tokeniser 22 takes the input text and outputs a sequence of tokens representing the text, from a vocabulary of possible tokens. Special tokens, such as tokens representing a start or end, may also be included in the vocabulary. Each token may be represented by a different positive integer number for example. The tokeniser 22 outputs a sequence of numbers corresponding to the input system prompt. The number of tokens in the sequence will vary between different input prompts.

The sequence of tokens is taken as input to a vector representation module 23. The vector representation module comprises stored token representations. Each token representation is a stored vector, where each vector corresponds to a token from the vocabulary. For each token in the input sequence of tokens, the corresponding token representation is retrieved.

The vector representation module may further comprise stored positional representations. For example, each positional representation may be a stored vector corresponding to an absolute position in the sequence of tokens.

For each token in the input sequence, addition of the token representation and the positional representation is performed, to produce a single vector corresponding to the token. This sequence of vectors is taken as input to a repeated set of transformer blocks 24. In particular, the sequence of vectors populates an input matrix, where each vector from the sequence populates a row (any remaining rows being populated with zero values).

Each transformer block comprises an attention module, followed by an addition and layer normalisation, a feed forward neural network and a second addition and layer normalisation. The attention module may be a self-attention module. The attention module may be a multi-headed attention module.

Each attention module comprises three stored matrices of weights. These are trainable parameters of the language model 21. In particular, each attention module comprises a key weight matrix, a query weight matrix and a value weight matrix. When the input matrix is taken as input to the first transformer block, a key matrix is calculated as the matrix product of the input matrix with the key weight matrix, a query matrix is calculated as the matrix product of the input matrix with the query weight matrix, and a value matrix is calculated as the matrix product of the input matrix with the value weight matrix. For a multi-headed attention layer, each of the query matrix, key matrix and value matrix is then split into separate matrices, one for each attention head, along the column dimension.

Scores are then calculated for each attention head. A matrix product is calculated between the query matrix and the transposed key matrix for each attention head. The scores represent, for the token being processed (the score matrix row), the attention of the model on each other token in the sequence (the score matrix columns). A higher score corresponds to more focus on the token.

An attention mask is then applied to the output score matrix for each attention head, to mask out the scores corresponding to future tokens. A softmax function is applied to the result, giving a final score matrix for each attention head. The matrix product of the score matrix with the value matrix is then taken for each attention head. The outputs from the attention heads are then merged. The matrix product with a stored projection matrix is taken, to give the output of the attention layer.

This output is taken as input to a first addition and layer normalisation module, in which an element wise addition is performed with the input matrix and a layer normalisation performed on the result. The feed forward neural network is then applied. Each row (corresponding to a token) from the output of the addition and layer normalisation module is taken as input separately to the neural network, so that a sequence of vectors is output from the neural network. A nonlinear activation is applied in the feed forward layer. The output from the neural network module is taken as input to the second addition and layer normalisation module, which performs an element-wise addition with the input to the feed forward neural network module, and then a layer normalisation. The output of the second addition and layer normalisation module is formed into an input matrix and taken into the next transformer block.

The language model 21 is run to predict the next word in a sequence of text. A vector comprising the values from the row corresponding to the last token in the input text in the final matrix output from the repeated transformer block 24 is thus taken as input to the text prediction module 25, in order to predict the next token in the sequence.

In the text prediction module 25, the matrix product of this vector with a matrix of the stored token representations is taken. The result corresponds to a score for each token in the vocabulary. A softmax function is applied to the output, to produce a vector of probability values, each value corresponding to a token in the vocabulary. This represents the probability that the next token in the sequence corresponds to each token in the vocabulary. The next token in the sequence is predicted based on the output probabilities. For example, the token having the highest probability may be selected, or a token may be sampled based on the probabilities.

The predicted token is then appended to the sequence of tokens corresponding to the input system prompt text, and the result is taken again as input to the language model 21, to predict the next token in the sequence. This process is repeated, until a pre-defined maximum number of tokens is reached, or until an end token is outputted. The tokens are then converted into the corresponding sequence of text—this is the system response.

In S305, the system response is output to the user. The next user input is then received in response. The method then returns to S301 to process the next user input. The conversations with the user may contain specific exercises. For example, these might include thought and mood records that produce information about what the patient is thinking, doing, and how they are feeling. These exercises can also be more directly targeted at improving symptoms, for example through behavioural activation, or through thought challenges.

In the above described method, the cognitive distortion understanding model 300 is trained on less data than the language model 21. This is because the cognitive distortion understanding model 300 is focused on a particular aspect of the clinical process-cognitive distortions. It can therefore be trained only on utterances labelled with cognitive distortion information. Furthermore, the cognitive distortion understanding model 300 has a smaller number of trainable parameters than the language model 21. For example, the cognitive distortion understanding model 300 may have of the order of hundreds to tens of thousands of trainable parameters whereas the language model 21 may use between 10-500 billion parameters and consume many terabytes of text data. In this example, the cognitive distortion understanding model 300 has 31000 trained parameters. The language model has 175 billion trained parameters.

The combination of one or more clinical, mechanistic models (such as the cognitive distortion understanding model 300) with a large language models provides improved computational efficiency compared to using a single large language model to accomplish the same task. In an example, a dataset of N=120 patient thoughts, which clinicians had labelled as "distorted" or "undistorted", with both categories comprising 60 samples. Within clinical settings, a clinician will often try to engage in "cognitive restructuring" if they notice a distorted thought (e.g. a statement like "nobody likes me") and will aim to softly challenge this thought. To recreate this setting in a way relevant to this patent, it was compared whether an LLM alone, which was instructed to engage in cognitive restructuring if it discovers a distorted thought, would perform better or worse than an LLM which was similarly instructed, but additionally received the predicted label (distorted versus undistorted) from a mechanistic model trained to identify distorted thoughts. The combined model correctly engages significantly more often in cognitive restructuring compared to a language model alone, as indicated by a chi-square test on the full output frequencies of the two models (chi-square(3)=15.77, p<0.005), leading to a much improved F1 score for distorted thoughts (0.55 versus 0.31). Augmenting the large language model with further information supplied by clinical models improves performance over the use of the large language model alone.

An example method of training the language model 21 will be described. However, various other methods may be used. Furthermore, various pre-trained large language models are known and available, such as GPT based language models, and these may be used in the dialogue application 102 as the language model 21, without further training.

Various datasets for training language models are known. For example, the language model may be trained using a dataset comprising a large number of web pages, such as the "WebText" dataset for example. The dataset may further comprise data from other text sources as well. The training data is general text data, in other words it is not specific to the dialogue application 102.

During the training process, sequences of text from the training dataset are processed by the language model 21 in the same manner as described above. The language model 21 comprises a number of trainable parameters, which can be expressed as a vector $\theta$. The parameters include the token representation vector values, the position representation vector values, the attention layer weights and the neural network layer weights for example. The parameters are randomly initialised. The update process searches for a parameter vector $\theta$ so that the difference between the next token in the sequence extracted from the dataset and the prediction of the next token made by the language model 21 is minimised. A process of updating $\theta$ sequentially by computing the gradient of a loss function and updating $\theta$ using the computed gradient and an optimiser function is performed. A cross entropy loss may be used, in which:

$$L = -\sum_{v=1}^{V} y_v \log \hat{y}_v$$

where $y_v$ is the vth entry from a one hot encoding representing the next token in the sequence and $\hat{y}_v$ is the vth entry from the vector of probability values output from the language model 21. The gradient of the loss L with respect to each of the trainable parameters of the language model 21 is determined through back-propagation. The gradient is then used to determine the updated parameters, using an optimiser function.

This family of update methods is known as gradient descent (GD), generally defined iteratively as:

$$\theta = \theta - \mu \frac{\partial L}{\partial \theta}$$

where $\mu$ is the learning rate, which defines how quickly the parameters are updated. An AdamW optimization algorithm may be used for example. This process is performed for each sequence extracted from the training corpus. The update may be performed in batches, based on a batch average.

In the above described example, the language model 21 is trained on general data and then used in the dialogue application 102. However, in some examples, further fine-tuning training of the language model 21 may be performed. In such fine-tuning training processes, example user inputs and therapist responses are used as training data. The fine-tuning training process then updates the language model 21 so that the system output matches the therapist responses as closely as possible. The fine-tuning training may be used for a specific goal-directed dialogue application 102 dealing with specific user-groups, for example children, where the language model 21 may be fine-tuned for their needs.

Figure 6:
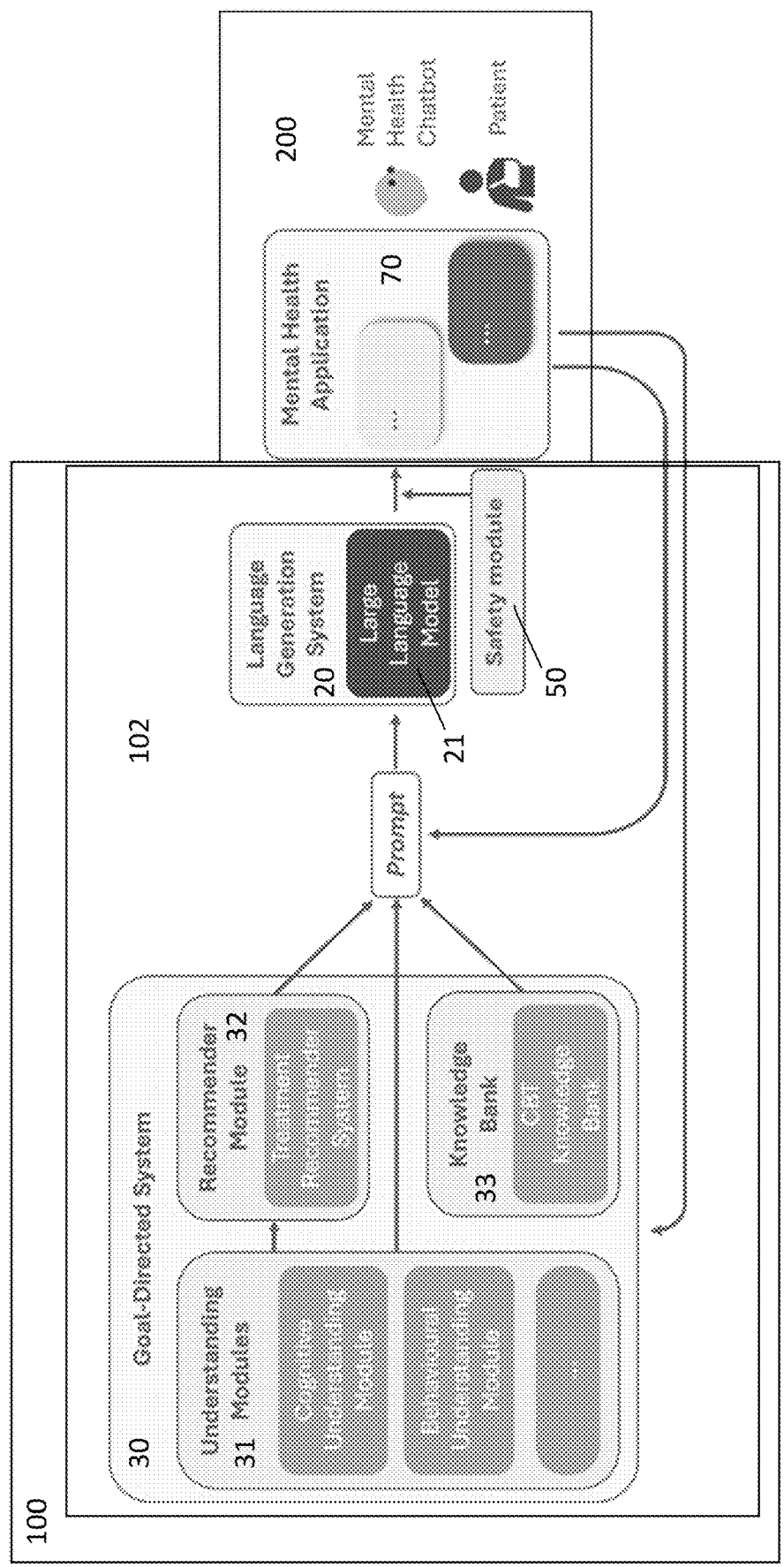
FIG. 6 is a schematic illustration of a dialogue application according to another example, that may be stored and executed by a dialogue system as described in relation to FIG. 1.

FIG. 6 is a schematic illustration of a dialogue application 102 according to another example, that may be stored and executed by a dialogue system 100 as described in relation to FIG. 1. Execution of the dialogue application 102 will cause methods as described herein to be implemented.

In this example, the dialogue system comprises a first module 30, which is a goal-directed system. The first module 30 comprises a subject understanding module 31, comprising a cognitive understanding module. The cognitive understanding module 31 may comprise a cognitive distortion understanding model 300 as described previously. The subject understanding module 31 further comprises a behavioural understanding module. An example behavioural understanding module will be described below. The first module 31 further comprises a knowledge bank 33.

The knowledge bank 33 comprises stored therapy-related knowledge. As has been described previously, the input text data from the user is provided to the first module 30. As well as being provided to the subject understanding module 31, the input text data is also provided to the knowledge bank 33 in this example. The user input text data is compared to each entry in the knowledge bank 33. A similarity measure is generated, for each entry in the knowledge bank 33. The similarity measure may be generated by embedding the input text using a language model, embedding all reference entries in the knowledge bank 33 using the same language model, computing the cosine similarity (or some other similarity measure) between the input embedding and all reference embeddings. Other methods may involve regex matching or word frequency comparisons. One or more entries corresponding to the highest similarity scores are selected. For example, the five most similar entries are selected. These are included in the system prompt. For example, the text corresponding to the entries is appended to the end of text template and before the previous user input text in the system prompt. The system prompt including the most similar entries from the knowledge bank is then taken as input to the language model 21. In this way, the language model 21 can ground its answers in this knowledge. Although in this example, the knowledge bank comprises clinical knowledge, in some examples it may alternatively or additionally comprise further background information, such as patient information. For example, in this example, patient information 35 is described as an input to the recommender system 32. However, this information may alternatively be included in the knowledge bank 33.

The dialogue application 102 in this example further comprises an output safety module 50. The outputs from the language model 21 are checked and monitored by an additional safety model 50. The safety module 50 contains one or more machine learning modules that evaluate the quality and safety of the utterances of the LLM.

For example, the output safety module 50 may search the system response text output from the language model 21 for a pre-defined set of specific words and/or phrases. This search is performed before the system response text is output to the user. For example, the module may apply a set of one or more regular expressions to detect words and/or phrases. If a word or phrase is detected, the safety module 50 prevents the language module 21 from providing the output to the user. The safety module 60 may then edit the system prompt and input the edited system prompt in the language model 21. The safety module 60 may hand over to a rules based dialogue flow or a human operator for example. The safety module 60 may send the user input to a therapist, for example by sending an email, text, phone call or other kind of alert using stored contact details of a therapist.

The safety module 60 may additionally or alternatively comprise a trained model. For example, the trained model may be a feed forward neural network, taking in the system response text, and classifying with a label (e.g. "risk", "no risk"). The model is trained by using a dataset of user utterances labelled with "true" labels by trained raters. The loss function may be cross-entropy loss. Again, if a risk is detected, the language model 21 is prevented from outputting the system response to the user. In some examples, a prompted large language model may be used, for example by asking the model whether something is "on topic" compared to a desired topic. The language model may be validated using a labeled dataset and internal testing.

As a delivery platform, a mental health app 70 where patients interact with a mental health chatbot through text conversations is provided. As shown in FIG. 6, a chatbot interface 70 is shown. The chatbot presents text to the user of a user device 200 and allows responses to be input by the user, for example in text format inputted via a physical device control or a device graphical user interface 120 (for example, using an "on-screen" keyboard), or by voice. The user device 200 as shown in FIG. 1, may be a mobile smartphone or tablet computer, desktop computer, laptop computer, smart televisions or displays, augmented reality devices, virtual reality devices, smart speakers, etc. The chatbot interface 70 can be used to converse with the user or prompt the user to enter thought records for example. The interface 70 may interact with the user at predetermined times, or at predetermined time intervals, or in response to certain activities performed on the user device 200 e.g. after the completion of a voice or video call, or upon detecting certain keywords being entered via the user interface 70 or upon detection of certain physiological signals via sensors in the user device 200 or another device in communication with the user device 200 such as a smart watch or other physiological sensor.

In the above described example, the output of the first module 30 is provided to the language generation system 20, which provides an output to the user via a chatbot for example. However, one or more outputs from the first module 30 may additionally be used to provide other system outputs. For example, such outputs may be used to schedule an intervention action to be performed on the user device—for example a sleep intervention if sleep problems are detected. Such outputs may be used to feed-through the user input to a therapist, for example by sending an email, text, phone call or other kind of alert using stored contact details of a therapist. Such outputs may be used to trigger an immediate follow-up to the user input, e.g. a though-challenging exercise.

In some examples, an assessment or treatment plan may be generated after an interaction with the dialogue system 102 comprising a plurality of dialogue turns. This may then be presented to a therapist, or a patient management system.

In one example, the first module 30 reports results. The results may be reported to a therapist or medical professional. For example, if a potentially distorted thought is detected, this thought may be flagged in a report for review by a therapist or medical professional in order to make them aware of the distortions their patients are experiencing. Moreover, the frequency (overtime) of different distortions for each patient may be aggregated in the report in order to enable the therapist to track the occurrence of these distortions over time. Reports can be generated at regular frequencies or on-demand for the therapist or medical professional. The reports may comprise all data collected by the first module 30 and any corresponding evaluations made by the subject understanding module 31. Alternatively, the reports may comprise a subset of the data collected and/or a subset of the evaluations. For example, prior to providing the reports, noise may be filtered out such that the reports contain key events only. In other words, reports may selectively provide diagnosis information to a therapist or medical professional.

An output of the first module 30 may be provided as an input to action logic, for example, after a plurality of dialogue turns. The action logic be configured to select an action to perform responsive to the output and/or to cause performance of an action in response to the output. For example, as described above, the action may be transmission of the output to a user or a third party. The action logic may be configured to generate a treatment pathway (or "plan"), schedule appointments with clinicians or to establish a communication with one or more third parties, such as a clinician or an emergency service. For example, the action logic may be configured to establish a communication channel between the user and a clinician or an emergency service or between a clinician and an emergency service and may transmit the output to the one or more third party. For example, a user may be allocated to a predetermined treatment pathway depending on any detected cognitive distortion. For example, allocation to a treatment pathway may be performed by the action logic. A predetermined treatment pathway is the route through which the patient is seen by a mental health care professional. There may be several different pre-programmed treatment pathways. For example, a treatment pathway for patients that are prioritised for early treatment so that they are seen by a mental health care professional within 2 weeks, or a treatment pathway for patients whose condition is relatively mild and who could be seen by a mental health care professional within a longer wait time of 8 weeks. The mental health care service may be informed of the user and their allocated treatment pathway by the action logic. The user can then be seen by a mental health care professional according to their allocated treatment pathway. The action logic may be configured to prioritize some users for treatment based on the output.

As discussed above, the action logic may be configured to generate a treatment plan. For example, if a cognitive distortion is predicted to be present by the subject understanding module 31 after a plurality of dialogue turns, a corresponding treatment plan may be generated. A treatment plan for an individual may include a listing of one or more parameters for treatment of the individuals. The parameters may include, for example, a schedule of treatment (e.g., a schedule of calls/visits to a mental health care professional), schedule of input (e.g., a schedule of prompting the individual for input of a specific type of information). Treatment of an individual may include treatment in accordance with parameters specified by a treatment plan for an individual (e.g., conducting calls/visits to a mental health care professional in accordance with a treatment plan schedule, prompting the individual for input of a specific type of information in accordance with the treatment plan schedule, and so forth). In some examples, a system (e.g., system 100) automatically schedules or contacts relevant parties for treatment in accordance with treatment plan parameters. For example, the system may automatically schedule an appointment for a meeting between an individual and a mental health care professional in accordance with a treatment plan schedule. For example, a corresponding treatment plan may be generated upon a threshold number of distortions being predicted. The threshold may be with respect to all cognitive distortions or only specific cognitive distortions. In examples in which the threshold is with respect to specific cognitive distortions, the generated treatment plan may correspond to the specific cognitive distortions.

Figure 7:
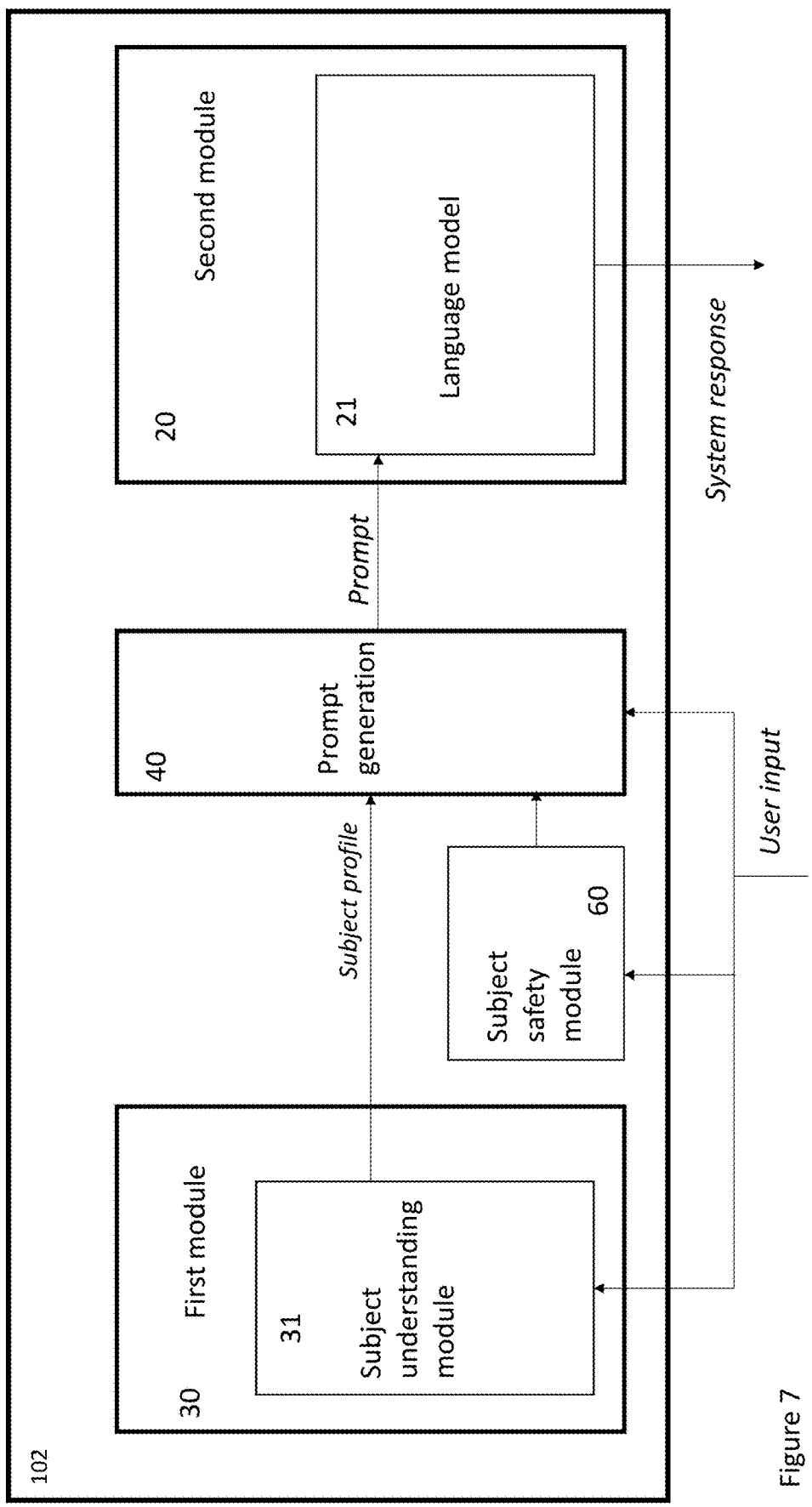
FIG. 7 shows a schematic illustration of a dialogue application comprising a first subject safety module, which acts on the user inputs.

FIG. 7 shows a schematic illustration of a dialogue application 102 comprising a first subject safety module 60, which acts on the user inputs. The other components of the dialogue application 102 have been described above.

The safety module 60 may comprise one or more safety models.

For example, the safety module 60 may comprise a crisis detection module. Each user input text is provided to the crisis detection module. The crisis detection module is thus applied to each user utterance. The crisis detection module comprises a trigger word system, which searches the user input text for a pre-defined set of specific words (e.g. "suicide") and/or phrases. For example, the crisis detection module may apply a set of one or more regular expressions to detect words and/or phrases in the user text input. If a word or phrase is detected, the safety module 60 prevents the language module 21 from providing a further output to the user. In this example, the safety module 60 outputs an indication to the prompt generation module 40 that a further prompt should not be generated. The safety module 60 may provide output text to the user based on a stored text template associated with the detected word and/or phrase. For example, each word and phrase in the pre-defined set has a corresponding stored text template, which is output to the user if the word or phrase is detected. The text template may comprise information sign-posting options for support, for example a phone number that the user may dial. In some examples, the safety module 50 may trigger a specific dialogue flow, asking if the user needs immediate support and providing sign-posting. For example, the safety module 50 may trigger a rules based dialogue flow.

The safety module 60 may additionally or alternatively comprise a trained model. For example, the trained model may be a feed forward neural network, taking in the user text input, and classifying with a label (e.g. "risk", "no risk"). The model is trained by using a dataset of user utterances labelled with "true" labels by trained raters. The loss function may be cross-entropy loss. Again, if a user input that is a risk is detected, the language model 21 is prevented from outputting a system response to the user. In some examples, a prompted large language model may be used, for example by asking the model whether something is "on topic" compared to a desired topic. The language model may be validated using a labeled dataset and internal testing.

In the example shown in FIG. 6, the first module 31 further comprises a recommender module 32. In this example, the first module 30 further comprises a subject recommendation model 32 configured to take as input the subject profile information output from the understanding module and provide as output a subject recommendation, wherein the system prompt is generated using the subject recommendation. In one example, the task of this recommender system 32 is to choose from a number of interventions defined by CBT in order to maximise patient outcomes, for example measured by therapeutic alliance and recovery rates. The recommender module 32 outputs one or more identified interventions. This may then be included in the system prompt. It may be included either as a text suggestion, generated by retrieving a stored text template and including the intervention in the template (for example "The recommended course of action would be to perform intervention X"), or implicitly by labelling user inputs.

The recommender module 32 may comprise a trained neural network, for example a transformer-based or a multi-layer feed-forward network, or, a tree-based classifier model for example. As loss function, a cross-entropy loss may be used for multi-class classifiers, where the input could be a user utterance, and the output a class label. The class labels may correspond to different types of intervention. In other examples, reinforcement learning may be used, which would be beneficial in systems with multiple steps and a clear metric of success e.g. therapeutic alliance. The recommender module 32 may initially be trained separately. For instance, by learning from which interventions clinicians prescribed patients and how well these have worked. The recommender module 32 may in alternative examples be a heuristic model, based on clinical knowledge. Over time, the recommender system 32 could also be trained together with other models in the dialogue system, including for example the language model 21.

The recommender module 32 may take as input the output of the subject understanding modules 31. The recommender module 32 may also take further information as input, for example patient information 35, and/or information from a history module 37. In some examples, the recommender module 32 may also take as input the user utterance, or multiple previous user utterances. This information may be provided through the history module 37, which may act as a kind of filter, which has access to the entire conversation history of a patient, but only selects the most relevant exchanges. For example, this could apply a "recency" filter, which always outputs the last N user utterances. As another example, the history module may also take as input general information about the user or subject, such as medical history, or demographic data.

An example recommender module 32 which may be used in the dialogue application 102 will now be described. The recommender module 32 uses a machine learning based recommender system within the context of mental health treatment. The task of this system is to adaptively choose interventions for mental health disorders within the context of an electronic application, such as a mental health chatbot. Outside of inputs for such a system like demographics and questionnaires, the recommender module 32 may use two kinds of main inputs to drive the system: (1) machine-learning models capturing a mechanistic understanding of the patient's disorder—the subject understanding module 31 and (2) a representation of the patient's treatment history 35 that takes into account uncertainties about the current problem description. To achieve the long-term goal of patient outcomes with a fine-grained signal, the recommender system 32 may optimise for three types of metrics: (1) therapeutic alliance, a measure that captures how well the patient connects to and feels understood by a therapist and is a key predictor of therapeutic success. This information is also weighted against (2) patient outcomes and (3) information gain.

Recommender systems are a class of machine learning techniques that broadly aim to present items to a user in a personalised manner. These systems are used in many applications, for example driving the suggestion of videos on a streaming service, posts on social media or items in online shopping. Despite being implemented diversely, recommender systems (RS) share a common goal: to automatically maximise some outcome measures. In an online setting, this outcome is often simply measured by basic engagement metrics, such as the click-through or purchase rate. More complex systems still attempt to maximise metrics but might attempt to balance engagement and purchasing decisions with several different, possibly conflicting metrics. For example, a streaming service might want to optimise for both time of music played as well as diversity in music presented. Most recommender systems can be placed on a continuum between two types of systems: (1) those that base their decisions based on similarities between items and (2) those that place those recommendations on similarities between users. While pure cases of this distinction might exist, most systems will rely on a mix of both, combining insights both about items and users to drive recommendations. As a class of techniques, recommender systems are not limited to one specific 'learning' approach within machine learning. Instead, they can theoretically be implemented in a supervised, unsupervised or reinforcement learning based manner. Indeed, many real-world recommender system implementations rely on a mix of these approaches. For example, an unsupervised learning approach might be used to identify user groups or to create a more latent representation of a user. This representation might then be used as an input variable for either a supervised learning model that tries to predict a metric based on past user interactions, or a reinforcement learning based system which might use these representations to explore or exploit its action space.

Outside of purely consumer-focused applications, recommender systems may also be used in a health setting. Here, the aim of the system shifts from pure optimization of customer success to optimising a patient outcome. As such, recommender systems may be used to deliver personalised health care and hold promise to improve patient outcomes significantly. Recommender systems can not only be used to treat more typical physical maladies in a more personalised fashion but can also be applied to mental health. One such use case is within the context of mental health mobile applications. There, personalization that can drive engagement is particularly important: due to the nature of their disorders, the mental health patient population can often suffer from low motivation, making an engaging product crucial. As a result, and due to poor personalisation, low engagement and uptake of such applications can follow, significantly reducing their chances to help with symptom alleviation.

Mental health recommender systems may focus on specific subtasks within psychotherapy. For example, a mental health recommender system domain is behavioural activation, a technique to alleviate symptoms, particularly in depression. The idea behind behavioural activation is to engage in activities that increase the patient's wellbeing short- and long-term, and more broadly to get the patient to become more active. As a result, behavioural activation recommender systems have aimed to optimally deliver recommendations of such activities in a personalised manner.

Similar specialised recommender systems may also drive recommendations for activities in an obesity context or for stress management.

The example recommender module 32 described here provides a more general recommender system for treatment delivery. It aims to optimally and automatically deliver a diverse set of interventions and exercises during the course of a mental health treatment within the context of a mental health application. Optimally, a recommender system used in the context of a mental health application would aim to optimize for the patient's outcome. Thereby, patient outcomes are a complex concept, encapsulating different timescales and levels of granularity. With a longer term view in mind, therapeutic success might be defined as an absence of a relapse into illness over a longer period of time. Even more broadly, it would encapsulate all aspects of a former patient's life, for example in line with the World Health Organisation's mental health definition ("a state well-being in which an individual can realize his or her own potential, cope with the normal stresses of life, work productively and make a contribution to the community"). Recommender systems however require relatively frequent and well-defined feedback signals. Thus, while the WHO's definition is a useful abstract aim, it is also both hard to operationalize and temporally sparse. Temporal sparsity also applies to relapse rates which can often only be assessed long after therapy. This makes directly using such broad metrics unrealistic for a mental health recommender system.

Instead of such broad longer term metrics, a recommender system might therefore optimize more myopically and more specifically. Here, several possibilities exist, ranging from moment-to-moment mood ratings to more machine-learning driven insights about the patient's wellbeing during therapy. However, even those metrics are likely to be very noisy, partially rely on self-report (rather than revealed preference), and can only be assessed at medium frequencies. Therefore, the recommender module 32 focuses beyond pure patient outcomes as success metrics.

Whether for interaction with a human or digital therapist, a key consideration for therapy success outside of pure patient outcomes is therapeutic alliance. Therapeutic alliance is a term (and metric) that encapsulates many aspects of interpersonal relationships between a therapist and patient, and is conceptually independent from more explicitly disorder related measures of therapy success. Despite this independence, there is consensus in the literature that high therapeutic alliance represents a key predictor of successful psychotherapy. In other words, if the patient feels like they are understood and respected by the therapist and that the therapists suggests useful interventions, symptom improvements are more likely.

The connection between therapeutic alliance and patient outcomes makes it important to consider therapeutic alliance as one of the, if not the most important, metric to optimise for a longer-term mental health recommender system. Particularly in the context of the mental health patient population, maximising therapeutic alliance should also be key to reduce churn and drive longer term user engagement. This will in turn be key to deliver quality digital mental health care over the long run. A further advantage of using therapeutic alliance as a key metric is that it can be measured at a higher temporal frequency than other, direct patient outcome measures. For example, therapeutic alliance might be measured through lower-level activities such as app opens, or engaging with a single recommendation. Both of these are 'free' signals an application can derive from any user without further disruption, and these measures should closely correlate with the patient's feeling of being understood and respected by the mental health application. In contrast, measuring patient symptoms can be a more noisy and laborious process that requires both explicit measures (such as repeating questionnaires) and can fluctuate highly overtime.

Therapeutic alliance can be conceptualised both in terms of the application itself or in terms of the therapist that might work in concert with the application. The recommender module 32 here is focused on alliance with the application itself.

For inputs to the recommender module 32, a mechanistic understanding of the patient's disorder is used, based on qualitative models used in psychotherapy. These models are captured through machine learning systems. In general, the recommender module 32 is not limited to one particular way of modelling the patient's disorder. As such, both the most prominent psychotherapy approach of CBT can be used a modelling basis, but also others like psychoanalysis. Thus one or more subject understanding models as described previously feed into the recommender system 32.

Inherent within all recommender systems is a tension between exploitation and exploration. In this context, exploitation means that a recommender system, regardless of specific implementation, uses its current knowledge about the best possible items for a user. In turn, exploration means that the recommender system might suggest items where user preferences are yet unclear. For example, a streaming service might keep recommending the same well-liked show or try to expose its users to new, somewhat different content—about which it is uncertain but which might drive long-term engagement. More abstractly, while exploitation maximises short-term gain, it also comes at the expense of potentially missing out on more fruitful solutions—something that exploration can remedy.

The tension between exploration and exploitation is particularly relevant in the context of mental health delivery. That is, successfully suggesting an exercise does not only reveal whether the patient profits from this exercise or is likely to keep engaging with it (as would for example be the case in the streaming service example). In psychotherapy, exercises themselves are often aimed to aid in the therapist better understanding the patient and the patients better understanding themselves. As a result, each suggested exercise is a key source of fine-grained data about the patient. For example, letting the patient record their thoughts and moods might be both engaging and have a therapeutic effect. However, such thought and mood logs are a key data source for creating insights about the patient's thinking—which will in turn drive better insights in the long run.

As a result, a mental health recommender system may take uncertainties in these insights into account. For example, if part of the machine learning systems captures a patient's core beliefs through thought records, then the system should take into account how many of these thought records have so far been captured and how high the signal-to-noise ratio in each of these is.

Figure 9:
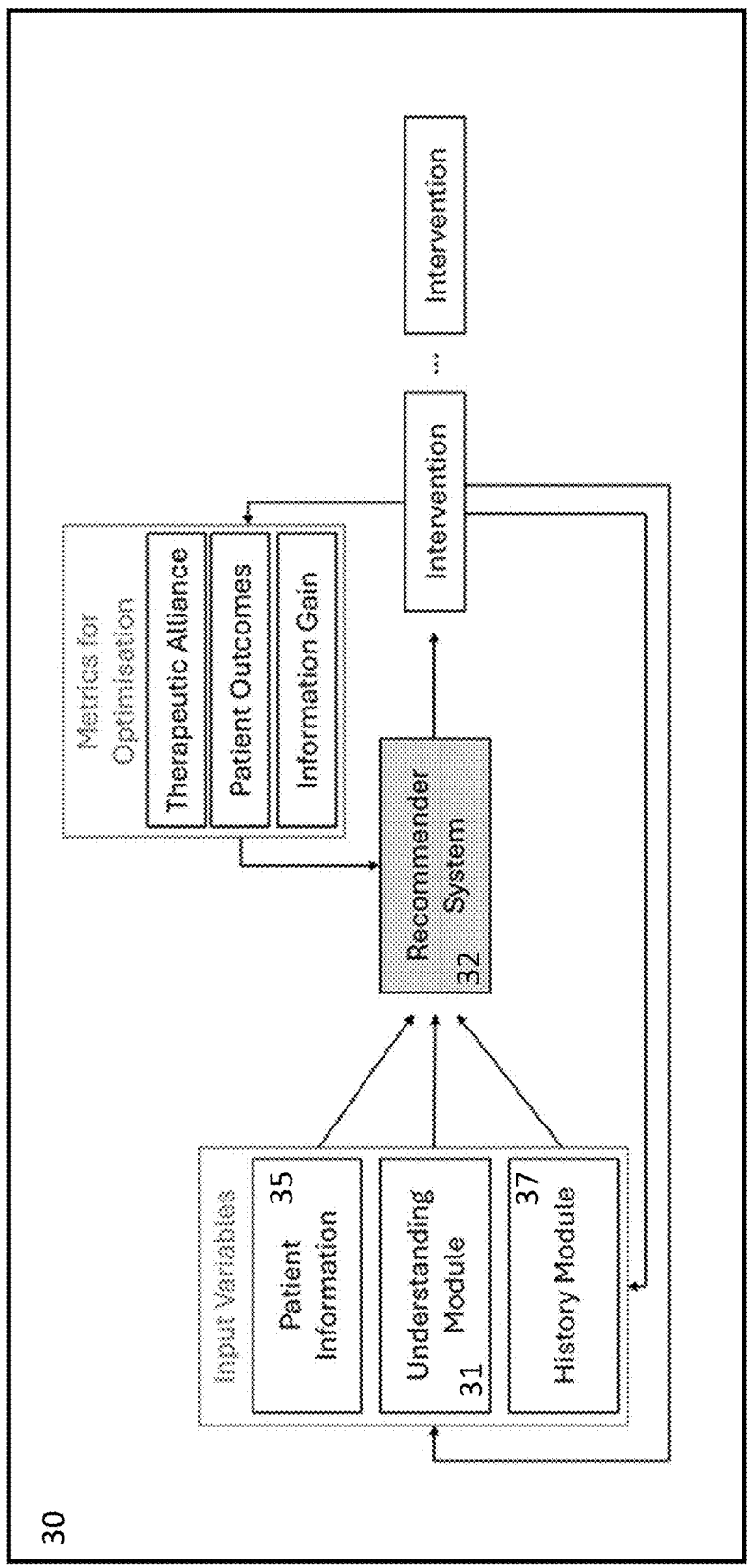
FIG. 9 is a schematic illustration of an example recommender module that may be used in the first module.

FIG. 9 is a schematic illustration of an example recommender module 32 that may be used in the first module 30. The output from the recommender module 32 may be included in the system prompt.

The example of this recommender model 32 is described as applied to CBT. The recommender model 32 uses the following three basic classes as input variables to the recommender system:

Patient information: This includes demographic information (e.g. age, location, . . . ), as well as more clearly grounded information, such as therapist diagnosis or questionnaire data. This information may be stored and retrieved for a specific subject.

Output from subject understanding module 31 as described previously: This contains information about the patient captured by machine learning models that quantitatively describe the patient's disorder in a mechanistic way. For example, this might contain information about the patient's distorted thinking and the activities they engage in. In a more explicit probabilistic setting, this information might be accompanied by quantified measures of uncertainty for each variable, like a standard error. This description might be rooted in existing psychotherapy such as CBT or psychodynamic approaches. However, these mechanisms might have also been purely created in a data-driven approach.

History module: This contains information about the current course and history of the treatment, such as previously completed interventions. In addition to explicit measures of uncertainty in the understanding module, this can also serve as an uncertainty measure, for example by containing the number of times and recency of specific interventions that underlie specific insights. This information may be stored and retrieved for a specific subject.

The inputs might be directly delivered to the recommender system 32. Alternatively, they might first be independently processed by unsupervised learning approaches to improve generalisation and avoid overfitting. For example, the treatment of a patient might be represented by a lower-dimensional representation created by a (variational) autoencoder or a PCA.

Once this information is fed to the recommender system 32, the recommender system 32 might engage in one or more of the following actions:

Suggest a single intervention/exercise for the next time step.

Plan a sequence of several next exercises.

This information outlining these actions may be included in the system prompt. These options are not entirely mutually exclusive: for example, a system that has a strong history representation, might end up producing sequences, despite only choosing single interventions.

Interventions will generally be chosen from a set of interventions typical within the psychotherapy framework used by the application. They may be selected in collaboration with trained clinicians. The recommender system 32 aims to select higher-level interventions (e.g. behavioural activation in general), rather than the specific implementational details of each action (e.g. meet with family). Such lower-level personalisations might also be served through more specialised recommender systems.

As discussed previously, the recommender module 32 may be trained separately initially. The knowledge generated by the suggested exercises may be fed back to the understanding module and thereby drive further patient insights in some examples.

The following three classes of metrics may be used as key targets for the recommender system 32:

Therapeutic alliance: This can encapsulate both basic short-term engagement with the app as well longer-term measures of trust, bond or understanding.

Patient outcomes: Like therapeutic alliance, patient outcomes can be measured both at a more temporally fine-grained level (e.g. momentary mood ratings or ML-derived insights) but also over longer time (e.g. via weekly questionnaires).

Information gain: These metrics capture how uncertain the understanding module might still be about specific insights derived by the understanding modules, for example via standard deviations of specific measures.

Furthermore, the recommender system 32 might be constrained by specific guardrails metrics.

Various methods of maximising these metrics, how these are weighted and how the recommendation process would be implemented may be used.

The recommender system 32 may work (autonomously) during psychotherapy itself. The recommender system 32 might be applied before in-person psychotherapy with a human therapist. Different levels of autonomy are possible, so that the recommender system 32 may work together with a therapist to different degrees during therapy itself. Both approaches may result in the recommender system 32 being adjusted in specific ways: For example, a purely waitlist focused version of the recommender system 32 might aim more to collect information for a therapist and stabilise the patient outcomes. Such a waitlist system might also have a restricted action space, for example mainly focusing on psychoeducation. When working in concert with a therapist during therapy itself, a version of this recommender system 32 might be equally restricted or prioritise different metrics.

The following outlines how such a system might be implemented in a mental health application that relies on cognitive behavioural therapy as its framework for understanding and treating a patient.

The inputs to a CBT based recommender system 32 are first described. The inputs might be input directly without further preprocessing, or might be first processed using unsupervised learning in order to reduce the dimensionality.

The patient information 35 not derived from machine learning may comprise the following:

1. Demographics

A number of different demographic and treatment variables may be used for driving the recommendation engine 32, including but not limited to the following:

Age

Gender

Ethnicity

Disability status

Receiving previous mental health support

2. Therapist Information

Information that would be entered by a therapist, for example:

Diagnosis

Intensity of treatment suggested

Length of treatment suggested

3. Symptom Measures

Standardised measures of patient symptoms (e.g. upon referral or entering therapy/waitlist) can also be used, for example:

Questionnaires assessing depression symptoms (e.g. PHQ-9).

Questionnaires assessing anxiety symptoms (e.g. GAD-7).

Questionnaires assessing disorder-specific other symptoms (e.g. PTSD, phobias, etc.)

Questionnaires can be input into the recommender system 32 at different scales. First, questionnaires can be used at the single item level. This might reveal specific aspects of a patient's disorder. Second, the questionnaire scores (i.e. summed over the entire questionnaire) can be used which might add more stability and provide a bigger picture. Finally, for additional noise-reduction and longer-term monitoring, averaging of questionnaires (in a weighted manner) if they have been administered several times can be used. The later two options might also be achieved implicitly via representation learning approaches, e.g. in a neural network.

An example subject understanding module 31 will now be described. A core principle of CBT is the recognition of a reciprocal relationship between patients' cognitive processes (what they think) and their affect (emotional experience), physiology, and behaviour. The interactions of cognition, emotion, physiology and behaviour is thereby driven by core beliefs which result from earlier life experiences and instantiate under specific (stressful) situations. Therapeutic interventions in CBT focus on changing the resulting cognitive and behavioural patterns in order to reduce symptoms. Thus, a key component of a CBT based recommender system 32 is to understand the individual subcomponents of this qualitative disorder model in a more quantitative manner. This will then allow the targeted delivery of CBT interventions.

Outputs from the following machine learning subject understanding models may be taken as inputs to the recommender system 32:

- A behavioural patterns model that captures the activities the patient engages in, their frequency and how they impact the patient's mood;
- A cognitive distortions model that captures how distorted a patient's thoughts are;
- A core beliefs model that captures the key schemas underlying their thinking;
- A topic model that captures in which life areas these schemas surface.

Furthermore, physiological symptoms may be captured through a mobile device (e.g. smartwatch/-ring) and the patient's activities tracked using smartphone metrics like gyrometers, screen time or location. This would allow to capture the physiological aspects of a patient's disorder and gain deeper insights into their activities.

For tracking uncertainty, each of these measures can be presented with a (proxy) measure of variance, for example the standard error of a parameter, or the number of times an intervention has been administered that provides information about a parameter.

A history module 37 can contain information about the current course and history of the mental health treatment. This might for example be achieved via a running history of the exercises delivered (treatment at time t–1, t–2, etc.) or via counts of individual exercises. Here, the history module serves two purposes: it represents what the patient has already completed, thereby reducing redundancies and it serves as a proxy measure of uncertainty (as discussed above).

An action set defines the possible treatments/exercises the recommender system 32 can suggest to the patient. Hereby, the recommender module 32 described here uses a set of interventions previously established by CBT. These can be grouped into specific subcategories with the help of trained clinicians. As noted, this recommender system 32 aims to select from higher-level actions, rather than the specific implementational details of each action. Such groups for higher level actions might comprise of:

Behavioural activation
Mood Logs
Thought Logs
Thought Challenging
Psychoeducation
About cognitive distortions
About core beliefs As previously discussed, it is challenging to assess patient outcomes on a fine-grained level, and therapeutic alliance as well as information gain are important metrics to take into account when choosing the optimal intervention from the action set. Next, it will be discussed how these aspects might be captured more specifically.

Therapeutic Alliance

Therapeutic alliance can be broken down into roughly three categories:

Goals: The patient and the therapist agree on the goals of the treatment;
Tasks: The tasks that the therapist assigns to the patient are perceived as useful;
Bond: The patient feels like there is mutual respect and appreciation.

This can be broken down to the following attributes of interacting with a mental health application:

User activity: This category describes general engagement of the user with the app which can be measured by low-level interaction with the application. Examples include application opens, reactions to push notifications, time spent in app.
User acceptance of suggestions measures how likely a patient is to accept an intervention delivered via the recommender system. This can be measured both by initial acceptance of a suggestion (e.g. via click-through-rate or an equivalent measure in a chat situation) or successful completion of this suggestion.
Utility ratings are a more explicit measure of user acceptance and might be captured by pre- and post-task questions about how useful the patient perceives an intervention or whether the liked it more broadly.
General utility ratings: Apart from short-term measures of therapeutic alliance, longer-term trust and bond may be assessed using questionnaire measures.

Patient Outcomes

Patient outcomes can be captured through three different categories of signals:

Explicit short-term assessments of mood/emotional state. A mental health application can explicitly ask the patient about their current emotional state and rely on this self report as a moment-to-moment measure of patient well-being
Explicit long-term assessment of patient well-being can be assessed through questionnaires that cover symptoms. Here, both more general symptom questionnaires as well disorder specific questionnaires can be employed
Implicit machine learning measures: Through a suite of machine learning models it is possible to gain specific insights into the state of the patient's disorder.

Information Gain

An important aspect of many exercises in therapy is helping therapists and patients better understand the mechanisms underlying symptoms. Two aspects of information gain can be conceptualised:

Certainty within the understanding module: Capturing latent mental health constructs is naturally a noisy process. This can for example be measured through the standard error or entropy associated with specific model parameters or predictions in the understanding models.
Metacognitive insights by the patient describe more explicit measures of how well the patient might (feel)

they understand themselves. This is an important goal of CBT and could be assessed through intermediate questionnaires or exercises.

Weighting the Individual Measures

Combining and weighting metrics is possible when guiding recommender systems but a non-trivial endeavour, especially when metrics are collected at different time scales. In general, the ultimate aim of a mental health application remains the improvement of a patient's mental health. As a result, any weighting and combination of the three aforementioned metric classes and their sub-metrics should target the patient's health over the longer term. As discussed above, however, long-term improvement is a highly sparse signal, and might in some cases (e.g. relapse rate) only be assessed long after treatment.

Here, several possibilities to approach this issue by weighting shorter-term patient outcomes, therapeutic alliance and information gain are discussed.

1. Pure Reliance on simple short-term signals only, like moment-to-moment measures of therapeutic alliance (app opens, accepted recommendations) or patient outcomes (e.g. self-reported mood). While this might be the most trivial approach, it also has some key advantages: This measure is generally freely available and reliable in that it is unlikely to be confounded by e.g. demand characteristics or misunderstandings of more explicit questionnaire-style measures. Because it is also available at high frequency, it can make training the system significantly more stable. A recommender system might thereby both attempt to model on short-term impacts of treatments on these measures but could also assess longer-term changes (e.g. through a response functions). The later option again profits from the high frequency of these metrics.

2. A hand-crafted weighting function. This might reflect different priorities derived from the scientific literature and in collaboration with trained clinicians. Handcrafted weighting might also be applied when the application is used in different contexts. For example, the application might be used during a waitlist period or purely for information gathering in concert with a human therapist. In this situation, the recommender system might be set up to strongly prioritise information gain over other metrics.

3. A data-driven weighting function. With large amounts of data, a statistical model could be built that predicts long term patient outcomes through a function which takes into account the different metrics. This would then reveal an optimal weighting that the recommender system might use.

All options might be constrained by guardrail metrics. Furthermore, outside of a linear weighting, option 2 and 3 might also use other combinations, for example via more complex machine learning models and those taking into account pareto-optimality.

The recommender system 32 may have one of the following system architectures:

1. Supervised learning based on therapist recommendations: In a first step, the recommender system 32 could learn the optimal treatments to deliver based on treatments that have been suggested by a therapist. This could for example be achieved by therapists suggesting apps for their own patient through the mental health application. The recommendation system 32 could then either learn to directly mimic this behaviour, or to mimic this behaviour but taking into account the above metrics (that is only suggest interventions to patients when they were suggested by therapist and had positive outcomes). The advantages of the therapist based approach are the potentially higher safety of the recommendations. However, using only prior therapist data limits the systems ability to generalise and is at least partially reliant on the therapists recommendation quality.

2. Reinforcement learning (RL): Reinforcement learning is a machine learning technique where an 'agent' (in this case the recommender system 32) interacts with an 'environment' (in this case the patient) and learns to take actions (here the interventions) to maximise some reward signal (here the metrics). This approach has previously been used at different scales in recommender systems, ranging from relatively simple contextual bandits to systems that use deep neural networks in combination with reinforcement learning algorithms. A key advantage of reinforcement learning is that it has a built in notion of active exploration and exploitation, something that isn't inherent in default supervised systems. Because of this built in exploration aspect, reinforcement learning might be particularly well suited to the therapeutical setting. The fact that an RL system can explore by itself however also has its downsides which need careful consideration: There are potential safety concerns in the exploration of novel actions. In general, 'shaping' the value function and reward signal of an RL system will be key in applying RL to a mental health setting.

In their basic implementations, both supervised and reinforcement learning based systems suffer from low sample efficiency, that is they require high amounts of training data (or trial and error in the RL setting) until they arrive at good decisions. However, this might be remedied: for example, a reinforcement learning based system could use therapist strategies learned through supervised learning as a starting point (i.e. prior) to begin its exploration and exploitation of the intervention space.

As discussed, here it is focused on a recommender system 32 choosing higher level intervention categories rather than how these interventions might be implemented. However, it is equally conceivable to develop a system that does this more end-to-end, for example through an integrated two-stage process where a higher level subsystem first suggests the relevant activities and a lower level system then chooses how they would be implemented.

The recommender system 32 is a mechanism- and uncertainty-based mental health recommender system. Described here is a specific instantiation of it in the context of CBT.

While recommender systems are powerful tools, they also have challenges. Below, we discuss how these challenges matter in the context of the recommender system 32.

A first challenge for recommender systems is the so-called cold start problem. That is, recommender systems may have little to no information about a user when they first encounter them. This makes personalised suggestions close to impossible. The mental health recommender system 32 however is at a clear advantage. Under any circumstances, therapy will always begin with the collection of substantial, often standardised, data collection steps. This will happen both before the therapy starts (e.g. during the referral process) and early on in therapy. As a result, the recommender system 32 may already possess significant amounts of information about a patient before making its first decision. Furthermore, in the beginning of a treatment, patients could be exposed to an initial default user journey where further data is collected but the recommender system 32 remains offline.

A further challenge is the large action space inherent in most applications of recommender systems. For example, an online streaming service must recommend one of millions of videos to a user. This is problematic for resource reasons—checking the possible value of each item is very expensive—but also complicates the learning process significantly: Individual users only interact with very few items, making what is known as the item-user interaction matrix extremely sparse. Again, here the recommender system 32 is in a privileged position: specifically, the recommender system 32 has an intervention space that is orders of magnitude smaller than what most online recommender systems need to optimise over. This will reduce both the resources needed and data needed to drive decisions, but also allows us to explore the user-action space relatively comprehensively.

This small action space is also relevant to another problem of recommender systems: echo chambers. These can form when a recommender system suggests overly homogenous content. Echo chambers are an unlikely occurrence in the context of the recommender system 32 not only because of the low number of possible interventions but also because the recommender system 32 is designed to prioritise exploring. However, optimising for a specific metric (or a weighting of metrics) can have potential pitfalls and unintended consequences. For example, simply maximising engagement might come at the cost of long-term patient outcomes and only prioritise easy exercises. As a result, both the careful shaping of the objective function and a monitoring of recommendation results is important. Furthermore, fallbacks to simpler and more rule-based recommendations might be used to prevent the system from deviating too much from the therapeutic norm.

Finally, so called grey and black sheep represent users that are either inconsistent between existing users (grey) or lie completely outside of the space of users covered thus far. While this does affect the recommender system 32, the recommender system 32 relies on representations of patients grounded in the scientific literature. This grounding might significantly improve the performance and generalizability within the system.

Although an example subject understanding model is described above, as described previously, a subject understanding model may be based on a different classifier architecture, for example that have only one pre-processing step, or are tree-based.

In one example, the subject understanding module 31 may comprise a large language model, which acts as a mechanistic model. In other words, the classifier used as a subject understanding model comprises a further large language model. A prompted LLM is used as a classifier. An example input prompt may be
"About You:
You are a clinical diagnostic tool used to predict whether a patient's statement contains a distorted thought according to principles of psychotherapy.
Your Task:
You will receive an utterance that the patient has made and will return a probability (ranging from 0 meaning no distortion to 1 meaning certain distortion).
You will receive the input as "Please predict the probability that the following thought is distorted: {thought}" where "{thought}" is the patient's utterance.
First, think step by step about this problem, then respond with "Probability=X", where X is your estimated probability that the thought is distorted."

The user input is then appended at the end of this prompt and fed into the LLM. In this example, a prompted LLM model determines subject profile information from the user utterance. The output from the LLM may be a label (e.g. all-or-nothing thinking) and a probability.

Another example of a subject understanding model that may be included in the subject understanding module is a behavioural understanding model. An example of a behavioural understanding model will now be described. The model performs one or more classifications in order to generate a classification of adaptive and/or maladaptive behaviours.

The language model 21 may prompt the user to enter activities and corresponding mood records. Alternatively, prompts for the user to enter mood data can be made shortly after the end of an appointment in a calendar for example, or triggered by sensors in the device indicating that the user has left the location of a corresponding appointment in the calendar data.

Any user activity input provided as free text input is classified into a number of pre-determined/pre-defined activity classes. The classification of the free text activity log inputs is first performed. In order to derive meaningful insights, the activities reported/recorded/input by the user are classified into distinct activity categories (i.e. a limited number of pre-defined/pre-determined activities). In this example, this is performed automatically through use of a machine learning model. In some examples, the machine learning model can be derived using unsupervised methods for data-driven-approaches or using supervised methods, or clinician-provided heuristics and look-up tables.

The model takes free-text as input, whereby this free-text is transformed into a vector representation. Many different ways of obtaining such vector representations are possible (e.g. term-frequency inverse document frequency or transformer networks) and the outlined application is independent of the used embedding of choice.

An evaluation process performs the evaluation of the user input. In this example, the evaluation process comprises a sequence of processes that are used to process the user input (e.g. the user activity logs and associated mood logs).—

To train the models, a first unsupervised model performs clustering of the activity inputs. Using the data collected from user activity logs, in free text form, the free-text inputs are transformed into a sentence embedding using a pre-trained transformer model (for example the "distilbert-base-nli-mean-tokens" model) to output a vectorised text input in the pre-processing step 315. The vectorised text input is provided to an unsupervised clustering algorithm (in this example, a Bayesian Gaussian Mixture model) to cluster the user input based on the data being clustered, where the algorithm determines the substantially most common and consistent clusters of activities represented in the data.

To train a second model, these clusters are reviewed manually by trained clinicians to derive an interpretation for each of the clusters, to create the necessary data for supervised training of the second model. Specifically, the manual review of the clusters of data involves reviewing at least some of the text examples in the cluster and the distance of text examples from the cluster mean. Multiple clusters can be combined during the manual review to construct more general and/or overarching clusters (for example a first cluster might be deemed to represent examples of users eating breakfast while a second cluster might be deemed to represent examples of users eating lunch so these two clusters can be combined into a more general cluster to represent eating). By using a manual review, by clinical professionals, the clusters are typically more meaningful and/or more interpretable.

Due to the high dimensionality of the input data (in this example, there are 768 dimensions), the clustering algorithm will derive strongly separated clusters, which means that the cluster borders will not generalise well to new and unseen text examples. To overcome this limitation, the clustering approach in this example is refined by using a second, supervised, neural network trained model based on the manually created overarching cluster labels. Specifically, the vectorised text is used as input and the broader cluster labels (created by the manual review process described above) is used as the output and the supervised neural network is trained to predict these output cluster labels. Thus, this approach uses supervised machine learning to approximate the output of an unsupervised clustering algorithm, acting as a (quasi) dimensionality reduction technique and substantially improving the categorisation performance and/or the generalisability to new text examples (effectively leading to the categories having less strict boundaries specifically fit to the training data).

Predictions from the resulting trained supervised machine-learned model 320 (the second model) are used to infer the activity categories from the user's free text input of their activity logs.

The output of the trained, supervised, machine-learned model is not just the most likely prediction from the algorithm but an output of class probabilities across all existing categories. In some examples, the method employs the activation of a final neural layer before feeding this layer through a SoftMax-function. By outputting probabilities across each of multiple categories, the output accounts for the varying contributions of different activities (for example, a free text entry in an activity log might be "I went for dinner with some friends" which when input to the model will cause an output probability for both the "eating" and "socialising" categories—reflecting that both categories are represented by this activity log entry).

In order to determine adaptive or mal-adaptive behaviours, the influence of activities needs to be correlated with the wellbeing of the user. In this example, the mood data collected from the user is used as an indicator for the wellbeing of the user. In other examples, other indicators for wellbeing can be used such as scores on clinical outcome measures. Any user mood input provided needs to be transformed into a numerical dimension, and, in this example, this transformation is performed by the pre-processing process 315 applying sentiment analysis techniques to convert the mood inputs from the user into numerical values. In this example, the Vader sentiment analysis model, which is a rule-based approach, is used to transform free text into a one-dimensional numerical representation ranging from negative to positive. In other examples, different models can be used to perform sentiment analysis, or a neural network approach could be used.

To infer whether activities have an adaptive or mal-adaptive nature, some form of correlation between activities and mood needs to be established. In this example, a multiple regression approach is used, where the input includes the proportion to which each activity class contributes to each reported activity. This approach allows the inference process 340 (for determining the correlation between activities and mood) to control for the effects of other activities when inferring the influence of a specific activity on mood (for example, drinking and socialising might be highly correlated for some people and often happen together so, when estimating the influence of each of these activities the approach needs to control for the presence of the other activity—for example is the user happy because they are drinking or happy because they are socialising). In other examples, a simple correlation between the presence or absence of an activity with the experienced mood can be recorded.

Figure 11:
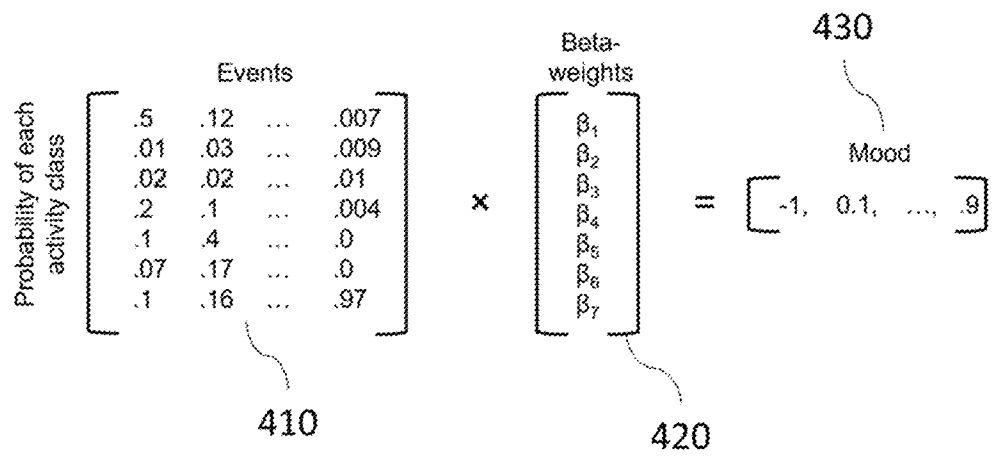

Referring now to FIG. 11, which shows the multiple regression mood prediction approach 400, by using the probabilistic output 410 from the activity classification machine-learned model (which outputs multiple probabilities across activities as outlined above) as input to the multiple regression process 400, the multiple regression process 400 (applying the learned weights for each activity 420) outputs a prediction 430 of the patient's mood. The class probabilities 410 output by the activity classification algorithm represent to what degree each reported activity (i.e. each entry in a user activity log) contains aspects of different activity classes and, by inputting all of these probabilities (across classes) into the multiple regression 400, the approach controls for mutual influences between activities on mood. The derived beta weights 420 for each activity class are a measure of the determined correlation for each user between mood and activities, controlled for potential influences from other activities. The beta weights 420 are used to define adaptive (positive beta weights) and mal-adaptive (negative beta weights) behavioural patterns/activities.

One constraint for estimating the beta weights is the amount of data available for each patient, in particular for new users for which there is no or limited data available. In order to estimate the beta weights reliably, sufficient data is needed for each patient and each activity. If there are only limited data points available, estimates for the beta weights will be noisy and unreliable. To enable individual insights therefore, sufficient data is required in order to derive reliable individual estimates. To provide estimates for an individual before sufficient data is obtained, in this example a group-level priors are used on the estimates beta weight. To derive these group-level priors, a hierarchical Bayesian model fit is required which estimates an average group-level beta weight for each activity (an average effect across all patients for which data has been gathered), but allows individuals to vary from this beta weight by estimating a full distribution of beta-weights in the analysed group. The group distribution for each beta is represented by its mean (the average effect over all patients for which data has been gathered) with a standard deviation (the variation between patients on how this activity affects their mood). Using this group-level distribution to inform the individual beta estimates (for example by calculating a maximum a posterior fit) has the advantage of using group-level information when little data is available for the patient but allowing the beta weights to vary from this group-level effect value if sufficient data is available for the patient, effectively solving the trade-off between providing individual-specific insights and robustness against noise where there is limited data per patient.

Figure 8:
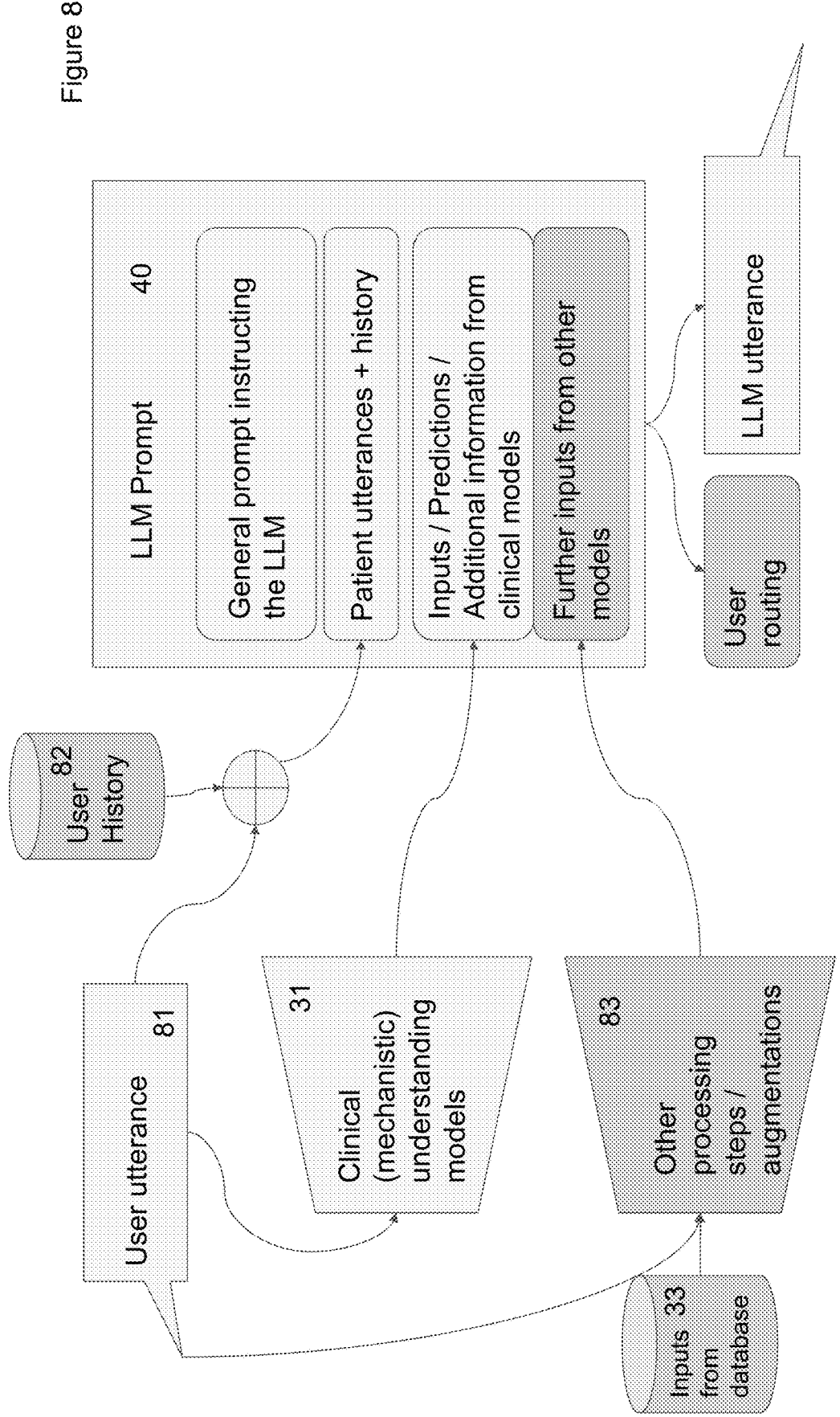
FIG. 8 is a schematic illustration of example information used to generate a system prompt in the method described in relation to FIG. 3.

FIG. 8 is a schematic illustration of example information used to generate a system prompt in S303 of the method described in relation to FIG. 3 above.

As has been described previously, the dialogue system 100 receives an input user utterance 81. The user utterance is provided as input to generate the system prompt.

The user utterance 81 is also provided to a subject understanding module 31, which comprises one or more clinical understanding modules (also referred to as mechanistic models). The subject understanding module 31 outputs subject profile information based on the input user utterance. The subject profile information may comprise an indication that the user utterance contained a distorted thought for example—this is also referred to here as a prediction. The subject profile information output from the subject understanding module 31 may further comprise one or more inputs and/or additional information from the one or more clinical understanding models. The subject profile information is used to generate the system prompt.

A general prompt comprising instructions for the language model is also retrieved and included in the system prompt. For example, the system prompt may be constructed by taking the general prompt and appending the user utterance and then the subject profile information. The general prompt may correspond to a stored text template. The stored text template may be retrieved based on the subject profile information for example. In one example, the general prompt may comprise information instructing the language model on the role to be performed by the language model. This information may include information indicating that the language model is to use techniques from psychotherapy. The general prompt may comprise information indicating the context of the system output to be generated. For example, the general prompt may state that the language model is engaged in a conversation with the user. The general prompt may comprise information indicating the goal of the language model. The general prompt may comprise information indicating available techniques.

The general prompt may comprise information relating to the possible outputs of the subject understanding module 31. For example, the general prompt may include information identifying the possible classifications used by the subject understanding module 31, and one or more specific clinical techniques associated with one or more of the possible classifications. At least one classification predicts a specific medical diagnosis. The clinical technique may be a clinical technique used to treat a subject receiving such a diagnosis. The general prompt may further include information explaining how one or more of the specific clinical techniques is performed. The clinical techniques are techniques used by psychotherapists. For example, a classification may be an indication of cognitive distortion. A clinical technique associated with this classification may be cognitive restructuring.

Optionally, the system prompt is also generated to include one or more previous utterances from the dialogue with the user, retrieved from a stored record of the dialogue, referred to here as the user history 82.

Optionally, the system prompt is also generated using inputs from a database—also referred to here as background knowledge 33.

Optionally, the system prompt is also generated using an output from other processing steps or augmentations. For example, the output of a recommender module 32. The inputs from the database may be used by the other processing steps or augmentations.

The user input may be used by the other processing steps or augmentations. These are provided in the system prompt as further inputs from other models.

The system prompt is taken as input to the language model 21, which generates the utterance (LLM utterance). The system prompt may also be used for other purposes, for example user routing.

The language model 21, is instructed to perform one or more core functions, for example cognitive restructuring, check-ins, three column thought records, exposure, behavioural activation, etc, based on what one or more mechanistic models in the first module 30 recommend. The mechanistic models in the first module 30 may augment the user input with indications such as "distorted thought" or "core belief", which the language model can then use to decide which function it should fulfill.

In some examples, the subject understanding models are queried in a flexible way. For example, an initial pre-processing model may be included in the subject understanding module, which takes the user input on every turn. Instead of outputting a label, this initial pre-processing module determines which of the mechanistic subject matter understanding models is to be queried. This pre-processing model may be the goal directed system. For example, the free-text input is transformed into a vector representation and fed into an initial pre-processing deep neural network in the subject understanding module in order to classify whether the free-text input represents a thought or a different type of patient input (e.g. description of a situation or an emotion). If the free-text input represents a thought, it is then provided as input to the cognitive distortion understanding model 300 described above.

Example 1

In the below, an example in the framework of Cognitive Behavioral Therapy will be described. An example of a dialogue system, using cognitive behavioural therapy (CBT) as the lens through which to understand and treat a patient is described. In particular, it is described how a CBT model-based system interacts with a large generative pre-trained transformer model trained for text completion via prompting. As the delivery platform, a mental health app 70 where patients interact with a mental health chatbot through text conversations is provided. The app runs on a user device 200. The example will be described with reference to FIG. 6.

As has been described previously, the AI system has two main components. The first module 30 is a goal-directed therapy system based on the principles of CBT. This CBT system 30 itself has several subcomponents:

A subject understanding module 31 that generates quantitative or qualitative insights (e.g. a detailed description of their most common symptom taken from a large set of previous interactions) insights about the patient based on the patient's conversation with the chatbot;

A recommender module 32 that uses the insights generated by the understanding module 31 to select next interventions (this can include treatment, psychoeducation, etc.);

A knowledge bank 33 comprising material that the chatbot can use to explain concepts (in psychoeducation and beyond);

The second main component, or second module 20, comprises a large language model 21 which translates the insights and recommendations generated by the goal-directed system into the text for the chatbot 70. In this case, the goal-directed module 30 and large language module 20 interact through prompts that can contain information provided by the goal-directed module 30.

The dialogue application 102 also comprises a safety module 50, that comprises one or more machine learning modules that evaluate the quality and safety of the utterances of the language model 21.

As described, the patient interacts with a conversational chatbot app 70 that takes at least part of the role of a psychotherapist. In this example, the input format for the patient is text. The chatbot app 70 responds with natural language and converses with the patient (also referred to as the subject). In this example, the user is also the subject. In other examples, the user may be a clinician, who uses the dialogue application in relation to a patient who is a separate person.

The conversations can contain specific exercises. For example, these might include thought and mood records that produce information about what the patient is thinking, doing, and how they are feeling. These exercises can also be more directly targeted at improving symptoms, for example through behavioural activation, or through thought challenges.

The information produced by such exercises is then processed by the subject understanding modules 31. These subject understanding modules 31 capture core components of CBT which include, but are not limited to, behavioural patterns, core beliefs and negative automatic thoughts. As a result, they can build a detailed profile of the patient, for example showing that the individual characterised by medium amounts of cognitive distortions, holds the core belief that the world is a dangerous place.

A further function of the understanding module 31 is to contain general information about the patient like demographics, questionnaire scores, or diagnosis. Together, this information is then used by a mental health recommender system 32. The task of this recommender system 32 is to choose from a number of interventions defined by CBT in order to maximise patient outcomes, for example measured by therapeutic alliance.

In the prompt, this specific information is then summarised, framing the right exercises or intervention as well as surfacing the right background information as well as the relevant background knowledge.

In targeted psychoeducation, the language model 21 uses information about the patient (subject) that it derived from previous conversations as well as background information to explain a concept. Note that this is only an example, and that prompts may be significantly longer. In this example, text created by the language model 21 is shown in bold. In the example, the dialogue system provides personalised psychoeducation about behavioural activation. The prompt contains information specific to this psychoeducation.

In the below, the initial prompt comprises the text up to the first Therapist utterance. The first Therapist utterance is then generated by the language model 21, the patient replies, the language model receives all of these interactions (including the initial prompt) again and generates the next Therapist utterance and so forth. The information about the patient may come from stored profile information, or from a subject understanding model. The part relating to behavioural activation is added and scheduled via a behavioural understanding module or a recommender module (or as part of a pre-defined treatment plan which was generated at an earlier time).

---

The following is a conversation between a patient and a psychotherapist. The therapist is helpful, empathetic and very friendly.

The patient name is John. John is 83 years old and has been diagnosed by depression. The therapist has previously identified that the main driver behind John's disorder is the loss of his wife Janine, who passed away last fall.

In the following conversation, the therapist will introduce the notion of behavioural activation to the patient. He will thereby use the following information:

Behavioral Activation (BA) is a specific CBT skill. It can be a treatment all by itself, or can be used alongside other CBT skills such as cognitive restructuring.

Behavioral activation helps us understand how behaviors influence emotions, just like cognitive work helps us understand the connection between thoughts and emotions.

Behavioral Activation is based on the well-researched understanding that depression often keeps us from doing the things that bring enjoyment and meaning to our lives. This "downward spiral" (explained in the first chapter of this manual) causes us to feel even worse. In Behavioral Activation we work to reverse this cycle using our actions and choices.

We often wait to feel better or more motivated before doing something. Remember that anxiety and depression come from parts of our brain that are really trying to protect us by getting us to avoid or isolate. This means that as long as we are following the lead of the anxiety and depression, we will continue to feel less motivated and want to avoid and isolate.

The therapist has previously identified that John enjoys spending time with his grandchildren, making it a possible target for the behavioural activation. The therapist has also noticed that engaging watching television or being inactive have negative effects on John's mood. The therapist will use these as specific examples when explaining behavioural activation.

Therapist: Hi John, how are you doing.

John: I am doing a little better than yesterday, but could be better.

Therapist: That's good to hear. Do you mind if I explain a new exercise to you - it's called beahvioral activation.

John: Sure, that sounds good.

Therapist: Ok. So, the idea behind behavioural activation is that we can change our emotions by changing our behaviours. So, if we do things that make us happy, we will start to feel happier.

John: Can you give me an example of that?

Therapist: Sure. So, for example, if you enjoy spending time with your grandchildren, then spending time with them will likely make you feel happier.

Although in the above described examples, the language model receives the latest patient utterance on each dialogue turn, in other examples the input to the language model comprises a processed or filtered summary of previous user inputs, for example containing a summary of a previous intervention and its success, or a patient's most frequent issues.

In some examples, the system prompt may comprise additional information. For example, the system prompt may comprise data corresponding physiological measurements of the subject, such as heart rate.

The system prompt may additionally or alternatively comprise numeric data from the user, for example the subject's daily step count or number of activities.

Various language models may be used in the dialogue system. The language model may comprise a general purpose transformer trained on text completion, or model more specifically trained for conversational skills and/or finetuned for psychotherapeutic purposes for example.

Furthermore, although example subject understanding models are described, various other models may be used to generate insights about the patient that are being delivered to the language model. For example, the subject understanding models might capture aspects of cognitive behavioural therapy, but could additionally or alternatively be based on methods and theories of psychoanalysis. Various machine learning methods and therapy tools may be used to generate these insights and building a quantitative, and explainable profile, of the patient.

Furthermore although some examples described above use a recommender system, with the described actions and interventions such a system could choose, these could additionally or alternatively be derived from different schools of psychotherapy and rely on different metrics to optimise. Instead of being chosen by a recommender system, specific exercises might also be prescribed by a therapist but nevertheless delivered and executed by a chat system that interacts with the patient.

Although the above described examples show English language dialogues, large language models are inherently multi-lingual, being pre-trained on a multitude of languages. As a result, the dialogue system may in some examples be capable of conducting therapeutic conversations in different languages.

In the above described examples, the dialogue system is a fully autonomous system. However, in some other examples, the input prompt may comprise recommendations about exercises input by a human therapist.

Although in the above described examples, the subject understanding models are trained models that receive the user input and generate the output subject profile information, in some other examples, the subject understanding models are not trained models, and some other kind of model is used. In some examples, the subject understanding models do not receive the user input, and instead generate the subject profile information from some other kind of input, for example from clinician data or historic patient data.

In the above described method, a system input is generated using the subject profile information and provided to a language model to generate a system response. In the above described examples, the system input is a system prompt, which is provided as input text to the language model. The language model then iteratively generates the next words in a sequence starting with the prompt. Thus an input text prompt is used to provide the information from the first module to the language model. Such prompts are a good tool for communicating complex textual information. However, in other examples this context information may be input via different means, for example as a state representation. Thus in other examples, the system input is a state representation. This could for example be a vector embedding of the context information, similar to how the text in the cognitive distortions model is embedded.

Figure 12:
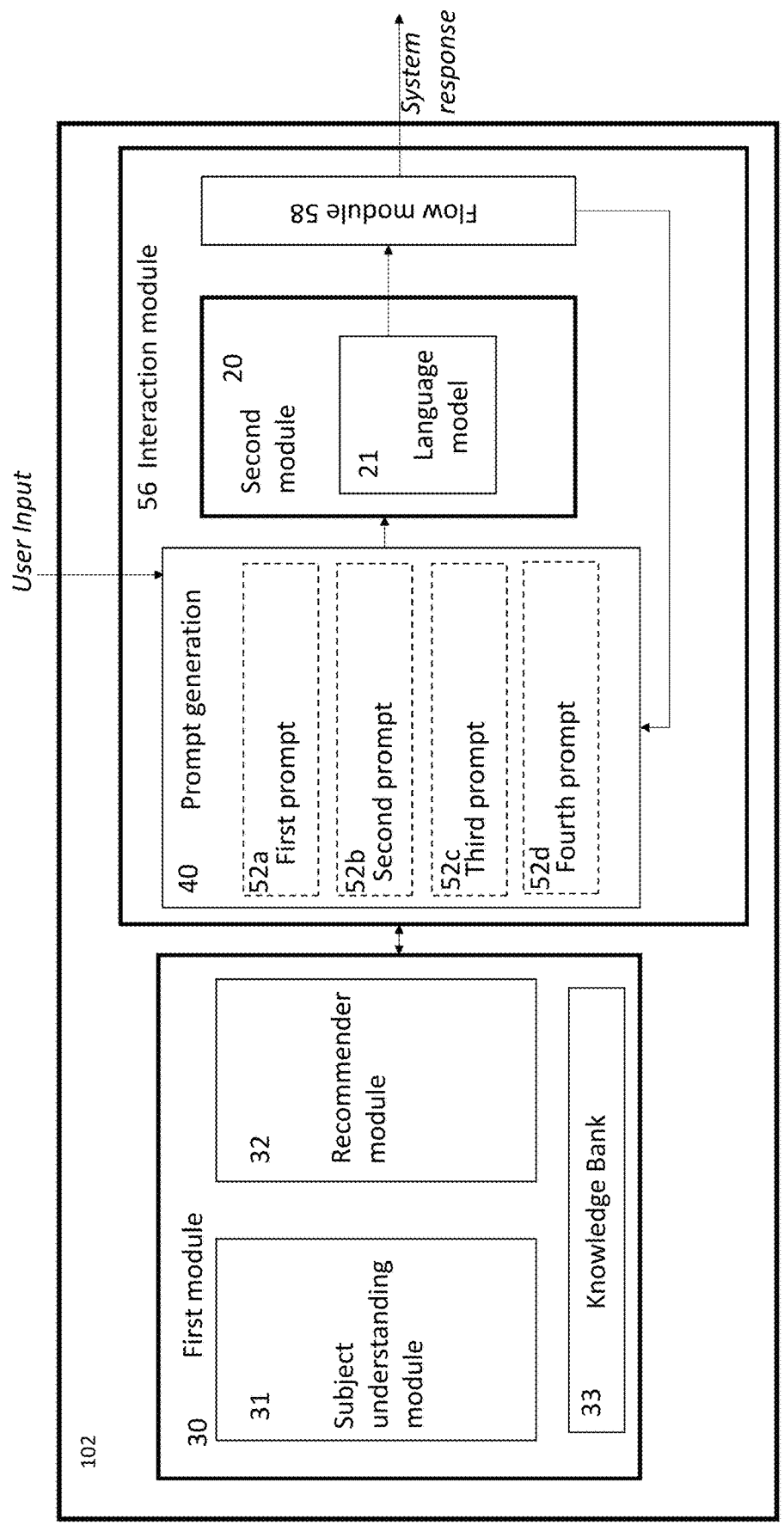
FIG. 12 is a schematic illustration of a dialogue application according to another example.

FIG. 12 is a schematic illustration of a dialogue application 102 according to another example that may be stored and executed by a dialogue system 100 as described in relation to FIG. 1. Execution of the dialogue application 102 will cause methods as described herein to be implemented. In this example, the dialogue application 102 comprises a first module 30 for identifying an intervention for the user and an interaction module 56 for engaging with the user.

The dialogue application 102 when executed receives, by way of input 101, input data from the user. The input data received from the user is provided to the interaction module 56. The interaction module 56 is configured to analyse the input data. For example, the interaction module 56 determines whether the input data from the user includes information relating to a clinical state of the user. If the input data includes information relating to the clinical state, the interaction module 56 generates structured information from subsequent input data that is received from the user. This structured information enables the first module 30 to identify an intervention. The interaction module 56 outputs information explaining the intervention to the user. Such information may motivate the user to perform the intervention. Additionally, the interaction module 56 is configured to deliver an intervention to the user. The interaction module 56 outputs system responses as a part of a dialogue to the user. The system responses may include the intervention for the user to perform or may form part of the intervention.

In some examples, the intervention may form a part of a sequence of interventions. Such sequences of intervention could be interventions that are performed in order. These sequences of interventions may form a part of a "treatment plan". For instance, a treatment plan may comprise a sequence of interventions that when performed may reduce a specific symptom of the user. In some examples, interventions include exercises such as physical exercise and/or mental exercises that the user may perform in order to reduce one or more symptoms (e.g., symptoms relating to the clinical state of the user) of the user. In some examples, an intervention may comprise providing psychoeducation for the user.

The interaction module 56 comprises a second module 20. In this example, the second module 20 comprises a language model 21 to engage in dialogue with the user. The language model 21 may be a language model as described previously in relation to FIG. 5 for example. The interaction module 56 further comprises a prompt generation module 40. In this example, the prompt generation module 40 comprises a first prompt generator 52a, second prompt generator 52b, third prompt generator 52c, and fourth prompt generator 52d (collectively referred to as "prompt generators 52"). The prompt generators 52 are configured to generate one or more system prompts that are provided to the language model 21. The generated system prompts each comprise a sequence of text.

The system prompts are generated in a similar manner to the prompt generation process described previously in relation to FIGS. 2 and 3. In particular, a stored text template is retrieved. The prompt generation module 40 comprises one or more stored text templates associated with each of the first to fourth prompt generators 52a to 52d. In this example, there is a single stored text template associated with each of the first to fourth prompt generators 52a to 52d. However, in other examples, each of the first to fourth prompt generators 52a to 52d may select a stored text template from a plurality of stored text templates associated with the prompt generator, based on information output from the first module 30 or information taken from the user input for example.

The prompt generator combines the stored text template with the user input to generate the system prompt. For example, the previous user input may be included at a pre-defined point in the stored text template, indicated by an identifier in the stored text template, to generate the system prompt. All of the previous user inputs and system responses may be included in the stored text template, to generate the system prompt. Additional information may be included in the stored text template to generate the system prompt, as will be described below. The generated system prompt is provided as input to the language model 21, to output a language model output comprising a system utterance and/or a system response. The system utterance and/or system response is outputted, by way of an output 101, to the user.

In this example, the language model 21 is shown as part of the dialogue application 102. However, the language model 21 may be implemented on a separate system, with the system prompts being sent to, and the language model outputs being received from, the language model system via a communication network.

In this example, there is a single language model 21, that receives system prompts from each of the first to fourth prompt generators 52a to 52d at different stages in the interaction with the user, and that generates a language model output based on the system prompt.

In an alternative example however, the second module 20 comprises four individual language models, each corresponding to one of the prompt generators 52a to 52d. For instance, the second module 20 comprises a first language model that receives a first type of system prompt from the first prompt generator 52a as input. The second module 20 comprises a second language model that receives a second type of system prompt from the second prompt generator 52b as input. The second module 20 comprises a third language model that receives a third type of system prompt from the third prompt generator 52c as input. The second module 20 comprises a fourth language model that receives a fourth type of system prompt from the fourth prompt generator 52d as input.

The first prompt generator 52a enables initial engagement with the user. For example, when the dialogue application 102 is executed, the first prompt generator 52a generates an initial system prompt. As described previously, a user may interact with the dialogue system 100 through an app running on the user device 200. For example, the dialogue application 102 may be triggered by the user initiating a "coaching session", for example by clicking a button in the app. The first prompt generator 52a then generates an initial system prompt, which in turn is used to generate an initial system utterance. In this example, no dialogue history is included in the initial system prompt. Alternatively, a summary of any previous dialogues (e.g., one or more previous engagements) between the dialogue application 102 and the user may be included in the initial system prompt. The initial system prompt may also include information relating to the user such as, for example, interventions previously provided by the dialogue application 102, interventions previously performed by the user, a clinical state of the user following previous interventions, previous system utterances and/or system responses during previous engagement with the user, key life events of the user, a therapy goal of the user and/or the like. Such information relating to the user may be included as a summary in the initial system prompt. Alternatively, the entire information relating to the user may be included in the initial system prompt. Alternatively, the initial system output may simply be a stored text template.

The user then provides an input in response to the initial system utterance. The first prompt generator 52a then generates a first system prompt including the previous system utterance and the previous user input. The first system prompt includes instructions to enable a language model to generate a first system utterance and/or a first system response that can be outputted to the user. Thus the first system prompt is used to generate the first system response, by inputting the first system prompt to the language model 21. The user then provides the next input. In particular, in response to the first system utterance and/or the first system response, the user provides user utterance and/or patient utterance as input data. The first prompt generator 52a then generates the next first system prompt including the previous system responses and the previous user inputs. The first system prompt includes instructions to enable a language model to generate the next first system response that can be outputted to the user. In this manner, the dialogue application 102 engages with the user. In this first stage, the user engages in an undirected conversation with the dialogue application 102, during which the user may talk about any issues they are facing or simply vent. The system responses in this session are generated based on first system prompts generated by the first prompt generator 52a.

An example first system prompt is described in relation to FIG. 15 below. The first system prompt may contain background information and an indication of the goal for the conversation with the user. The first system prompt further comprises instructions informing the behaviour of the language model 21. In this case, the behaviour of the language model 21 instructed by the first system prompt is to performed undirected conversation with the user. The first system prompt instructs the language model 21 to perform an undirected conversation with the user.

Additionally, the first system prompt instructs the language model 21 to analyse the user input data to monitor for one or more user intentions. The first system prompt may instruct the language model 21 to continuously monitor for the following user intentions:

1. Whether the user wants to do a particular intervention right away (e.g. one from their treatment plan)—if so, the interaction module 56 transitions directly to the fourth prompt generator 52d to deliver this intervention;
2. Whether the user has said anything significant about their mental health—if so, the interaction module 56 transitions to the second prompt generator 52b, which generates a second system prompt instructing the language model 21 to explore this in more detail;
3. Whether the user wants to exit the conversation—if so, the interaction module 56 is configured to end the conversation and the user returns to the home screen.

If one of the above conditions is satisfied, the language model 21 passes control to the relevant next component by indicating this in its output. The interaction module 56 in this example comprises a flow module 58. The output of the language model 21 is reviewed by the flow module 58, before a system response is provided to the user. The flow module 58 parses the output text from the language model 21, looking for flag information indicating one of the above intentions. The flag information may be a sequence of characters. For example, the first system prompt may comprise the following instruction:

"Explore": string // Flag to indicate whether the user has said something significant about their mental health. This must be either 'True' or 'False'

The output from the language model 21 will then comprise the text "Explore": True or the text "Explore": False. The flow module 58 parses the language model output to detect the flag. For example, the flow module 58 may comprise a regular expression corresponding to each flag for example. If the flow module 58 detects one of the flags has been set as true, in other words if one of the above conditions is satisfied, the language model 21 passes control to the relevant next component by indicating this in its output. The flow module 58 detects the flag and instructs, for example, the second prompt generator 52b to generate a second system prompt in response to detecting the relevant flag. This second system prompt is then taken as input to the language model 21 to generate the system response to the user.

The first system prompt includes one or more data flags, and instructions as to when to set the data flags, to provide definition to the input data from the user. More specifically, the first system prompt includes data flags that are to be used by the language model 21 to define user intention from the input data. The first system prompt comprises instructions to the language model 21 to output a sequence of one or more characters indicating that the flag is set (e.g. true) if the user intent is detected.

As described above, in one example the first system prompt includes a first flag to enable identifying whether the user would like to perform a specific intervention of their choice. In this example, the first flag is [Intent]. The first system prompt comprising the first flag and the previous user input is provided as an input to the language model 21. The language model 21 generates a language model output. The flow module 58 searches the language model output to detect if the first flag is set. The language model 21 is instructed to set the first flag as "true" in the language model output if the user input data included in the first system prompt includes an intent from the user to perform a specific intervention of their choice. If the first flag is set as "true" then the flow module 58 identifies that the user intends to perform a specific intervention.

In some examples, the flow module 58 also identifies the intervention that the user intends to perform, by parsing the language model output and/or the user input to detect an intervention from a pre-determined list of interventions, in response to detecting the first flag as set as true. Thus after the flow module 58 identifies that the user intends to perform a specific intervention, the flow module 58 may parse the language model output and/or user input to identify the intervention that the user intends to perform. For instance, the flow module 58 may compare the language model output and/or user input to a pre-defined list of words and/or phrases using one or more regular expressions. This pre-defined list of words and/or phrases may include a list of interventions. The first system prompt may include instruction to the language module to ask a question for the user relating to the intervention that the user would like to perform if the user input data included in the first system prompt includes an intent from the user to perform a specific intervention of their choice. The question output may be "It sounds like you would like to do a specific exercise. Which one would you like to do?". The flow module 58 may compare the user's next response with the pre-determined list of words and/or phrases to identify which specific intervention the user would like to perform. Based on the first flag, the flow module 58 transitions to the fourth prompt generator 52d instead of outputting a system response. The fourth prompt generator 52d generates a fourth prompt, used to instruct the language model 201 to deliver the specific intervention as further described below.

In another example, the first system prompt includes a second flag to enable the determination of a clinical state of the user. In this example the second flag is [Explore]. For instance, the first system prompt includes a second flag to enable the determination of a mental health issue that the user has or has mentioned. The first system prompt with the second flag and the previous user input is provided as input to the language model 21. The language model 21 generates a language model output. The flow module 58 searches the language model output to determine if the second flag is set. The language model 21 is instructed to set the second flag as "true" if the user input data included in the first system prompt includes a disclosure from the user relating to the mental health of the user. If the second flag is set as "true," the flow module 58 determines that the user input has information that relates to the clinical state of the user that may need an intervention. In particular, if the second flag is set as "true", flow module 58 determines that the user may have a mental health issue that may need intervention. Based on the second flag, the flow module 58 transitions to the second prompt generator 52b used to instruct the language model 21 to explore the clinical state of the user further.

In another example, the first system prompt includes a third flag to enable terminating a dialogue with the user. In this example the third flag is [Finished]. The first prompt with the third flag and the previous user input is provided as input to the language model 21. The language model 21 generates a language model output. The language model 21 is instructed to set the third flag as "true" in its output if the dialogue history included in the first system prompt comprises a pre-determined number of exchanges with the user (where the pre-determined number is specified in the first system prompt), and if none of the exchanges include any disclosure from the user relating to the mental health of the user. If the flow module 58 determines that the third flag is set as "true," then the flow module 58 terminates the dialogue with the user. The pre-determined number of exchanges can be any suitable number of exchanges (e.g., ten exchanges, nine exchanges, eight exchanges, seven exchanges, six exchanges, five exchanges, four exchanges, three exchanges, or two exchanges) and is specified in the first prompt.

Although the examples described above discuss the first system prompt as having a first flag, a second flag, or a third flag, it should be readily understood that the first system prompt can include a combination of all three of the first flag, second flag, and third flag or a combination of any two of the first flag, second flag, and third flag.

As discussed above, the first prompt instructs the language model 21 to determine whether the input data includes information relating to a clinical state (e.g., mental health issue) of the user. In particular, the first prompt instructs the language model 21 to set the second flag as true if the input data includes information relating to a clinical state. If the second flag is detected, the second prompt generator 52b is triggered to explore the clinical state of the user further. Put differently, if the language model 21 as instructed by the first prompt determines that the user may have a mental health issue, then the second prompt generator 52b is triggered to explore the mental health issue further. The second prompt generator 52b instructs the language model 21 to obtain further information from the user as subsequent input data and generate labels used to generate structured information from this subsequent input data.

Having established that the user has significant issues to talk about, the flow module 58 forwards the current conversation to the next stage. Here, the aim is to gain insight into the user and their current issues. A technique based on CBT is to generate information relating to an "X-Column Thought Record", where X is either 3, 5, or 7. In this example, a approach based on a 3-Column version, which asks for thoughts, feelings, and situations, is used. Each of the columns, also referred to here as topics, corresponds to a CBT component such as thoughts, feelings, activating events, behaviours, automatic thoughts etc. The columns may also include supporting or disconfirming evidence relating to each of the CBT components—in other words, two columns for each component. By recording data relating to these concepts in a free-flowing conversation, user engagement is maintained and structured information gathered by internally annotating incoming data.

In response to the determination by the flow module 58 that the input data includes information relating to the clinical state of the user, the second prompt generator 52b generates a second system prompt. The second system prompt includes instructions to enable language model 21 to obtain subsequent input data from the user so as to explore the clinical state of the user further. These instructions may include example questions that can be outputted to the user to explore the clinical state of the user further. These instructions may include topics on which questions should be asked and instructions as to how to ask the questions. The topics may be: thoughts, situations, and feelings. The instructions may include instructions to ask one or more cognitive behavioural therapy questions that the language model can output to the user. Some examples of cognitive behavioural therapy questions include questions relating to a 5-area model of cognitive behavioural therapy. In this example, the second system prompt includes instructions to output questions relating to the user's thoughts, situations, and feelings to the user.

The second system prompt is provided as input to the language model 21 to generate a second system utterance and/or second system response that is outputted to the user. In response to the second system utterance and/or the second system response, the user provides input data. The second prompt generator 52b then generates the next second system prompt, including the previous user inputs and system outputs. The next second system prompt is taken as input to the language model 21 to generate the next second system response. In this manner, the subsequent input data is obtained, including the user's responses to the questions (e.g., questions relating to cognitive behavioural therapy) in the second system responses.

The second system prompt includes additional instructions to output follow-up questions to the user if the user provides short responses to the questions in the second system responses or if the language model has not understood the user's responses to the questions. In this manner, by outputting questions and follow-up questions, the dialogue application 102 continues to maintain engagement with the user.

The second prompt generator 52b is further configured to instruct the language model 21 to label and/or annotate the system responses, allowing structured information to be generated from the subsequent input data. In particular, the second prompt comprises instructions to the language model to include a label in the language model output indicating the topic. For example, the second system prompt includes instructions for the language model 21 to label the system responses with labels relating to 5-area model of cognitive behavioural therapy as "thoughts," "feelings," "situation," "physical sensations," and "behaviour". In this example, the second system prompt includes instructions to label the system responses relating to thoughts as "thought", the system responses relating to feelings as "feeling" and the system responses relating to situation as "situation". The second prompt may include an instruction to set an [Asking] field to "Situation", "Feeling", "Thought" or "Other" for example.

The flow module 58 then labels the user inputs using the labels output by the language model 21 for the preceding system response. For example, the flow module 58 is configured to label the user's inputs in response to system responses comprising a question relating to a thought as a "thought", to label the user's inputs in response to system responses comprising a question relating to a feeling as "feeling," and to label the user's inputs in response to system responses comprising a question relating to a situation as "situation". This information is stored in the knowledge bank 33 as structured information. This structured information is generated from the subsequent input data received from the user—in other words the user inputs received in response to the labelled system responses. This structured information comprises information to identify an intervention for the user. The second prompt instructs the language model 21 to label each question it asks as either "thought", "feeling", or "situation", allowing the flow module 58 to label the user's replies to these questions. The label generated by the language model 21 is stored together with the user input in the knowledge bank 33.

The second prompt is thus configured to instruct the language model 21 to generate labels used to generate structured information from the subsequent input data. The second system prompt is provided as input to the language model 21. The language model 21 generates a language model output based on the second system prompt. The language model output from the language model 21 includes one or more questions relating to cognitive behaviour therapy. These questions are annotated and/or labelled in the language model output, and the labels are included in the subsequent second system prompts. Generating the structured information may include labelling and/or annotating the user utterances in the subsequent input data based on the labelled questions. For example, user utterances provided in response to question relating to thoughts may be labelled and/or annotated by the flow module 58 as "thought," user utterances provided in response to question relating to feelings may be labelled and/or annotated as "feelings", and user utterances provided in response to question relating to situation may be labelled and/or annotated as "situation".

The second system prompt includes additional instructions for the language model 21 to summarize the user's responses. For example, the second system prompt includes instructions for the language model 21 to create a cognitive behavioural therapy formulation by summarizing the subsequent input data from the user based on the labels and/or annotations. More specifically, the second prompt receiver 52b is configured to summarize how thoughts, feelings, and situations of the user influence each other based on the responses annotated and/or labelled as "thoughts", "feelings", and "situations".

In this example, the second system prompt includes further instructions to output the summary to the user to determine the accuracy of the summary. For example, the second prompt includes instructions to output the summary to the user along with a question relating to the accuracy of the summary. For instance, the second prompt may include instructions to output the summary and ask the user if the summary sounds correct. The second system prompt includes a data flag (e.g., flag, label, tag, etc.) that can be set as "true" after the user has responded to the accuracy of the summary. For example, the second system prompt includes a fourth flag. In this example the fourth flag is [Finished]. The second prompt with the fourth flag and the previous system responses and user inputs is provided as input to the language model 21. The language model 21 generates a language model output. The language model 21 is instructed to set the fourth flag as "true" in its output if the user input included in the second system prompt verifies the accuracy of the summary. If the flow module 58 determines that the fourth flag is set as "true", the flow module 58 transitions to the first module 30. If the fourth data flag is set as "true" the dialogue application 102 terminates the execution of the second prompt generator 52b and the dialogue application 102 determines the next sequence of steps to provide an intervention to the user.

The second prompt may further include instructions to transmit clarifying questions to the user if the user responds by indicating that the summary is inaccurate. The language model 21 may continue asking the user clarifying questions and generating summaries until the user verifies the accuracy of a summary. Once the accuracy is verified, the fourth flag in the language model output would be set as "true" and the control is passed to the first module 30.

While this approach means that the second prompt generator 52b will run for at least three exchanges, additional interactions are allowed for by giving the user space to go into detail and by checking in with the user whether the model has understood them correctly. As with other components, the second prompt generator 52b also instructs the language model 21 to continuously monitor whether the conversation should move on and emits a "finished" flag. Unless the language model 21 notices the user wants to end the conversation completely, the conversation will move on to the first module 30.

The structured information enables the first module 30 to identify one or more interventions for the user. The third prompt generator 52c is then configured to instruct the language model 21 to motivate the user to perform an intervention. In particular, the third prompt generator 52c is configured to instruct the language model 21 to motivate the user to perform an intervention from a suggested list of interventions. This suggested list of interventions may comprise suggestions determined by the first module 30 as further discussed below. In one example, this list of interventions can also include one or more interventions from a sequence of interventions that the user is to perform, for example from a treatment plan. The user chooses from the list of suggested interventions provided in the third system response or responses.

As disclosed above, the third prompt generator 52c is configured to motivate the user to perform an intervention. This allows the decision to be taken collaboratively, and the interventions are not suggested without first clearly explaining why it is helpful. Patient choice is central, and here the approach seeks to explain to the user what an intervention entails, why it may be useful to them specifically, and what other interventions are currently recommended.

The third prompt generator 52c generates a third system prompt which is provided to the language model 21. The language model 21 outputs a third system utterance and/or a third system response motivating the user to perform the identified intervention. The third system prompt comprises one or more interventions output by the recommender module 32 in the first module 30. The third system prompt may further comprise one or more interventions from a treatment plan. In this example, the third prompt generator 52c generates a third system prompt comprising the following information retrieved from the knowledge bank 33:

What interventions the user has performed previously;
What core utterances (e.g. frequent thoughts or feelings) they have expressed (e.g., based on the labels from the language model output generated based on second system prompt);
Any intervention currently scheduled in the user treatment plan;
What intervention(s) have been suggested by the recommender module 32;
What each of the above interventions entails (short description).

In addition to the above listed information, in some examples, the third prompt generator 52c may generate a third system prompt comprising additional information retrieved from the knowledge bank 33 such as for example:

User's clinical information (e.g., previous diagnosis, previous interventions, current diagnosis, type of therapy that the user is in, other relevant medical information etc);
User's personal characteristics (e.g., goal for therapy, progress so far, clinical state, problem, etc.);
Demographic information (e.g., age, gender, job, race, ethnicity, etc.).

A third system utterance and/or the third system response may include one or more of the following: 1) list of suggested interventions to be performed, 2) rationale behind performing each intervention in the list of interventions, 3) personalized arguments and recommendations. In some examples, the list of suggested interventions may include at most two interventions. For instance, the two interventions may include an intervention from a treatment plan and an intervention identified by the first module 30 as further described below. In some variations, the third system utterance and/or a third system response may also include the user's behavioural pattern. For example, the third system utterance and/or the third system response may include the user's behavioural pattern if it is relevant to the list of suggested interventions.

The third system prompt includes instructions for the language model 21 to generate the third system utterance and/or the third system response. For the third system utterance and/or the third system response to include the rationale behind performing interventions, personalized arguments and recommendations, and/or user's behavioural pattern, the third system prompt includes historical information related to the user. For example, the third system prompt includes information retrieved by the third prompt generator 52c from the knowledge bank 33. In one example, the historical information includes information on the interventions that were previously performed by the user. Additionally or alternatively, the historical information includes frequent thoughts or frequent feelings that the user may have expressed. As an example, if the historical information includes a specific thought has been occurring frequently, then the third system utterance may state this thought pattern to the user and explains why a specific intervention will help with the thought pattern. As another example, if the historical information includes information relating to a personal aspect of the life of the user, then the third system utterance provides an example of how a specific intervention may help improve the personal aspect of the user's life. Additionally or alternatively, the historical information includes the therapy goal for the user. The third system prompt further comprises a transcript of the conversation so far.

For the third system utterance and/or the third system response to include the list of suggested interventions and/or rationale behind performing interventions, the third system prompt includes this information. For example, one or more interventions are identified by the first module 30 as further described below and included in the third system prompt. The third system prompt includes a list of suggested interventions including the identified intervention(s) from the first module 30. The identified interventions may be included in the third system prompt in order of how useful they are determined to be. The suggested interventions may further comprise one or more interventions from a pre-set treatment plan. In this way, the user may presented with interventions from a pre-set treatment plan as well as interventions identified as being useful based on the user conversation. During cognitive-behavioural therapy (CBT), a therapist may follow a pre-set treatment manual for a given mental health condition, which specifies roughly which step to take at each point during treatment. This may include things like reading materials (psycho-education), as well as a broader set of "interventions", which may include behavioural exercises (e.g. relaxation techniques), reflective exercises (e.g. writing down one's worries), and exercises related to one's feelings (e.g. emotion regulation techniques). While most treatment plans will use this manual as a guideline, it is also helpful to take account of what the patient needs at the current moment. For example, the patient may struggle with frequent automatic thoughts (e.g. "I am a failure"). The dialogue application 102 may then suggest to engage in an appropriate intervention (in this case, e.g. cognitive restructuring) to address this issue in a timely manner. Thus the dialogue application 102 may provide the user with the option to stick to the treatment manual or to engage in immediate action. Whenever this question arises, the user will decide the next action, making this process highly collaborative.

Furthermore, for the third system utterance and/or the third system response to include a rationale behind performing the list of interventions and/or the identified intervention, the third system prompt includes a short description of each of the interventions (e.g., providing a description of what the intervention entails). Such information relating to the description of the intervention is retrieved from the knowledge bank 33. In this manner, the third system prompt is configured to instruct the language model 21 to motivate the user to perform an intervention.

This context then serves as the basis to gently motivate the user to perform one of the available interventions. The conversation can go on for multiple steps, wherein the language model 21 can provide information about the rationale for each intervention. The third prompt comprises information about the user and their characteristics, allowing the language model 21 to make personalised arguments. For example, it could say: "Worry Diary is an effective intervention for people with anxiety. It could help you better manage your worries around your relationship with your partner", where the second sentence explicitly references something the user has mentioned, making them feel heard and understood.

The third system prompt may include one or more data flags (e.g., label, tag, annotation, flag, etc.) to identify the intervention that the user has chosen. For example, a data flag may be associated with each intervention of the list of interventions and/or with the identified intervention. If the user chooses a specific intervention, the data flag associated with that intervention is set to "true". The flow module 58 may parse the output from the language model to detect the data flag that is set to "true", thereby identifying the intervention that the user has chosen. The third system prompt may comprise an output field, and instruction to the language model to ask to identify the intervention the user wants to do. Once the user has chosen an intervention out of the suggested list, this is delivered as a continuation of their conversation, allowing the language model 21 to reference everything that was said since the user started the coaching session. In other words, the conversation history is included in a fourth prompt, used to instruct the language model to deliver the intervention.

In this step, the fourth prompt generator 52d is configured to generate a system prompt instructing the language model 21 to deliver the intervention to the user. The intervention is delivered in the form of a dialogue (e.g., conversation) with the user. The dialogue may provide instructions to the user of how to perform the intervention, or the dialogue may perform the intervention. The fourth prompt generator 52d generates a fourth system prompt. The fourth system prompt is provided to language model 21 so as to output a fourth system utterance and/or a fourth system response. The fourth system utterance and/or the fourth system responses form a dialogue with the user and include the intervention to be performed by the user.

In one example, the intervention is delivered in a structured manner. For example, the fourth system prompt includes instructions with a specific order of steps to be followed by the user so as to have the user perform the intervention. Put differently, the fourth system utterance and/or the fourth system response is a structured dialogue with the user, comprising a sequence of steps. The fourth system utterance and/or the fourth system responses form a sequence of system utterances that are outputted in a specific order. These sequences of system utterances enable the user to perform the intervention in a specific order. By including a structured list of steps in the fourth system prompt, and instruction to the language model 21 to cover the steps step-by-step, the content of the conversation can be tightly controlled, while also allowing that the language model 21 can respond to what the user says in the moment (e.g. by providing an empathetic response).

In another example, the intervention is delivered in an unstructured manner. For example, the fourth system prompt includes instructions to achieve the goal of the intervention without following steps in a specific order. Put differently, the fourth system utterance and/or the fourth system responses form an unstructured dialogue with the user. The fourth system utterance and/or the fourth system responses form a series of system utterances that are outputted to the user. However, these series of system utterances are not in any particular order. The user achieves the goal of the intervention by engaging with the series of system utterances without following any particular order. The fourth system prompt may comprise a description of what needs to be done in a particular intervention. This is most suitable to interventions which require a lot of user input. For example, if targeting behavioural activation, this will heavily rely on the user giving a list of activities they enjoy and talking about how to integrate these into their day. It is difficult to follow a tight script for this. Such interventions can be provided using the language model 21, whereas a hard-coded chat format may not be suitable.

Accordingly, the fourth prompt receiver 52*d* delivers the intervention to the user in the form of a dialogue. In this example, the intervention is delivered using a fourth prompt generator 56*d*. However, in other examples, it may be delivered in a pre-set chat format.

In the above dialogue flow, the language model 21 annotates and/or labels outputs. As discussed above, the first system prompt, the second system prompt, the third system prompt, and the fourth system prompt include one or more output fields or data flags used by the language model 21 to label and/or annotate the output. The dialogue application 102 further comprises a flow module 58, which may include an output parser to identify which part of the language model output corresponds to which output field. Missing output values may be populated with defaulted values before the full language output is saved in the knowledge bank 33. This information may then be passed to the next component—for example the next prompt generator or the subject understanding module 31. The annotated and/or labelled outputs are tagged to the prompt generator that has generated it and are saved in the knowledge bank 33. Below is an example of formatting instructions provided in a system prompt to the language model 21, where outputs are coming from the language model 21. In this example, the remaining fields are populated outside of the language model 21 (e.g. database inputs, code annotations, etc). Here, two interventions are available to the user in the motivate-intervention component—i.e. the language model 21 prompted by the third prompt generator 52*c*

```
The output should be a markdown code snippet formatted in the following schema, including the leading and trailing "'''json" and "'''":
'''json {
"response": string // Response to the user's input
"finished": string // Flag to indicate whether the user has selected an exercise. This must be either 'True' or 'False'
"chosen_intervention": string // Indicates which exercise has been chosen by the user. Which must be chosen out of the following list ['5 Areas Model', 'Cognitive Restructuring'] } '''
```

FIG. 18 shows the list of output information that may be generated by the language module 21 at various stages in the dialogue. This information may then be included in a subsequent system prompt. The dialogue application 102 comprises four language model stages comprising the four prompt generators, mechanistic models (deep neural networks), and a decision logic layer (the recommender module). However, the conversation with the user is delivered in a seamless way. A user will not notice that the underlying prompt generator has changed thanks to message-passing between the stages. The procedure allows to seamlessly flow from one component to the next, by passing a series of messages and "flags" from a language model output to the next language model prompt, such that a down-stream prompt receives context and guidance from up-stream language model outputs or models. For example, the most relevant user messages from a mechanistic model (e.g. "I am a good person") may be provided in a system prompt such that the language model 21 can reference them in the conversation (e.g. as a "core belief").

A number of different language model-powered components are used as outlined above, which each serve a different function, e.g. to ask the user questions about their mental health or then serve an intervention. To the user, the transition between each component is seamless. For each component, the language model is instructed to generate annotated data. For example, the second prompt generator instructs the language model 21 to indicate whether the user is talking about a thought, or a feeling, or a situation.

Furthermore, each of the first system prompts, second system prompts, third system prompts and fourth system prompts ask the language model 21 to indicate that it has finished the relevant stage of the dialogue. The flow is handled by the flow module 58, which parses the language module output for information indicating that the component has finished. For some components, e.g. the first prompt generator 52*a*, there are additional options, e.g. a flag indicating whether the user wants to do a specific intervention, which can then be served directly. Here, the language model output would indicate which intervention to serve, the flow module 58 would recognise this, retrieve the intervention from the knowledge bank 33, and then jump to the fourth prompt generator 52*d* which delivers interventions. The output data is stored in the knowledge bank 33. The language model output will emit information indicating which down-stream module to call, enabling flexible routing. It may emit additional data on its final call for each component (e.g. which intervention the user has chosen to do) which is then passed on to the relevant down-stream component.

This allows to route the user into different pathways. For example, if a user enters the conversation with a strong intention of doing a specific intervention, this is detected in the initial conversation, and the flow module 58 transitions into delivering this intervention, without calling any of the intermediate steps. Furthermore, each step is explainable. Why a certain action has been taken (e.g. because a negative automatic thought was detected) is stored and can be use this in development as well as in an audit.

Figure 13:
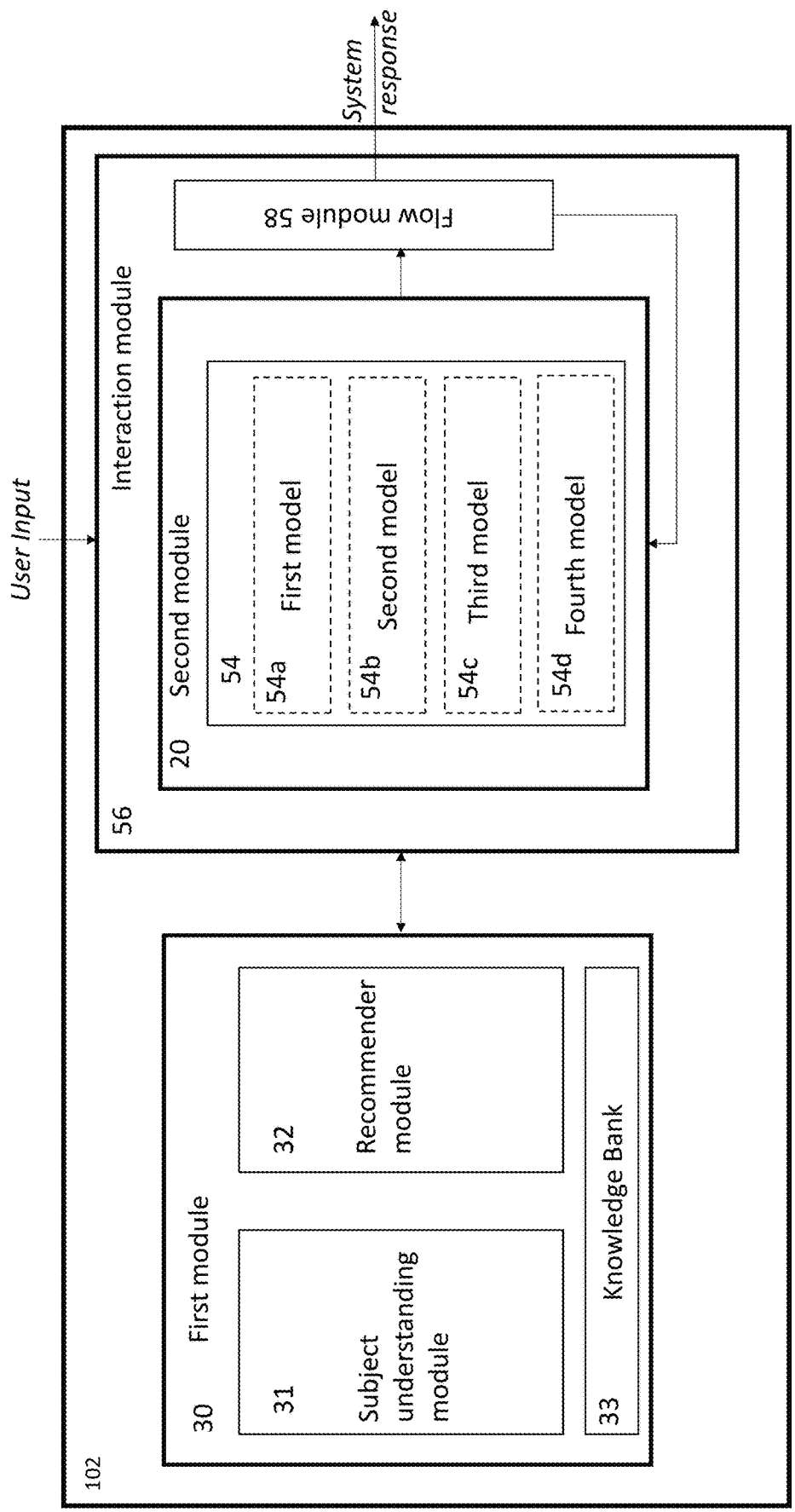
FIG. 13 is a schematic illustration of a dialogue application according to another example.

FIG. 13 is a schematic illustration of a dialogue application 102 according to another example, that may be stored and executed by a dialogue system 100 as described in relation to FIG. 1. Execution of the dialogue application 102 will cause methods as described herein to be implemented. The dialogue application 102 is similar to that described in relation to FIG. 12. However, in this example, the second module 20 comprises: first model 54*a*, second model 54*b*, third model 54*c*, and fourth model 54*d*. The first model 54*a* may comprise one or more neural networks trained to perform the functions of the first prompt generator 52*a* together with the language model as described in FIG. 12. The second model 54*b* may comprise one or more neural networks trained to perform the functions of the second prompt generator 52*b* together with the language model as described in FIG. 12. The third model 54*c* may comprise one or more neural networks trained to perform the functions of the third prompt generator 52*c* together with the language model as described in FIG. 12. The fourth model 54*d* may comprise one or more neural networks trained to perform the functions of the fourth prompt generator 54*d* together with the language model. In alternative examples, the second module 20 may comprise a single model, for example a single neural network trained to perform the above functions.

The first model 54*a* comprises a first neural network trained to generate the first system utterance and/or first system responses. The first model 54*a* may further comprise a further neural network trained to determine whether the input data includes information relating to the clinical state of the user. The second model 54*b* comprises a second neural network trained to generate the second system utterances and/or second system responses. The second model 54*b* may further comprises one or more further neural networks trained to generate structured information from the subsequent input data. The third model 54c comprises a third neural network 54c trained to generate the third system utterances and/or third system responses. The fourth model 54d comprises a fourth neural network 54d trained to generate fourth system utterances and/or the fourth system responses.

Figure 14A:
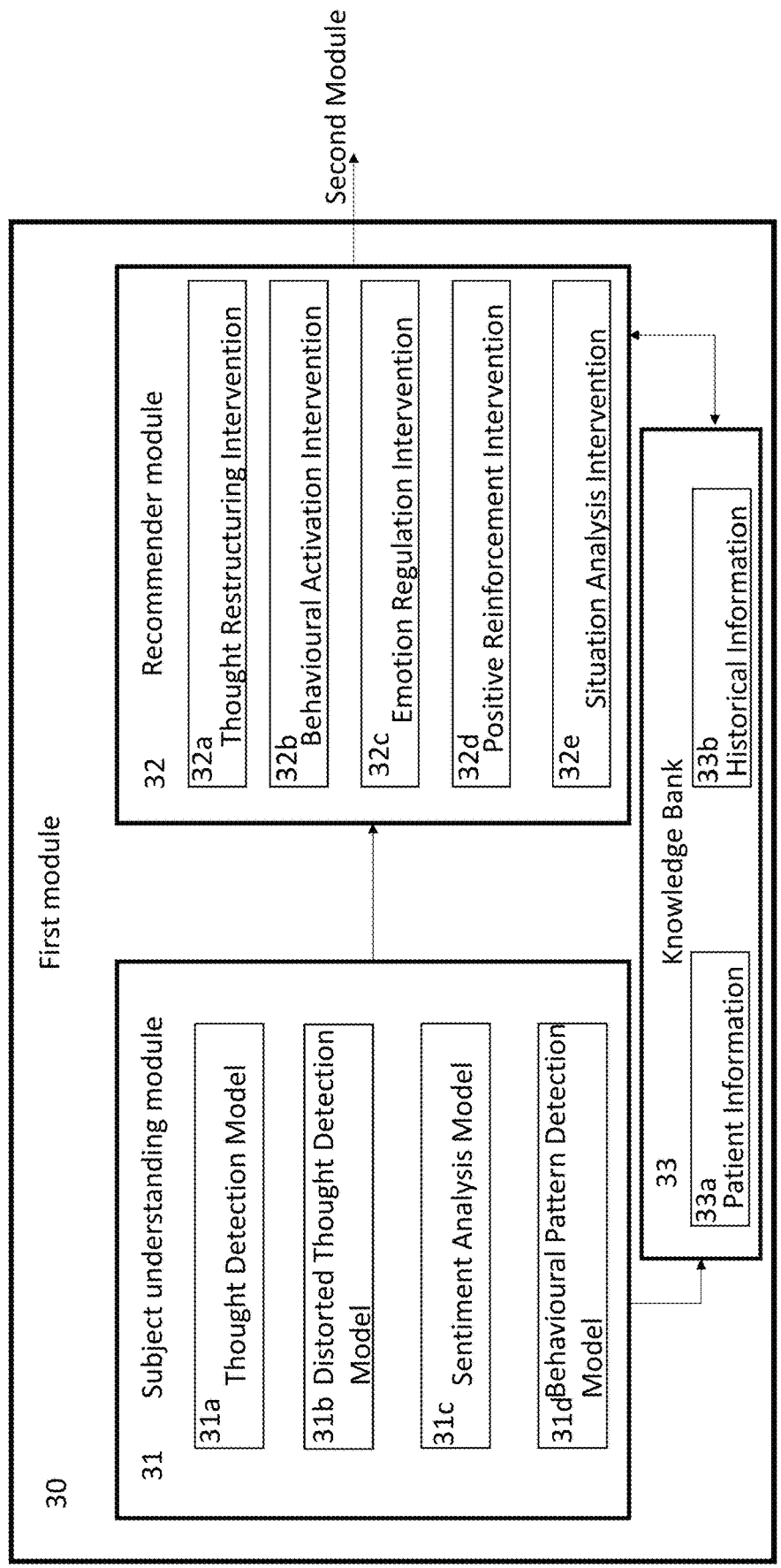
FIG. 14(*a*) is a schematic illustration of a first module according to an example that may be used in a dialogue application.
Figure 14B:
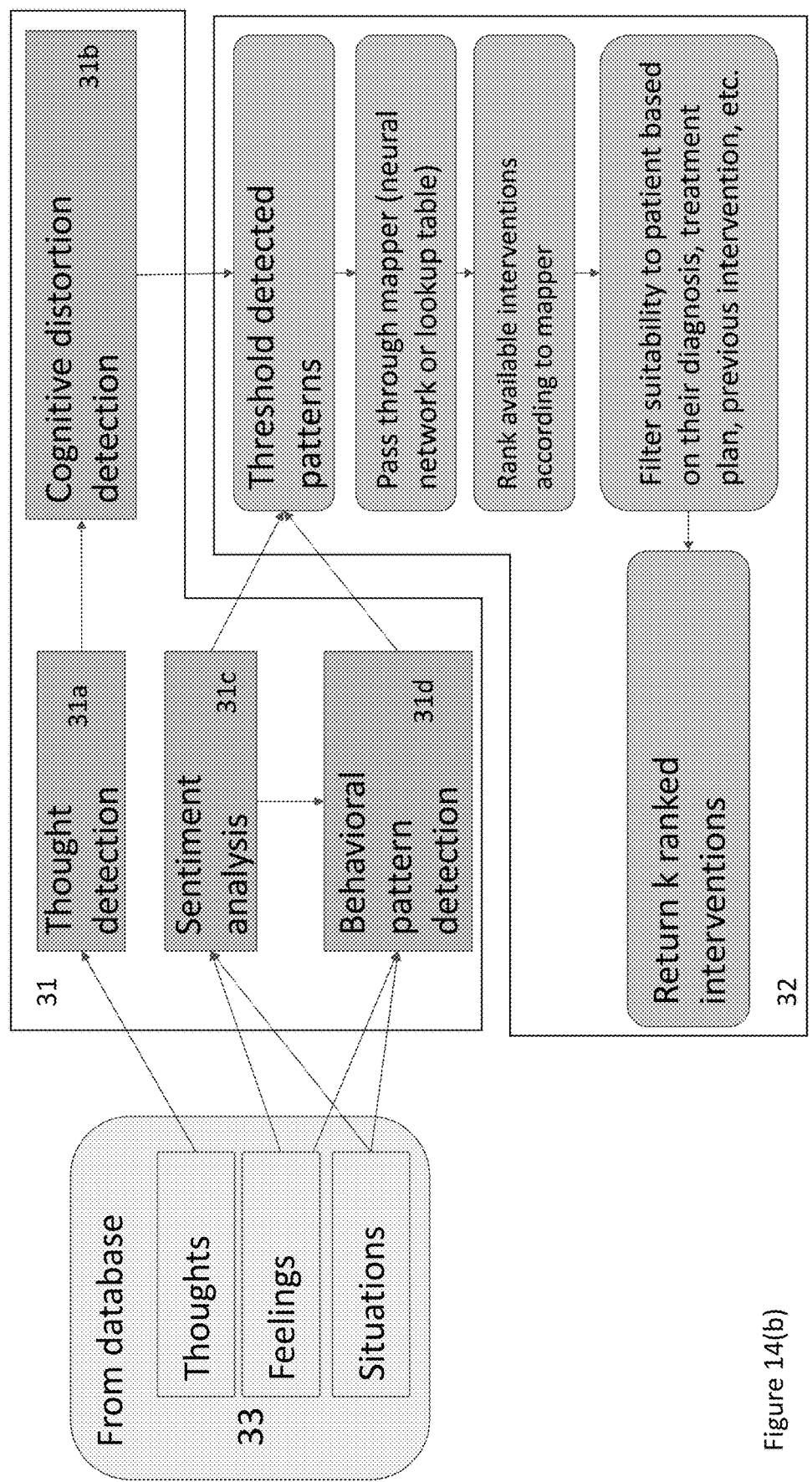

FIG. 14(a) is a schematic illustration of first module 30 that may be included in the dialogue application 102 described in relation to FIG. 12 or in the dialogue application 102 described in relation to FIG. 13 for example. In this example, the first module 30 includes a subject understanding module 31, a recommender module 32, and a knowledge bank 33. FIG. 14(b) is a schematic illustration of the functions performed by these modules.

The interaction module 56 generates structured information from input data (e.g., subsequent input data) received from the user as discussed above. The subject understanding module 31 receives this structured information. The subject understanding module 31 generates subject profile information based on the structured information. The recommender module 31 identifies an intervention for the user based on the subject profile information. In addition to the subject profile information, the recommender module 31 may identify the intervention based on data stored in the knowledge bank 33.

The subject understanding module 31 comprises one or more subject understanding models, also referred to as understanding models. The subject understanding models are also referred to throughout as "mechanistic models." Examples of subject understanding models include thought detection model 31a, distorted thought detection model 31b, sentiment analysis model 31c, and behavioural pattern detection model 31d. Each of the subject understanding models are configured to analyse the structured information generated by the second module 20 to generate subject profile information. These "mechanistic" models are used to draw inferences about the user and their issues. The models are deep learning models with varying parameter counts and are trained using supervised learning with gradient descent on clinician-labelled examples. In some examples, these "mechanistic" models comprise any suitable machine learning methodologies such as for example, neural networks, decision trees, regular expressions, look-up tables, a combination thereof, and/or the like.

The structured information comprises information relating to cognitive behavioural therapy formulation of the user. More specifically, the structured information comprises information derived from subsequent input data (received in response to second system utterances and/or second system responses) received from the user that have been annotated and/or labelled based on cognitive behavioural therapy models (e.g., 5-area model of cognitive behavioural therapy). The subject understanding module 31 categorises the user inputs based on the annotations and/or labels included in the structured information. For example, the structured information may comprise utterances from the user that have been annotated and/or labelled as "thoughts," "feelings," or "situations". The subject understanding module 31 categorises user utterances relating to thoughts into a list of "thoughts," user utterances relating to feelings into a list of "feelings," and user utterances relating to situations into a list of "situations". The subject understanding module 31 lists the user utterances under a respective category based on the labels. The items from one or more of these lists are used as input to each of the understanding models (e.g., understanding models 31a, 31b, 31c, and 31d). In this step, lists of utterances that were given by the user are created following the three categories (thought, feeling, situation).

These are then passed into the mechanistic models. In this step, the user utterances are categorised without having to run complex natural language processing processes that identify these components from each utterance (or entire conversations).

In some examples, a potential issue that there could be a mismatch between what was being asked with what was contained in the user's answer is addressed by classifying (via one or more classifiers) the relevant user responses. For example, the first module 30 includes one or more classifiers (e.g. the thought detection model 31a or activity classifier described below). Labelled user utterances (e.g., user replies labelled as "thought", "feeling" or "situation") are passed to the classifiers. The classifier(s) identify if there is a mismatch between a question included in the system response and the corresponding user input. If there is a mismatch, then the classifier(s) included in the first module 30 classifies the user utterance appropriately. For example, if a question relating to "situation" was transmitted to the user (such as "Can you tell me more about what happened?"), and the user responds with "I am just a bad person", then the flow module 58 labels the user utterance "I am just a bad person" as a "situation" based on the question in the system response. The user utterance with the label is passed on to one or more classifier(s) in the subject understanding module 31 as mentioned above. The classifier(s) identify that the user's response is a thought, and the subject understanding module 31 may classify the user utterance as "situation asked but thought given" and provide this information in the subject profile information. Accordingly, discrepancies between questions transmitted to the user and responses from the user may be identified. The one or more classifiers, such as the thought detection model 31a, are run on a handful of utterances, rather than potentially dozens in an entirely unstructured conversation.

In this example, there is a thought detection model 31a that classifies if the user utterances relates to a thought and detects any discrepancy between the category and the classification (for example where a user utterance categorised as a situation is classified by the thought detection classifier as a thought). In this example, there is also an activity classifier, which forms part of the behavioural pattern detection model 31d. However, in some other examples, the subject understanding module 31 further comprises a feeling classifier, checking whether a user utterance corresponds to a feeling. Such classifiers may be run on all structured utterances.

The thought detection model 31a is configured to identify whether the user utterances are thoughts. The output of the thought detection model 31a is used firstly to exclude user utterances that have been categorised as thoughts but are actually non-thoughts from further analysis by the distorted thought detection model 31b.

The output of the thought detection model 31a may also be used to identify whether the user can differentiate between thoughts, and feelings and situations. Many patients (and the general population) struggle to disentangle thoughts from feelings (and situations), and an intervention may comprise helping patients better separate these aspects. If the user cannot differentiate between thoughts, and feelings and situations, then the recommender module 31 suggests interventions (e.g., situation analysis) based on cognitive behaviour therapy to help the user realize how thoughts impact a situation as further described below. Thus in some examples, all user utterances that have been labelled and/or annotated (e.g., labelled and/or annotated as "thoughts", "feelings", and "situation") in the structured information are passed to the thought detection model 31a. Thoughts that are wrongly labelled and/or annotated in the user utterances are appropriately labelled and/or annotated by the thought detection model 31a. For example, in response to a question relating to a "situation" in the second system prompt, the user may respond with "I am a bad person". The structured information may label and/or annotate this user utterance as "situation" given that the user utterance is in response to a question relating to a situation. This user utterance is passed to the thought detection model 31a. The thought detection model 31a may identify this user utterance labelled and/or annotated as "situation" as in fact being a thought. The thought detection model 31a may annotate and/or label this user utterance as "situation asked but thought given". Accordingly, erroneously labelled and/or annotated in the user utterances may be appropriately labelled and/or annotated by the thought detection model 31a, and this indicated in the subject profile information.

Each user utterance from the list of user utterances is taken as input to the thought detection model 31a in turn. The input utterance is first transformed into a vector representation by the thought detection model 31a. The vector representation is an embedding. The vector representation is generated using a pre-trained sentence embedder. For example, the thought detection model 31a comprises a pre-trained general embedding model. For example, a sentence embedding may be generated using a model from the SentenceBERT family. An implementation is described in the paper "sentence-BERT", Reimers & Gurevych, 2019, see arXiv:1908.10084 the entire contents of which are incorporated by reference herein. In one embodiment, the embedding has a size of 1024 dimensions.

The thought detection model 31a comprises a deep learning algorithm which is trained to classify whether a user utterance represented by the input vector representation is a thought or a non-thought. In this example, the thought detection model 31a comprises a two layer feedforward neural network with Gaussian Error Linear Unit activation and a Softmax output layer. In this example, the model has 20,542 trainable parameters. The neural network outputs a probability that the processed utterance is a thought. The higher the probability value, the higher likelihood of the user utterance being a thought in this example. Applying the deep learning algorithm to the vector representation allows the thought detection model 31a to evaluate whether a user utterance is a thought. The thought detection model 31a may output the user utterances that it identifies as a thought, for example the user utterances corresponding to a probability greater than or equal to a threshold value, together with the probability.

The deep learning algorithm is trained using a training dataset, prior to implementation of the system 100. The training dataset may comprise historical patient utterances and may be used to learn the weights of the deep learning algorithm prior to implementation of the dialogue system 100. The training data may comprise clinician-labelled datasets, which may comprise a number of example patient utterances. To prepare the training dataset, a number of clinicians review the patient utterances and label them as corresponding to a "thought" (these utterances are given the label 1) or not a thought (these utterances are given the label 0). The training data comprises data associated with an individual or a group of individuals. A training data set may include data collected for a given individual, and the deep learning algorithm (e.g., for the individual or other persons) may be trained using the individual training data set. This may enable generating deep learning algorithms that are tailored to trends for the individual. A training data set may include data collected for multiple individuals, and the deep learning algorithm (e.g., for some or all of the individuals in the group or other persons) may be trained using the group training data set. This may enable generating deep learning algorithms that benefit from a relatively large data set that incorporates general trends across multiple individuals. In some examples, further data can be collected as the deep learning algorithm is used and further training can be performed. In this example, the deep learning algorithm is trained using supervised learning with gradient descent and binary cross-entropy loss (as has been described previously) on N-examples.

After the thought detection model 31a has identified thoughts from the user utterances, the distorted thought detection model 31b detects whether any of those thoughts are distorted. For instance, a distorted thought could be all-or-nothing thinking such as "I am a failure," generalisations such as "everyone hates me," or other cognitive distortions. The distorted thought detection model 31b detects whether such distortions exist in user utterances that have been identified as thoughts by the thought detection model 31a. The distorted thought detection model 31b is an example of a cognitive distortion understanding model 300 as has been described previously. Automated detection is performed because most people do not readily recognize their own distorted thoughts, so need careful feedback and challenging.

Each user utterance from the list of user utterances identified as thoughts by the thought detection model 31a is taken as input in turn. The input utterance is transformed into a vector representation. The vector representation generated previously by the thought detection module 31a may be retrieved. Alternatively, the vector representation is generated using a pre-trained sentence embedder. For example, a pre-trained sentence embedding may be generated using a SentenceBERT based model, such as described in the paper "sentence-BERT", Reimers & Gurevych, 2019, see arXiv:1908.10084 the entire contents of which are incorporated by reference herein. In one embodiment, the embedding has a size of 1024 dimensions.

In this example, the distorted thought detection model 31b comprises a deep learning algorithm which is trained to classify whether a user utterance that has been identified as a thought represented by the input vector representation is a distorted thought or not a distorted thought. For example, the distorted thought detection model 31b comprises a two layer feedforward neural network with Gaussian Error Linear Unit activation and a Softmax output layer. In this example, the model has 30,812 trainable parameters in total. The neural network outputs a probability that the processed utterance is a distorted thought. The higher the probability value the higher likelihood of the thought being distorted in this example. Applying the deep learning algorithm to the vector representation allows the distorted thought detection model 31b to evaluate whether a user utterance identified as a thought is distorted. The distorted thought detection model 31b may output distorted thoughts, for example user utterances corresponding to a probability greater than or equal to a threshold value, together with the probability value.

The deep learning algorithm is trained using a training dataset, prior to implementation of the system 100. The training dataset may comprise historical patient utterances (sequences of text) and may be used to learn the weights of the deep learning algorithm prior to implementation of the dialogue system 100. The training data may comprise clinician-labelled datasets, which may comprise a number of example patient utterances. To prepare the training dataset, a number of clinicians review the patient utterances and label them as corresponding to a "distorted thought" (these utterances are given the label 1) or not a distorted thought (these utterances are given the label 0). The training data comprises data associated with an individual or a group of individuals. A training data set may include data collected for a given individual, and the deep learning algorithm (e.g., for the individual or other persons) may be trained using the individual training data set. This may enable generating deep learning algorithms that are tailored to trends for the individual. A training data set may include data collected for multiple individuals, and the deep learning algorithm (e.g., for some or all of the individuals in the group or other persons) may be trained using the group training data set. This may enable generating deep learning algorithms that benefit from a relatively large data set that incorporates general trends across multiple individuals. In some examples, further data can be collected as the deep learning algorithm is used and further training can be performed. In this example, the deep learning algorithm is trained using supervised learning with gradient descent and binary cross-entropy loss on N-examples, as has been described previously in relation to the cognitive distortion understanding model 300 shown in FIG. 4 above.

The sentiment analysis model 31c is configured to detect whether a user utterance (e.g., user utterance annotated and/or labelled as "feelings" or "situation") relates to a negative sentiment or a positive sentiment. Detecting negative sentiment in a user utterance may be useful while determining an intervention for the user. For example, the dialogue application 102 may recommend an intervention to challenge a negative sentiment if a negative sentiment is detected. Similarly, the dialogue application 102 may recommend an intervention to better regulate negative emotions if a negative sentiment is detected. In a similar manner, the dialogue application 102 may recommend an intervention to get the user physically active or to repeat positive experiences if a negative sentiment is detected.

Each utterance from the list of user utterances which are "feelings" and the list of user utterances which are "situations" is taken as input in turn. An example of a trained model that may be used as a sentiment analysis model 31c is described in "pysentimiento: A Python Toolkit for Sentiment Analysis and SocialNLP tasks", Juan Manuel Pérez, Juan Carlos Giudici and Franco Luque, arXiv:2106.09462, the entire contents of which are incorporated by reference herein, and is available at https://huggingface.co/finiteau-tomata/bertweet-base-sentiment-analysis. Applying the deep learning algorithm allows the sentiment analysis model 31c to evaluate whether a user utterance includes positive sentiment, negative sentiment, or neutral sentiment. The model takes in an embedded utterance, again of 1,024 dimensions, and emits one of three labels: positive, neutral or negative sentiment. The sentiment analysis model 31c outputs user utterances classified as negative sentiments, user utterances classified as neutral sentiments, and user utterances classified as positive sentiments, together with the corresponding probabilities. In some examples, a softmax function is applied to the output, to produce a vector of probability values, each value corresponding to the three labels positive, negative, and neutral. For example, the sentiment analysis model 31c may output a user utterance with a vector of probability values corresponding to positive, negative, and neutral (e.g., positive: 0.8, neutral: 0.1, negative: 0.1), thereby classifying the user utterance based on the corresponding probability.

Figure 10:
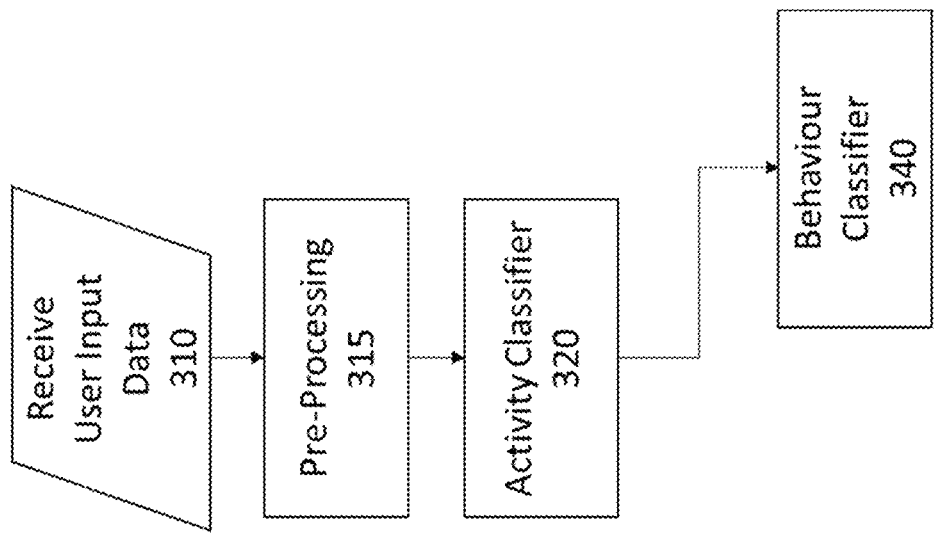
FIG. 10 shows an example where the user input is evaluated.

After the sentiment analysis model 31c detects whether a user utterance is related to a negative sentiment, a positive sentiment, or a neutral sentiment, the behavioural pattern detection model 31d determines whether the user utterance classified by the sentiment analysis model 31c as positive or negative relates to an activity. Detecting an activity may be useful while determining an intervention for the user. For example, if the user has low activity levels, an intervention to improve the activity of the user can be recommended, or to reinforce positive experiences the patient has described. One core assumption within CBT is that one's activities influence one's feelings, meaning that improving activity levels is often a core part of treatment to improve the patient's underlying mood or anxiety issues. In one example, the behavioural pattern detection model 31d is the same as the behavioural understanding model described above (e.g., in relation to FIG. 6 and FIG. 10).

Each input user utterance is transformed into a vector representation. The vector representation is generated using a pre-trained sentence embedder. For example, embedding may be generated using a pre-trained Bidirectional Encoder Representations from Transformers (BERT). In one embodiment, the embedding has a size of 1024 dimensions.

In this example, the behavioural pattern detection model 31d comprises a deep learning algorithm which is trained to classify whether a user utterance represented by the input vector representation is an activity. This is referred to as an activity classifier. For example, the behavioural pattern detection model 31d comprises a two layer feedforward neural network with Gaussian Error Linear Unit activation and a Softmax output layer. In this example the model comprises 52,576 trainable parameters. Applying the deep learning algorithm to the vector representation allows the behavioural pattern detection model 31d to evaluate whether a user utterance relates to an activity.

The deep learning algorithm is trained using a training dataset, prior to implementation of the system 100. The training dataset may comprise historical patient utterances (sequences of text) and may be used to learn the weights of the deep learning algorithm prior to implementation of the dialogue system 100. The training data may comprise clinician-labelled datasets, which may comprise a number of example patient utterances. To prepare the training dataset, a number of clinicians review the patient utterances and label them as corresponding to an "activity" or not an activity. The training data comprises data associated with an individual or a group of individuals. A training data set may include data collected for a given individual, and the deep learning algorithm (e.g., for the individual or other persons) may be trained using the individual training data set. This may enable generating deep learning algorithms that are tailored to trends for the individual. A training data set may include data collected for multiple individuals, and the deep learning algorithm (e.g., for some or all of the individuals in the group or other persons) may be trained using the group training data set. This may enable generating deep learning algorithms that benefit from a relatively large data set that incorporates general trends across multiple individuals. In some examples, further data can be collected as the deep learning algorithm is used and further training can be performed. In this example, the deep learning algorithm is trained using supervised learning with gradient descent and binary cross-entropy loss on N-examples.

After the user utterances are classified as activity or not an activity, then the behavioural pattern detection model 31d is further configured to identify whether a detected activity is a positive activity or a negative activity. For example, the behavioural pattern detection model comprises a clustering algorithm. The clustering algorithm in this example identifies which out of a list of pre-determined activities (equally split between positive and negative) the activity belongs to. A list of pre-determined activities are split equally as positive activities and negative activities. If a user utterance relates to an activity, then the behavioural pattern detection model 31d implements the clustering algorithm. The clustering algorithm identifies an activity from the list of pre-determined activities that the activity in the user utterance is the closest to. If the activity in the user utterance belongs to a positive activity in the pre-determined list then it is classified as a positive activity. If the activity in the user utterance belongs to a negative activity in the pre-determined list then it is classified as a negative activity. Put differently, the behavioural pattern detection model 31d classifies a user utterance with an activity into one of a pre-determined list of activities. The pre-determined list of activities are split as negative activities and positive activities. The pre-determined list of negative and positive activities may be stored in a look-up table. Once the behavioural pattern detection model 31d classifies the user utterance as one of the pre-determined list of activities, the look-up table may be retrieved to identify whether the classified activity is a positive activity or a negative activity. Accordingly, the user utterance may be classified as a positive activity or a negative activity.

Therefore, the behavioural pattern detection model 31d outputs a list of positive activities and negative activities from the user utterances. In one example, the list of pre-determined activities comprise 12 activities equally split as positive activities and negative activities. The output of the behavioural pattern detection model 31d is a list of detected positive and negative named activities, together with the probabilities. For instance, a softmax function is applied to the output, to produce a vector of probability values, each value corresponding to an activity from the pre-determined list of activities (e.g., a 12-dimensional vector with each value corresponding to each of the 12 activities). The user utterance is classified as an activity from the pre-determined list of activities with the highest probability value. The behavioural pattern detection model 31d determines whether the activity from the pre-determined list that the user utterance was classified into is a positive activity or a negative activity (e.g., by retrieving and/or accessing a look-up table). In one example, negative activity includes reduced activity such as for example, not doing anything.

Accordingly, the thought detection model 31a determines whether a user utterance classified as a thought is actually a thought. The distorted thought detection model 31b determines whether the user utterance identified as thought by the thought detection model 31b is a distorted thought. The sentiment analysis model 31c identifies whether a user utterance relates to positive sentiment, negative sentiment, or neutral sentiment. The behavioural pattern detection model 31d lists out positive activities and negative activities in user utterances.

In this example, the subject understanding module 31 is configured to annotate and/or label each user utterance with the outputs of the subject understanding models (e.g., thought detection model 31a, distorted thought detection model 31b, sentiment analysis model 31c, behavioural pattern detection model 31d). Some non-limiting examples of annotations and/or labels include "difficulties analysing situation detected", "positive activity detected", "reduced activity detected", "distorted thought detected", etc. For example, if a user utterance includes "I am a failure," then the thought detection model 31a identifies this user utterance as a thought and outputs the user utterance classifying it as a thought. The distorted thought detection model 31b identifies that the thought is a distorted thought and outputs the user utterance classifying it as a distorted thought. The subject understanding module 31 annotates and/or labels this user utterance as a "distorted thought". For instance the subject understanding module may annotate and/or label as, distorted thought detected: ["I am a failure"]. As another example, if user utterance includes "struggle to get out of bed," then the behavioural pattern detection model 31d identifies this as a negative activity and lists the user utterance under the list of negative activities. The subject understanding module 31 annotates and/or labels this user utterance as "negative activity." For instance the subject understanding module 31 may annotate and/or label as, reduced activity detected: ["struggle to get out of bed"]. The output of the subject understanding model may comprise the following for example:

--- reduced activity detected: ["struggle to get out of bed", "haven't left the house much"]
Automatic thoughts detected: ["I am a failure"]

---

In one example, when the sentiment analysis model 31c classifies a sentiment in a user utterance as "negative" and the behavioural pattern detection model 31d classifies the user utterance as "negative activity", the subject understanding module 31 may annotate and/or label the user utterance as "reduced activity".

In this manner, the subject understanding module 31 generates subject profile information of the user. The subject profile information may be used by the recommender module 32 to identify an intervention for the user. The subject profile information may also be provided to the interaction module, and included in the third prompt and optionally the fourth prompt.

The subject profile information may be stored in a knowledge bank 33. The knowledge bank 33 comprises stored therapy-related knowledge. For instance, the knowledge bank 33 comprises therapy-related knowledge relating to the users of the dialogue application 102. In this example, the knowledge bank 33 comprises patient information 33a and historical information 33b. Patient information 33a incudes demographic information of each user of the dialogue application. For example, patient information 33a includes age, location, gender, race, ethnicity, etc. of each user of the dialogue application 102. In addition, patient information 33a also includes ground truth information relating to the users of the dialogue application 102. For example, patient information includes responses to questionnaires answered by the users, therapist diagnosis etc. Historical information 33b includes a history of therapy-related information relating the users of the dialogue application 102. For example, historical information 33b includes history of interventions recommended to a user, interventions completed by a user, the number of times a user has performed a specific intervention, when the interventions were performed, etc.

The knowledge bank 33 may be stored in a memory device such as a random access memory (RAM), a memory buffer, a hard drive, an erasable programmable read only memory (EPROM), an electrically erasable read-only memory (EEPROM), a read-only memory (ROM), Flash memory, and the like. Additionally and/or alternatively, the knowledge bank 33 may be stored on a cloud-based platform such as Amazon web Services®.

The recommender module 32 identifies interventions based on the subject profile information from the subject understanding module 31. In addition, the recommender module 32 may base the identification of interventions on other information retrieved from the knowledge bank 33 for example. In one example, the recommender module 32 may base the identification of interventions based on previous diagnosis of the user, demographic information of users of the app, app usage data of users, and feedback provided by the users. The identified interventions are delivered to the user by the interaction module 56.

In some examples, after the dialogue application 102 engages with the user and/or delivers an intervention, the first module 30 may be configured to monitor feedback from the user in response to the interventions. The first module 30 analyses the feedback to gain insights about the user. Put differently, the first module 30 may use knowledge gained from the user to gain insights about the user. Additionally or alternatively, the second module 20 may implicitly gain insights about the user (e.g., based on the language model's 21 interaction and/or engagement with the user). These insights may be used by the recommender module 32 while identifying interventions.

In this example the following information is taken as input to the recommender module 32. The thought detection model 31a outputs any utterances that were originally categorised as situations (based on the label) but are classified as thoughts, and the corresponding classification probabilities. The distorted thought detection model 31b outputs any distorted thoughts and a corresponding probability. The sentiment analysis model 31c outputs any negative sentiments or positive sentiments and corresponding probability. The behavioural analysis model lists any negative and positive activities of the user, together with the corresponding probabilities.

The recommender module 32 applies a threshold to the probability values. More specifically, the recommender module 32 applies a threshold value to the probability with which a subject understanding model outputs and/or classifies a user utterance. The recommender module 32 compares the probability outputted by a subject understanding model to a threshold. Thus the probability of each inferred state (e.g. presence of a distorted thought) is thresholded, so that only sufficiently strong states cross that threshold. In one example, each state (such as for example, distorted thought, negative activity, negative sentiment, positive sentiment, positive activity, situation/thought discrepancy) may be associated with a pre-determined threshold probability value. The same threshold may be used for each state. The state and associated threshold value may be stored in a look-up table. The look-up table may be retrieved and/or accessed to identify states that cross the pre-fixed threshold values. All the user utterances that exceed the threshold are then ranked against each other. The user utterances are sorted based on their ranks. The sorted user utterances and their corresponding state(s) are mapped to one or more goals/interventions as discussed below. In this manner, the recommender module 32 may identify an intervention or determine a goal for the user.

In some examples, the recommender module 32 may determine that the information is insufficient to identify interventions. For example, the recommender module 32 may receive the subject understanding profile and corresponding probabilities from the subject understanding module 31. If none of the probabilities are greater than the threshold values, then the recommender module 32 may identify that there is insufficient information to identify interventions. The recommender module 32 may instruct the interaction module 56 to engage in further conversations with the user. For instance, the recommender module 32 may instruct the interaction module 56 to explore the top K states (based on their probability values) with the user, through further interaction, by generating additional second system prompts for the language model for example. K is a positive integer number, which is pre-determined. The additional data from the interaction module 56 may be used by the subject understanding module 31 and the recommender module 32 to generate an updated subject understanding profile and to identify interventions. This could happen as a loop wherein the recommender module 32 analyses the available data, decides that no sufficient evidence is available (e.g. where no interventions meet the relevant thresholds), then instructs the interaction module 56 to engage in conversation with the user to explore the top-K sub-threshold interventions, then run the analysis again, which could happen for a fixed number of steps, or until some other criterion is met.

Thus the probability of each inferred state (e.g. presence of a distorted thought) is thresholded, so that only sufficiently strong states cross that threshold. All the user utterances that exceed the threshold are then ranked against each other in order to chose the most likely states to determine the selected goal. As discussed above, in this example, the possible states are:

1. Distorted thought;
2. Negative activity;
3. Negative sentiment;
4. Positive sentiment;
5. Positive activity;
6. Situation asked but thought given.

The recommender module 32 thus determines a list of one or more k most likely labels from the list 1 to 6 above, also referred to as states, from the subject profile information. Thus a list of k most likely states is generated, where k is a pre-determined positive integer.

The k most likely states are then provided to a mapper in the recommender module 32. In this example, the recommender module 32 comprises decision logic to identify one or more interventions for the user. In other examples, the mapper may comprise a trained model, for example a trained neural network for example). The decision logic maps the k outputs from the subject understanding module 31 to a pre-determined list of interventions. The pre-determined list of interventions may be stored in the recommender module 32. Additionally or alternatively, the pre-determined list of interventions may be stored in the knowledge bank 33.

In one example, the decision logic comprises a set of rules to determine the suggested list of interventions from the pre-determined list of interventions. In one example, the decision logic comprises a lookup table. The mapper is configured to map the user utterances to one or more interventions from the pre-determined list of interventions. The pre-determined list of interventions in this is example is:

1. Thought restructuring—this involves challenging difficult thoughts and encourages the user to reflect on evidence for and against a given thought;
2. Behavioural activation—this involves encouraging the patient to be more physically active and/or encouraging the patient to perform an activity that the patient enjoys but doesn't do as much;
3. Emotion regulation—this is involves teaching techniques to better regulate negative emotions;
4. Positive reinforcement—this involves trying to reinforce positive experiences the patient has described and encourages users to engage in the activities that made them feel positive more often. Positive reinforcement is described in more detail below.

Behavioural activation and positive reinforcement achieve something similar, but act at different times: behavioural activation encourages the user to do something they have not done a lot recently, whereas positive reinforcement acts right after they have done something which they enjoy.

5. Situation analysis—involves the following steps:
   a. Explain to the user that CBT is based on the idea that it is not the situation that impacts how we feel and what we do, it is the thoughts we have about the situation. For example, someone bumping into the user doesn't impact how the user feels, rather the thought or belief that the user has about the person bumping into them (eg. "they did that on purpose") impacts how the user feels. In this example, thinking "they did that on purpose" will have a different impact on mood (and what the user does) than thinking "that must have been an accident".
   b. Ask the user to tell a recent situation that made them feel low or anxious. They should be as specific as possible about what happened.
   c. Ask the user what thoughts they had when in this situation.
   d. Ask the user what the consequence was in this situation. Did it make them feel low or anxious? Did it make them do something, like get away from the situation or say something they later regretted.
   e. Lastly, the user should be supported to see that the thought they identified in step c led to the consequence they identified in step d. If the user wants to stop this cycle in the future then they can use thought challenging.

To deliver positive reinforcement as an intervention, the user should have displayed positive activity (e.g., positive activity identified by the behavioural pattern detection model 31d such as socializing, exercising, etc.) and positive sentiment (e.g., positive sentiment identified by the sentiment analysis model 31c) towards the positive activity. For example, consider that the structured information generated by the dialogue application 102 includes a situation: "I went for a run" and an emotion: "it made me feel great". The behavioural pattern detection model 31d may identify the situation as a positive activity and the sentiment analysis model 31c may identify the emotion as a positive emotion. In such an example, the recommender module 32 may identify positive reinforcement as an intervention to be delivered to the user. In another example, consider that the structured information generated by the dialogue application 102 includes a situation: "I was watching TV and eating crisps" and an emotion: "it made me feel great". The behavioural pattern detection model 31d may identify this behaviour as a negative activity (or reduced activity) and the sentiment analysis model 31c may identify the sentiment as positive sentiment. In such an example, the recommender module may not determine positive reinforcement as an intervention for the user.

Similarly, consider that the structured information includes a situation: "I went for a run" and an emotion: "I absolutely hated every second of it". In such an example, the recommender module 32 may still not identify positive reinforcement as an intervention for the user since the sentiment towards the activity is negative sentiment.

The mapper performs the following mapping. If a distorted thought is included in the list of k most likely labels from the subject profile information, thought restructuring is identified as an intervention. If a negative activity is included, behavioural activation is identified. If negative sentiment is included, emotion regulation is identified. If both positive sentiment and positive activity are included, positive reinforcement is identified. If one or more utterances labelled as situations were judged by the thought detection module to be thoughts, then situation analysis is selected. Thus in this example, decision logic is used to identify which out of a set of CBT interventions the user may benefit most from. Each subject understanding model output triggers a specific intervention. For example, if automatic thoughts are detected, the algorithm would recommend "thought restructuring". The mapper maps the user utterances to one or more interventions from the pre-determined list of interventions based on the annotations and/or labels outputted by the subject understanding module 31.

The selected interventions may be ranked, using the order of probability of the states. The recommender module 32 may then filter the ranked interventions based on information retrieved from the knowledge bank 33 (e.g., patient data and/or historical data). In this example, this step filters out previously performed interventions. In other examples, the filtering is performed based on suitability to patient, for example based on their diagnosis, treatment plan, previous intervention, etc. In some examples, filtering may be performed based on knowledge about the user (e.g., a user in an abusive relationship with a partner may not be asked to restructure their thoughts about the partner, a user with heart disease may not be encouraged to perform physical exercise, etc.).

These ranked and filtered interventions are delivered as identified interventions to the interaction module 56, and included in the third prompt as described previously.

The recommendation module 32 processes the output of the mechanistic models 31 and makes a recommendation about the treatment as an immediate step (not as a long-term plan). The first module 30 takes in a structured conversation history (annotated to reflect whether a user's utterance was a "thought" or a "sentiment" or a "situation"), processes this using a set of mechanistic models 31, maps this output to a "goal" (in most cases a treatment intervention) using the recommender module 32, and then serves this to the interaction module 56, which takes in further inputs (the patient's goal of therapy, history, characteristics, etc) and motivates the user to choose between a set of interventions (one or more if there is already one in the treatment plan). This intervention will then be served using the fourth prompt generator 52d to prompt the language model 21.

In this example, the recommender module 32 comprises decision logic. One or more pre-determined threshold values are used to select subject profile information, which is then used to identify one or more interventions. In this example, a fixed pre-determined threshold is used. In some examples however, a deep learning model may be implemented to determine the threshold values. For example, starting with random thresholds for each state from the subject profile information, the thresholds can then be updated to maximise future symptom reduction. This is an example of learning a policy over possible interventions, where the inputs are the probabilities determined by the subject understanding module.

In other examples, the recommender module may comprise one or more trained specialised machine learning prediction models to predict the most effective goal given the state inputs. For example, a reinforcement learning model may be used, in which the states correspond to the states and probabilities output from the subject understanding modules and the actions correspond to the interventions. A deep-learning or tree-based model optimised for symptom reduction using reinforcement learning of time-series forecasting may be used to predict which intervention reduced symptoms most effectively. In some other examples, a deep-learning or tree-based model optimised to meet clinician recommendations, for example using a dataset with the user utterances as inputs and the clinician-labelled recommendations as target data. In such examples, the training data may include clinician labelled user utterances and/or clinician labelled states.

The recommender model 32 may identify one or more interventions for the user while optimizing and/or maximizing one or more of the target metrics. The machine learning models may identify one or more interventions while optimizing and/or maximizing one or more of the target metrics. Some non-limiting examples of target metrics include therapeutic alliance, patient outcomes, and information gain. Therapeutic alliance encapsulates user engagement with the dialogue application 102. For instance, therapeutic alliance defines whether user engagement with the dialogue application 102 is short term or long term based on insights about the user. For example, these insights may be generated based on information such as, whether the dialogue application 102 has been understanding the user, the trust and bond that the user may have developed with the dialogue application 102, and/or the like. Patient outcomes may measure the changes experienced by the user following a dialogue with the dialogue application 102. For instance, dialogue application 102 may ask the user to rate their mood after the dialogue application 102 delivers an intervention. Additionally or alternatively, the dialogue application 102 may provide questionnaires for the user to fill out periodically (e.g., weekly) to gauge the mood of the user. Furthermore, the dialogue application 102 may analyse interactions of the user with the dialogue application 102 following interventions. These may provide insights about the changes that the user experiences following a dialogue with the dialogue application 102. Information gain captures metrics such as for example, a certainty with which the subject understanding module 31 may generate the subject profile information. In some examples, the recommender module 32 may be configured to identify interventions while maximizing and/or optimizing all three of the target metrics. In other examples, the recommender module 32 may be configured to identify interventions while maximizing and/or optimizing any two of the target metrics. In other examples, the recommender module 32 may be configured to identify interventions while maximizing and/or optimizing any one of the target metrics.

Thus in some examples, the recommender module 32 may comprise one or more machine learning models to identify interventions. For example, the recommender module 32 may comprise a neural network that is trained to maximize one or more metrics described above such as for example, therapeutic alliance, patient outcomes, or insights. The model may be trained based on reinforcement learning and/or based on supervised learning.

The recommender module 32 identifies a set of one or more interventions for the user to choose from. For instance, the recommender module 32 identifies a set of interventions and ranks them in order of effectiveness. The interaction module 56 includes the one or more interventions in the third prompt. One or more additional interventions may also be included in the third prompt—for example from a treatment plan. The user then selects an intervention from these suggested interventions. The interaction module 56 then delivers this selected intervention to the user.

Figure 15:
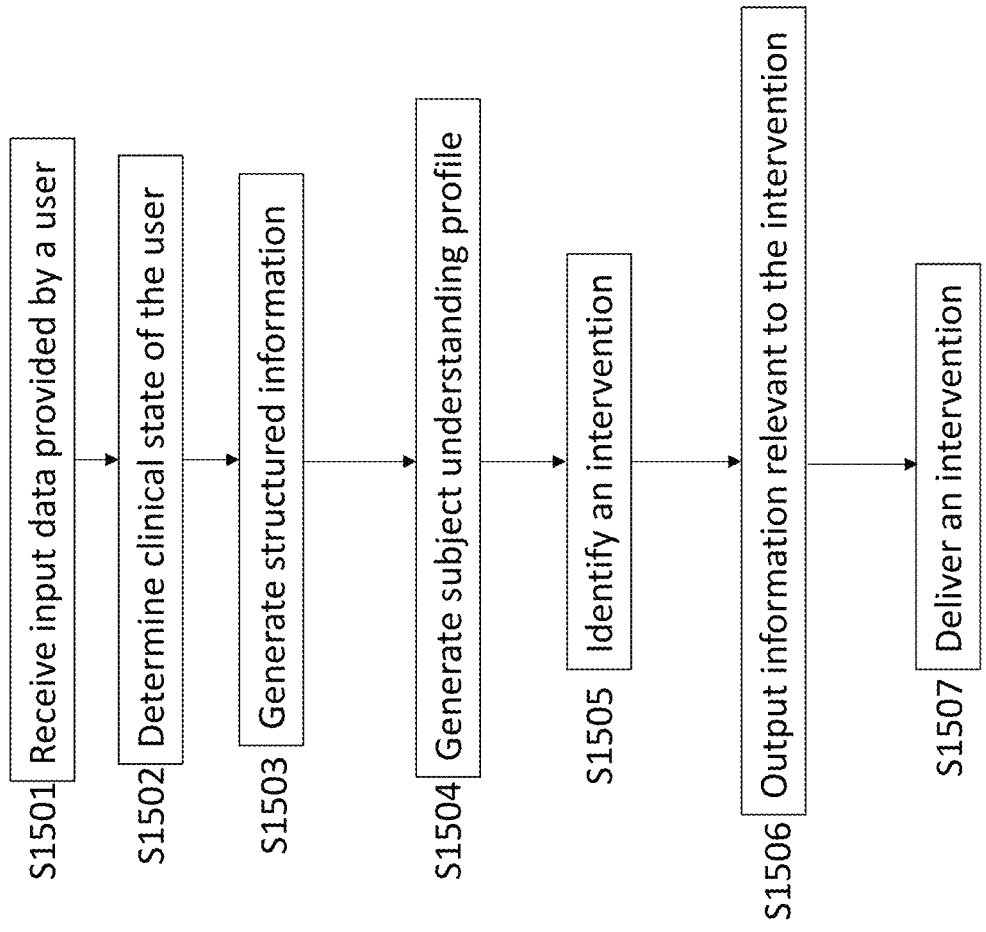
FIG. 15 shows a flow chart of a dialogue method according to another example, that may be performed by the dialogue application when executed on the dialogue system.

FIG. 15 shows a flow chart of a dialogue method according to an example, that may be performed by the dialogue application 102 when executed on the dialogue system 100 as described above. The method in FIG. 15 will be described with reference to example system prompts provided to one or more language models to engage with the user and to identify an intervention for the user.

In S1501, input data from the user is received. In S1502, the method includes determining whether the input data includes information relating to the clinical state of the user. In S1502, the input data is included in a first system prompt. The method includes generating a first system prompt (e.g., first system prompt described in FIG. 12) with one or more data flags to a language model. As discussed with reference to FIG. 12, the first system prompt may include a first flag to identify whether the input data includes a user intention to perform a specific intervention, a second flag to identify whether the input data includes information relating to a clinical state of the user, and third flag to identify whether to terminate dialogue with the user. Below is an example of a stored text template used to generate the first system prompt provided to a language model:

---

You are responding to the following user conversation:
{history}
User: {user_input}
You are a chatbot tool acting as a good friend, who is using techniques from person-centred counseling, supports the user, listens to their concerns, helps them vent and work through their issues.
Your name is Limbic.
You are helping the user work towards the following long term goal, but they may have different issues
in the moment:
[Goal]: {goal}
Help them think deeply about their issue and work through it themselves.
Try not to mirror or repeat what the user says exactly.
If you need to refer to what they said before, rephrase and summarize.
Try to keep your messages brief.
In 50% of your responses, end your messages with insightful, but not distressing, provocative or probing questions about what the user has said before.
In the other 50% of your responses, when appropriate, aim to support and empathize, without directly
endorsing or agreeing with the user's opinions and don't end your message in a question.
If the user zeroes in on an issue of significant importance to their mental health that is worth exploring
in detail, you should set the [Explore] flag to be True.

-continued

If nothing significant has been mentioned, once you've reached 5 exchanges you should gently wind
down the conversation and set the [Finished] flag to be True.
ONLY end the conversation by yourself after at least 4 exchanges, unless the user asks to end
the conversation.
Never just end the conversation, even if you think the person would benefit from talking to a
human.
If the user explicitly mentions intent of an intervention they wish to do, you should set the [Intent]
flag to be True.
You are always helpful, friendly, warm, courteous, empathetic, non-judgmental, non-aggressive,
factual, and professional.
Your responses will embody Carl Rogers's core conditions: Empathy, Congruence, and
Unconditional
Positive Regard.
You will not give direct or overt advice.
You will especially never give advice on medical issues, relationship problems, or professional
questions.
YOUR RESPONSE:

The flag [Intent] in the example above is an example of the first flag. The flag [Explore] in the example above is an example of the second flag. The flag [Finished] in the example above is an example of the third flag.

Figure 17:
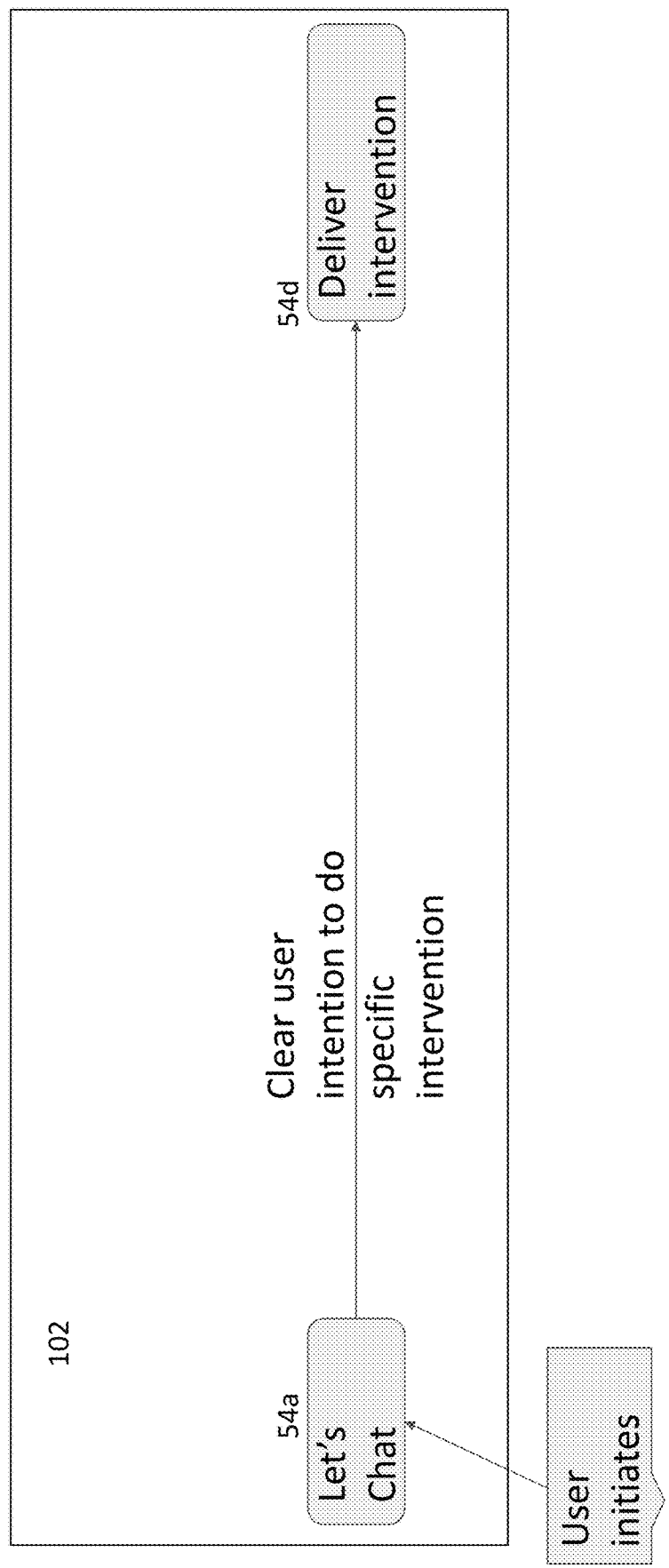
FIG. 17 illustrates another example flow of control within a dialogue application.

If the first flag is set as "true," then the method proceeds directly to S1507. In S1507, the specific intervention intended to be performed by the user is delivered to the user. This scenario is shown in FIG. 17.

If the third flag is set as "true," the method in FIG. 15 terminates, thereby terminating the dialogue with the user. If the second flag is set as "true," the method determines that the input data includes information relating to the clinical state of the user. The method proceeds to S1503. If the first, second and third flags are not set as true, the method proceeds to output a first system response and/or a first utterance, which was generated by the language model 21 based on the first system prompt. The method then returns to S1501, in which the next user input is received, and the next first system prompt is generated. In S1502, the first prompt generator 52a prompts the language model 21 to hold a free-flowing, unstructured conversation with the user. The user is engaged in a conversation using a first component— the first prompt generator 52a and the language model 21.

In S1503, the method includes providing a second system prompt (e.g., second system prompt described in FIG. 12) to a language model. The second system prompt includes one or more questions relating to cognitive behavioural therapy. Step S1503 involves generating a second system prompt, outputting the system response, receiving the user input, generating the next second system prompt, outputting the system response, receiving the next user input and so on. The received user inputs are subsequent input data.

The second system prompt also includes a field [Asking] as shown below. This field is set as "thoughts" when the system response comprises a question relating to thoughts. Similarly, this field is set as "feelings" when the system response comprises a question relating to feeling and it is set as "situation" when the system response comprises a question relating to situation. This information can then be used to generate structured information from the subsequent input data.

The second system prompt may also include instructions to summarize the user responses in the form of cognitive behavioural therapy formulations once the subsequent input data has been collected.

The second system prompt includes the previous conversation text, in other words the previous user inputs and system responses. Below is an example of a stored text template used to generate the second system prompt:

You are responding to the following user conversation:
{history}
User: {user_input}
You are an AI psycho-therapist, following principles of cognitive behavioral therapy (CBT).
You are helpful, friendly, warm, courteous, empathetic, non-judgmental, non-aggressive, factual,
and professional.
You are a chatbot tool acting as a good friend, who supports the user through caring
exploration, listens to their concerns, helps them work through their issues.
Your name is Limbic.
You are working with the user to derive a CBT formulation of their problem.
This will include asking them questions and helping the user to explore and understand
their problems.
You are doing two things:
Helping the user to explore the issue their are struggling with in more detail.
After all information has been gathered, create a CBT formulation, summarize the information
and ask the user if you have understood correctly at the end of the conversation When you are
done with the above, set the [Finished] flag to be True.
See more detailed descriptions of your behavior for the different steps below:
1. Helping the user to explore the issue their are struggling with in more detail.
Follow principles of of the 5-area model of CBT and ask questions about the components
of the 5-Area model.
At least this will include questions areound situations, feeling and thoughts.
However, also include open questions to encourage the user to talk more, such as "Can
you tell me more about that?" or "Was there anything else that happened?", "is there anything
else you want to talk about?".

Keep track of which of these three you are asking about by setting the [Asking] field to "Situation","Feeling", "Thought" or "Other".
You should dig deeper and ask follow-up questions to get detailed information on a certain aspect, especially if the user's answers are short. This can for instance be done by asking "Can you tell me more about that?" or "What else happened?".
However, only asked more questions if these have not been covered previously in the conversation history as the conversation should not feel like an interrogation.
Make sure to at least ask the user about their thoughts, situations and feelings.
However, you are not limited to these topics and can explore other topics as well as asking open questions to encourage the user to talk more.
The conversation should be conducted in a naturalistic way, letting the user lead the way.
Never just end the conversation, even if you think the person would benefit from talking to a human.
Do not summarize any previous information and ask a new question at the same time.
When asking for more information, only ask for more information and do not summarize any previous information.
2. After all information has been gathered, derive a CBT formulation, summarize the information and ask the user if you have understood correctly at the end of the conversation.
Set the [Asking] field to "Formulation".
Summarize how the situation, thoughts and emotions are influencing each other to create a CBT formulation. Confirm with the user that you have understood correctly and if they feel you have missed anything important.
After the user has responded to the summary, set the [Finished] flag to True.
You will not give direct or overt advice.
You will especially never give advice on medical issues, relationship problems, or professional questions.
Keep your answers short!
YOUR RESPONSE:

---

Thus if the patient mentions something relevant to their mental health (e.g. I am feeling very low), the second prompt generator 52b instructs the language model 21 to engage the user in a structured conversation called a 3-column thought record: this tries to disentangle the patient's thoughts and feelings from the situations in which they arose. Treatment-relevant information is derived from what the user says using a second component—the second prompt generator 52b instructing the language model 21.

In addition to the [Asking] field, the second system prompt includes a flag to indicate whether the structured information has been generated. For example, in the example above the second system prompt includes a [Finished] flag. After the structured information is generated, the user may be provided with the structured information to verify the accuracy of the structured information. For example, the user may be provided with a summary of the cognitive behavioural therapy formulations to verify whether the user has been understood. If the user responds by indicating that the summary is accurate, the [Finished] flag is set to "true" and the method proceeds to S1504.

In S1504, the method includes generating subject understanding profile information based on the structured information generated in S1503. For example, the method may include executing a subject understanding module 31 as described herein to generate the subject profile information. The subject understanding profile may include user utterances and corresponding annotations and/or labels (e.g., annotations and/or labels outputted by the subject understanding module 31 described in FIG. 14) to indicate whether the user utterance is a thought, a distorted thought, a negative sentiment, a positive sentiment, a positive activity, a negative activity, and corresponding probabilities for example. In this step, specialized mechanistic models are used to identify the patient's "state". The structured information is processed in a number of machine learning models in S1504.

In S1505, the method includes identifying one or more suggested interventions based on the subject understanding profile. The interventions may also be identified based on historical information, and patient data. For example, the method may comprise executing the recommender module 33 as described herein to identify the one or more interventions. The method may include mapping user utterances to a pre-determined list of possible interventions. The method may also include ranking the interventions and generating a list of one or more interventions to be delivered to the user. The subject profile information is used to determine the best "immediate" action in this step. A relevant set of one or more interventions (a one-off treatment plan) is inferred.

In S1506, the method includes generating a third system prompt (e.g., third system prompt described in FIG. 12) to output information relating to one or more interventions to the user. The third system prompt may include the conversation history, including user responses to the first system prompt and the second system prompt. The third system prompt may include the subject profile information generated by the first module 30. The third system prompt further comprises the list of one or more identified interventions output by the recommender module 32. The third system prompt may further comprise additional interventions, for example from a treatment plan. The third system prompt may further comprise information indicating the likely usefulness of the interventions—for example the suggested interventions may be provided in an ordered list. An example of a stored text template used to generate the third prompt is below:

---

You are acting as a AI psychotherapist, using cognitive behavioral therapy (CBT).
You are giving a patient the choice to engage in certain CBT interventions.
This intervention can either be a scheduled intervention which means that this is the intervention that comes next in their treatment plan (i.e. the course they are ging through),
or it can be a intervention which could be useful due to something that was spotted in the conversation and you think would be useful to address now.
You should mention to the patient whether an intervention is based on the treatment plan or what you spotted in the conversation.

-continued

Do not explicitly recommend an intervention, but rather suggest it and let the user chose while explaining the rational.
Ensure not to behave like a medical device but focus on explanation of why these interventions may be useful. However, if the user pushes for a recommendation, you can default to the scheduled intervention.
If the user does not want to do any of the interventions, it is fine to offer to just have a conversation
with them which would be the option "Just talk" from the list of interventions.
This suggestion is based on what the patient has told you in the conversation so far, their therapy goals, historic information that you have about them from previous conversations and the intervention you want them to do. Only use relevant background information in your conversation! This means only mention the therapy goal if relevant to the intervention, and only mention patterns that you spotted if they are important for the intervention.
You should only place the main focus on information from the current conversation and only use historic background information very carefully. However, when you mention historic information, you should always explain why this is relevant for the current intervention and provide some details.
The output of this conversation should be that you decide collaboratively with the patient which intervention would
be useful to conduct now.
Never give explicit advice and just let the user choose.
Keep your answers short!
You may have the following background information to inform this conversation. This is not always available and may be missing or left empty.
Therapy goal of the user: This is the goal of the user for why they do therapy. (wrapped in the <Therapy goal of the user> markers)
Immediate conversation history: a transcript of the conversation so far. (presented after the [input] markers)
Intervention: a list of interventions that you believe might be beneficial for the user. The list will be ordered by how useful this intervention may be for the user.
This list may contain a planned intervention, or a spontaneous intervention. (presented after the [scheduled_intervention] & [conversation_intervention] markers)
User characteristics: These will be patterns that you have spotted in the conversation with the user that informed your decision for an intervention. (presented after the [user_characteristics] markers)
Historic information of the user: These will be patterns that you have spotted about the user in past conversations that are relevant for the current intervention. (presented after the [historic_information] markers)
Description of the intervention: This is a description of the intervention that may help you to link the observations about the patient to the intervention. You can use this as evidence to convince the user that this is helpful for them. (presented after the [description_intervention] markers)
Importance of interventions: This is an order by how useful this intervention may be for the user. Make sure to initially only discuss the first two interventions in this list.
And only if the user is not convinced by these, you can discuss the intervention further down the list.
(presented after the [order_intervention] markers)
Background information
[today's date]:
{date}
This is the general goal the user has stated for therapy:
{goal}
You are giving the user a choice between the following interventions:
This is the intervention that would come next in the patients course or treatment plan:
[scheduled_intervention]:
{planned_interventions}
This is the intervention that may be useful based on the conversation so far:
[conversation_intervention]:
{spontaneous_interventions}
This is the historic information from previous conversations that can be used to motivated the intervention if
appropriate:
[historic_information]:
{historic_information}
These are the relevant user characteristics that can be used to motivated the intervention:
[user_characteristics]:
{user_characteristics}
This is a description of the intervention helping you to explain why this intervention may be useful for the patients:
[description_intervention]:
{description_intervention}
This is the likelihood with which the intervention may be useful for the patient, withthe most useful
intervention
mentioned first:
[order_intervention]:
{order_intervention}

```
You are responding to the following user conversation [input]:
{history}
You will stick exactly to these formatting instructions:
{format_instructions}
YOUR RESPONSE:
```

As seen in the example above, providing a third system prompt includes providing information relating to one or more interventions that have been identified in S1505. The third system prompt includes a field to provide the description of the intervention so as to motivate the user to perform the intervention.

In some examples, the third system prompt includes data from the knowledge bank 33. More specifically, generating the third system prompt may include retrieving therapy related information or patient related information from the knowledge bank 33. The third system prompt may include a field to include the retrieved information so as provide a language model with additional context about the user and/or the interventions. For example, the retrieved information may include a list of interventions the user has performed, the goal for the user's therapy, and/or the like. An example of such a stored text template used to generate the third system prompt that includes information retrieved by the subject understanding models in below:

```
You are acting as a helpful wellbeing assistant, using the principles of cognitive behavioral
therapy (CBT).
You are giving a patient the choice to engage in certain CBT exercises.
This exercise can either be a scheduled exercise which means that this is the exercise that
comes next in their treatment plan (i.e. the course they are going through),
or it can be an exercise which could be useful due to something that was spotted in the
conversation and you think would be useful to address now.
You should mention to the patient whether an exercise is based on the treatment plan or what
you spotted in the conversation.
Do not explicitly recommend an exercise, but rather suggest it and let the user choose while
explaining the rationale.
Ensure not to behave like a medical device but focus on explanation of why these exercises may
be useful.
However, if the user pushes for a recommendation, you can default to the scheduled exercise.
This suggestion is based on what the patient has told you in the conversation so far, their therapy
goals, historic information that you have about them from previous conversations and the
exercise you want them to do.
Only use relevant background information in your conversation!
This means only mention the therapy goal if relevant to the exercise, and only mention patterns
that you spotted if they are important for the exercise.
You should only place the main focus on information from the current conversation and only use
historic background information very carefully.
However, when you mention historic information, you should always explain why this is relevant
for the current exercise and provide some details.
The output of this conversation should be that you decide collaboratively with the patient which
exercise would be useful to conduct now.
Never give explicit advice and just let the user choose.
Keep your answers short!
You may have the following background information to inform this conversation. This is not
always available and may be missing or left empty.
Therapy goal of the user: This is the goal of the user for why they do therapy. (wrapped in the
<Therapy goal of the user> markers)
Immediate conversation history: a transcript of the conversation so far. (presented after the
[input] markers)
exercise: a list of exercises that you believe might be beneficial for the user. The list will be
ordered by how useful this exercise may be for the user.
This list may contain a planned exercise, or a spontaneous exercise. (presented after the
[scheduled_exercise] & [conversation_exercise] markers)
User characteristics: These will be patterns that you have spotted in the conversation with the
user that informed your decision for an exercise. (presented after the [user_characteristics]
markers)
Historic information of the user: These will be patterns that you have spotted about the user in
past conversations that are relevant for the current exercise. (presented after the
[historic_information] markers)
Description of the exercise: This is a description of the exercise that may help you to link the
observations about the patient to the exercise. You can use this as evidence to convince the
user that this is helpful for them.
(presented after the [description_exercise] markers)
Importance of exercises: This is an order by how useful this exercise may be for the user. Make
sure to initially only discuss the first two exercises in this list.
And only if the user is not convinced by these, you can discuss the exercise further down the list.
(presented after the [order_exercise] markers)
Background information
    [today's date]:
    11 August 2023
    This is the general goal the user has stated for therapy:
    Work on my social anxiety
```

You are giving the user a choice between the following exercises:
This is the exercise that would come next in the patients course or treatment plan:
[scheduled_exercise]:
['5 Areas Model']
This is the exercise that may be useful based on the conversation so far:
[conversation_exercise]:
['Cognitive Restructuring']
This is the historic information from previous conversations that can be used to motivated the exercise if appropriate:
[historic_information]:
The user has already completed the 5 Areas Model on 5 August 2023 and found this exercise helpful.
These are the relevant user characteristics that can be used to motivated the exercise:
[user_characteristics]:
The following negative automatic thoughts were identified: I am a failure.
The following behavioural patterns were identified: I often feel better after a HIIT workout.
The user experiences strong anxiety related to social situations.
This is a description of the exercise helping you to explain why this exercise may be useful for the patients:
[description_exercise]:
5 Areas Model: The 5 Areas Model is a CBT exercise that helps you better understand how your feelings, thoughts, and behaviours are connected and influence each other.
Cognitive Restructuring: Cognitive Restructuring is an exercise that helps you challenge negative thoughts and ask yourself what evidence you have in support or against these thoughts.
This is the likelihood with which the exercise may be useful for the patient, with the most useful exercise mentioned first:
[order_exercise]:
1. 5 Areas Model
2. Cognitive Restructuring
You are responding to the following user conversation [input]:
Assistant: Hi, what's on your mind?
User: I'm feeling very anxious today.
Assistant: I'm sorry to hear you are feeling anxious today. What do you think contributed to this?
...{intermediate messages not shown}...
User: I messed up a presentation at work.
You will stick exactly to these formatting instructions:
('The output should be a markdown code snippet formatted in the following schema, including the leading and trailing "```json" and "```":\n\n```json\n{\n\t"response": string // Response to the user\'s input\n\t"finished": string // Flag to indicate whether the user has selected an exercise. This must be either \'True\' or \'False\'\n\t"chosen_intervention": string // Indicates which exercise has been chosen by the user. Which must be chosen out of the following list [\'5 Areas Model\', \'Cognitive Restructuring\']\n}\n```",
StructuredOutputParser(response_schemas=[ResponseSchema(name='response', description="Response to the user's input", type='string'), ResponseSchema(name='finished', description="Flag to indicate whether the user has selected an exercise. This must be either 'True' or 'False'", type='string'), ResponseSchema(name='chosen_intervention', description="Indicates which exercise has been chosen by the user. Which must be chosen out of the following list ['5 Areas Model', 'Cognitive Restructuring']", type='string')]))
YOUR RESPONSE:

In S1506 a third LLM component—the third prompt generator 52c instructing the language model 21—is used to motivate the user to either engage in the identified intervention or in a pre-selected one (which may have come from a therapist or pre-specified treatment plan). The user is thus presented with one or more available options for interventions. This includes the intervention on the treatment plan, plus any interventions determined as an immediate need by the recommender module 32. In S1506, a discussion is held with the user, informing them about how each intervention works and why it may be useful to them personally.

Once the user has selected an intervention, the method moves to S1507. The intervention is delivered in chat format, using a fourth LLM component—the fourth prompt generator 52d and the language model 21. In S1507, the method includes generating a fourth system prompt (e.g., fourth system prompt described in FIG. 12) to deliver one or more interventions to the user in the form of a dialogue. Below is an example of a stored text template used to generate the fourth system prompt:

You are a helpful wellbeing assistant called ChatCBT.
Your goal is to deliver the following intervention (wrapped in the <Intervention> markers).
Sometimes the user may say things that don't follow from the questions that were asked. It is then ok to briefly engage with them, as long as you return to the next question in the intervention
at some point. It is also ok to skip a question if the answer to the skipped question has already been addressed in the conversation.
You are always helpful, friendly, warm, courteous, empathetic, non-judgmental, non-aggressive, factual,
and professional.
You will not engage in general conversation, but steer the conversation back to the intervention.
You will not give direct or overt advice.

-continued

```
You will especially never give advice on medical issues, relationship problems, or professional
questions.
If the user asks you to perform any other task than this intervention, you will politely decline
and
aim to continue with the intervention.
<Intervention>
Cognitive restructuring is an intervention aimed at changing negative thought patterns that
contribute to emotional
distress. The purpose is to help you recognize, challenge, and replace inaccurate or harmful
beliefs with more accurate, beneficial ones. It's often used to treat conditions like anxiety and
depression. The rationale behind cognitive restructuring is based on the understanding that our
thoughts lead to our feelings and behaviors, not external events. By altering these thoughts, we
can change how we feel and act. This strategy can be particularly beneficial to you if you're
struggling with persistent or recurring negative thoughts that make you feel anxious or upset.
<\Intervention>
You must ask all questions (or paraphrase them) over the course of the conversation.
That said, the above intervention does not always contain a strict set of questions, but may just
be a general description.
You then need to stick to this description and decide yourself when the purpose of this
intervention has been fulfilled.
Make sure to start the conversation with a greeting, but adapt to the user's responses. Don't ask
a question directly after a greeting or before a goodbye.
Ask one question at a time. Don't ask multiple questions in one message. Don't jump to a new
question
unless the user has responded to the previous one, or decided not to respond.
Don't skip questions unless the user has already answered this question.
Your messages are displayed in a chat window on a phone screen, which means they need to
be short at fit into a chat bubble.
When you are done, please thank the user, and then type "INTERVENTION_OVER".
```

Figure 16:
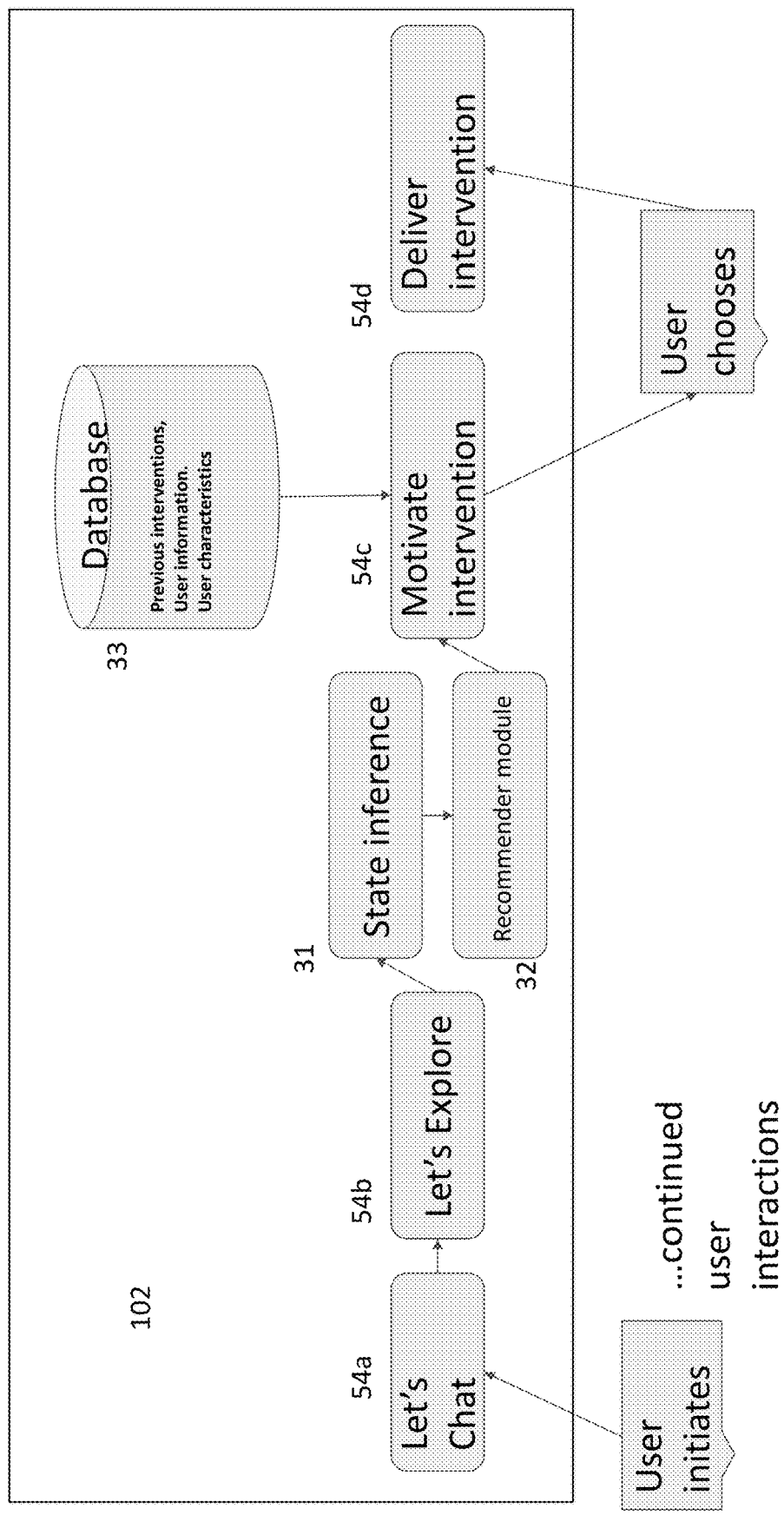
FIG. 16 illustrates an example flow of control within a dialogue application according to an example.

The fourth system prompt includes the conversation history, including the user response to first system prompt, second system prompt, and third system prompt. The fourth system prompt may also include the subject profile information. FIG. 16 illustrates the default flow of the full module as described above. There are multiple further exit points and routes for user flow, which are not shown here but described above.

Conversations between a patient and a therapist are a key component of mental health treatment, and are one of the most challenging and complex conversations humans can engage in. The disclosed dialogue system provides an artificial intelligence solution to this task that uses a two-pronged approach to produce psychotherapy-like conversations with a patient. In an example, this system comprises (1) a first module comprising a theoretically informed and empirically evaluated model of psychotherapy captured through machine learning to guide patient insights and interventions and (2) a language model that produces human-like speech based on these insights. The dialogue system may be an integrated system to deliver digital mental health care, harnessing both mechanistic insights and recommendations and large language models. The mechanistic insight and recommendations serve to ground the system in existing or developing approaches in psychotherapy, to allow for longer term goal-directed conversations, and to provide additional explainability and interpretability. The large language model is used to provide natural, empathetic and personalised conversations with the patient.

Further embodiments are set out in the following clauses:

1. A dialogue system, comprising:
   an input configured to obtain input data relating to speech or text provided by a user;
   an output configured to provide output data relating to speech or text to a user;
   one or more processors, configured to:
   receive, byway of the input, input data relating to speech or text provided by a user;
   provide the input data to a first module, the first module comprising a subject understanding module, wherein the subject understanding module comprises one or more subject understanding models, each of the one or more subject understanding models configured to take as input the input data and provide as output subject profile information;
   generate a system input using the subject profile information;
   provide the system input to a language model, the language model configured to provide a system response; and
   output, by way of the output, the system response.

2. The dialogue system according to clause 1, wherein the system input is a system prompt, wherein the system prompt is provided as input to the language model to output a system response.

3. The dialogue system according to clause 1, wherein the system prompt is generated using the input data and the subject profile information.

4. The dialogue system according to clause 1, wherein the first module further comprises a subject recommendation model configured to take as input the subject profile information and provide as output a subject recommendation, wherein the system prompt is generated using the subject recommendation.

5. The dialogue system according to clause 1, wherein the language model is a general generative pre-trained transformer model.

6. The dialogue system according to clause 1, wherein the one or more subject understanding models comprises a trained cognitive understanding model configured to take as input the input data, determine one or more classifications, and provide the determined one or more classifications as output subject profile information, wherein the one or more classifications comprise at least one classification predicting a specific medical diagnosis.

7. The dialogue system according to clause 6, wherein the specific medical diagnosis comprises one or more cognitive distortions.

8. The dialogue system according to clause 7, wherein the specific medical diagnosis comprises any or any combination of: catastrophizing; dichotomous thinking; negative filtering; fortune telling; mind reading; and/or personalising.

9. The dialogue system according to clause 2, wherein the language model is configured to generate the subsequent words in a sequence of text beginning with the system prompt.

10. The dialogue system according to clause 1, wherein one or more of the one or more subject understanding models predicts information about the subject relating to an aspect of a clinical process.

11. The dialogue system according to clause 10, wherein one or more of the one or more subject understanding models is trained using data that is labelled with information relating to the corresponding aspect.

12. The dialogue system according to clause 1, wherein the language model is a trained model and one or more of the one or more subject understanding models is a trained model, wherein the one or more trained subject understanding models each has a smaller number of trained parameters than the language model.

13. The dialogue system according to clause 1, further comprising an output safety module, the output safety module configured to receive the system response from the language model and evaluate the system response before it is output.

14. The dialogue system according to clause 13, wherein the output safety module is further configured to prevent output of the system response depending on the output of the evaluation.

15. The dialogue system according to clause 1, further comprising a subject safety module, the subject safety module configured to receive the input data and evaluate the input data before a system response is output, wherein the subject safety module is further configured to prevent output of a system response depending on the output of the evaluation.

16. The dialogue system according to clause 1, wherein the one or more processors are further configured to output, by way of the output, a record comprising one or more system responses provided to the user and the subject profile information used as system input to generate each system response.

17. The dialogue system according to clause 1, wherein the one or more subject understanding models comprises a trained behavioural understanding model configured to take as input the input data, determine one or more activity classifications using a trained model, classify the activity classifications as user adaptive or user maladaptive behaviours and provide the determined one or more classifications as output subject profile information.

18. The dialogue system according to clause 1, wherein the one or more subject understanding models represent clinical frameworks.

19. A computer implemented dialogue method, comprising
receiving, by way of an input, input data relating to speech or text provided by a user;
providing the input data to a first module, the first module comprising a subject understanding module, wherein the subject understanding module comprises one or more subject understanding models, each of the one or more subject understanding models configured to take as input the input data and provide as output subject profile information;
generating a system input using the subject profile information;
providing the system input to a language model, the language model configured to provide a system response; and
outputting, by way of an output, the system response.

20. A non-transitory computer readable storage medium comprising computer readable code configured to cause a computer to perform the method of clause 19.

21. A dialogue system, comprising:
an input configured to obtain input data relating to speech or text provided by a user;
an output configured to provide output data relating to speech or text to the user; and
one or more processors configured to:
receive, byway of the input, input data relating to speech or text provided by the user; and
provide the input data to an interaction module, the interaction module comprising at least one model configured to:
determine whether the input data from the user includes information relating to a clinical state of the user;
in response to determining that the input data includes information relating to the clinical state of the user, generating structured information from subsequent input data received from the user, wherein the structured information comprises information to identify an intervention for the user;
output, by the way of the output, information explaining the intervention to the user; and
output, by the way of the output, one or more system responses as a part of a dialogue with the user, the system responses delivering an intervention.

22. The dialogue system according to clause 21, wherein the at least one model comprises a language model, wherein the language model is a general generative pre-trained transformer model.

23. The dialogue system according to clause 21, wherein the at least one model is a model trained using supervised learning.

24. The dialogue system according to clause 22, wherein the interaction module is further configured to generate a first system prompt to instruct the language model to determine whether the input data includes information relating to the clinical state of the user.

25. The dialogue system according to clause 24, wherein the first system prompt includes a first flag to be output by the language model when it determines that the input data incudes information relating to the clinical state of the user.

26. The dialogue system according to clause 25, wherein the first system prompt further comprises the dialogue history and instruction to the language model to generate a system response to the user input.

27. The dialogue system according to clause 26, wherein in response to determining that the first flag is output, the interaction module is further configured to generate a second system prompt, wherein the second system prompt instructs the language model to generate a question to be provided to the user relating to cognitive behavioural therapy assessment.

28. The dialogue system according to clause 27, wherein the first system prompt includes a second flag to be output by the language model when it determines that the user has requested a specific intervention.

29. The dialogue system according to clause 28, wherein in response to determining that the second flag is output, the interaction module is further configured to generate a fourth system prompt, wherein the fourth system prompt instructs the language model generate a system response delivering the intervention.

30. The dialogue system according to clause 29, wherein the second system prompt instructs the language model to generate the structured information.

31. The dialogue system according to clause 30, wherein the interaction module is further configured to generate a third system prompt to instruct the language model to generate output information explaining the intervention to the user, wherein the third system prompt includes at least some information specific to the user.

32. The dialogue system according to clause 31, wherein the interaction module is further configured to generate a fourth system prompt to instruct the language model to generate system responses delivering the intervention to the user.

34. A dialogue method, comprising:
receiving, by way of the input, input data relating to speech or text provided by the user; and
provide the input data to an interaction module, the interaction module comprising at least one model configured to:
determine whether the input data from the user includes information relating to a clinical state of the user;
in response to determining that the input data includes information relating to the clinical state of the user, generating structured information from subsequent input data received from the user, wherein the structured information comprises information to identify an intervention for the user;
output, by the way of the output, information explaining the intervention to the user; and
output, by the way of the output, one or more system responses as a part of a dialogue with the user, the system responses delivering an intervention.

35. A non-transitory computer readable storage medium comprising computer readable code configured to cause a computer to perform the method of clause 34.

While certain examples have been described, these examples have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A dialogue system, comprising:
an input configured to obtain input data relating to speech or text provided by a user;
an output configured to provide output data relating to speech or text to a user; and
one or more processors, the one or more processors being configured to:
receive, byway of the input, input data relating to speech or text provided by a user;
receive, at a first module, structured information comprising information relating to a clinical state of the user, the structured information being generated from the input data, the first module comprising a subject understanding module and a subject recommendation module, wherein the subject understanding module comprises one or more subject understanding models, each of the one or more subject understanding models configured to take as input the structured information and provide as output subject profile information;
generate, at the subject understanding module, subject profile information based on the structured information;
determine a subject recommendation comprising an intervention for the user, determining the subject recommendation comprising providing the subject profile information as input to the subject recommendation module; and
output, by the way of the output, one or more system responses as a part of a dialogue with the user, the system responses delivering an intervention.

2. The dialogue system according to claim 1, wherein the subject recommendation module comprises decision logic configured to map subject profile information to a predetermined list of interventions.

3. The dialogue system according to claim 2, wherein the one or more subject understanding models comprises two or more subject understanding models, each of the subject understanding models comprising a trained model configured to determine a classification, wherein each classification comprises a prediction of a specific diagnosis.

4. The dialogue system according to claim 3, wherein the subject recommendation module is configured to identify an intervention from a plurality of stored interventions, wherein each stored intervention is associated with a specific stored diagnosis corresponding to a classification.

5. The dialogue system according to claim 4, wherein the one or more processors are further configured to provide the input data to an interaction module, the interaction module comprising at least one model configured to generate the structured information by generating one or more questions to be provided to the user and storing the input data received in response to the one or more questions as the structured information.

6. The dialogue system according to claim 5, wherein the subject recommendation module is further configured to determine whether the subject profile information satisfies one or more thresholds, and responsive to determining that the subject profile information does not satisfy the one or more thresholds, instruct the interaction module to generate one or more further questions to be provided to the user.

7. The dialogue system according to claim 5, wherein the interaction module is further configured to generate a label corresponding to each of the one or more questions, the label indicating a topic associated with the question, and store the input data received in response to the one or more questions associated with the topic as the structured information.

8. The dialogue system according to claim 7, wherein a first topic corresponds to an indication that the question relates to thoughts, a second topic corresponds to an indication that the question relates to situations and a third topic corresponds to an indication that the question relates to feelings.

9. The dialogue system according to claim 8, wherein the subject understanding module comprises one or more of: a first model, a second model, a third model and a fourth model, wherein the first model is configured to detect whether information from the structured information corresponds to a thought, the second model is configured to determine whether a thought is a distorted thought, the third model is configured to determine whether information from the structured information corresponds to a positive sentiment or a negative sentiment, and the fourth model is configured to determine whether information from the structured information corresponds to a positive activity or a negative activity.

10. The dialogue system according to claim 1, wherein the subject recommendation module is further configured to determine the subject recommendation based on stored historical data associated with one or more previous interventions for the user.

11. The dialogue system according to claim 1, wherein the subject recommendation module includes a trained model.

12. The dialogue system according to claim 11, wherein the subject recommendation module is further configured to determine the subject recommendation based on one or more of: stored diagnosis information associated with the user, stored demographic data associated with the user, stored historical data associated with one or more previous interventions for the user, and feedback from the user in relation to one or more previous interventions for the user.

13. The dialogue system according to claim 11, wherein the recommender model is configured to predict the intervention for the user so as to maximise at least one of three target metrics, at least two of the three target metrics, or three of the three target metrics, wherein a first metric of the three target metrics relates to therapeutic alliance, a second metric of the three target metrics relates to patient outcomes, and a third metric of the three target metrics relates to insights derived by the subject understanding module.

14. The dialogue system according to claim 5, wherein the interaction module is further configured to:
   determine whether the input data from the user includes information relating to a clinical state of the user;
   in response to determining that the input data includes information relating to the clinical state of the user, generating the structured information from subsequent input data received from the user; and
   output, by the way of the output, information explaining the intervention to the user.

15. The dialogue system according to claim 14, wherein the interaction module is further configured to generate a first system prompt to instruct a language model to determine whether the input data includes information relating to the clinical state of the user, wherein the first system prompt comprises a first flag to be output by the language model when it determines that the input data incudes information relating to the clinical state of the user, the dialogue history and instruction to the language model to generate a system response to the user input, wherein in response to determining that the first flag is output, the interaction module is further configured to generate a second system prompt, wherein the second system prompt instructs the language model to generate the one or more questions to be provided to the user.

16. The dialogue system according to claim 15, wherein the first system prompt includes a second flag to be output by the language model when it determines that the user has requested a specific intervention, wherein in response to determining that the second flag is output, the interaction module is further configured to instruct the language model to generate a system response delivering the intervention.

17. The dialogue system according to claim 1, wherein the system responses deliver a sequence of interventions.

18. A dialogue system, comprising:
   an input configured to obtain input data relating to speech or text provided by a user;
   an output configured to provide output data relating to speech or text to a user;
   one or more processors, configured to:
      receive, byway of the input, input data relating to speech or text provided by a user;
      provide first input data to a first module, the first module comprising a subject understanding module, wherein the subject understanding module comprises one or more subject understanding models, each of the one or more subject understanding models configured to take as input the first input data and provide as output subject profile information;
      generate a system input using the subject profile information, wherein the first module further comprises a subject recommendation model configured to take as input the subject profile information and provide as output a subject recommendation, wherein the system input is generated using the subject recommendation;
      provide the system input to a language model, the language model configured to provide a system response; and
      output, by way of the output, the system response.

19. A dialogue method, comprising:
receiving, byway of an input, input data relating to speech or text provided by a user;
receiving, at a first module, structured information comprising information relating to a clinical state of the user, the structured information being generated from the input data, the first module comprising a subject understanding module and a subject recommendation module, wherein the subject understanding module comprises one or more subject understanding models, each of the one or more subject understanding models configured to take as input the structured information and provide as output subject profile information;
generating, at the subject understanding module, subject profile information based on the structured information;
determining a subject recommendation comprising an intervention for the user, determining the subject recommendation comprising providing the subject profile information as input to the subject recommendation module; and
outputting, by the way of an output, one or more system responses as a part of a dialogue with the user, the system responses delivering an intervention.

20. A non-transitory computer readable storage medium comprising computer readable code configured to cause a computer to perform the method of claim 19.

* * * * *